United States Patent [19]
Yamaguchi et al.

[11] Patent Number: 6,142,581
[45] Date of Patent: Nov. 7, 2000

[54] HYDRAULIC CIRCUIT HAVING A ROTARY TYPE PUMP AND BRAKE APPARATUS FOR A VEHICLE PROVIDED WITH THE SAME

[75] Inventors: Takahiro Yamaguchi; Toshiya Morikawa, both of Kariya; Shuichi Yonemura, Anjo; Yoichi Abe, Kariya; Mamoru Sawada, Yokkaichi, all of Japan

[73] Assignee: DENSO Corporation, Kariya, Japan

[21] Appl. No.: 09/017,881

[22] Filed: Feb. 3, 1998

Related U.S. Application Data

[63] Continuation-in-part of application No. 08/773,765, Dec. 24, 1996, Pat. No. 6,024,420.

[30] Foreign Application Priority Data

| Dec. 26, 1995 | [JP] | Japan | 7-339555 |
|---|---|---|---|
| Mar. 19, 1996 | [JP] | Japan | 8-063371 |
| Mar. 19, 1996 | [JP] | Japan | 8-063372 |
| Mar. 19, 1996 | [JP] | Japan | 8-063373 |
| Mar. 19, 1996 | [JP] | Japan | 8-063374 |
| Mar. 19, 1996 | [JP] | Japan | 8-063375 |
| Mar. 19, 1996 | [JP] | Japan | 8-063376 |
| Mar. 27, 1996 | [JP] | Japan | 8-072430 |
| Jun. 4, 1996 | [JP] | Japan | 8-141479 |
| Oct. 17, 1996 | [JP] | Japan | 8-274955 |
| Dec. 18, 1996 | [JP] | Japan | 8-338019 |
| Feb. 3, 1997 | [JP] | Japan | 9-020716 |
| Jan. 9, 1998 | [JP] | Japan | 10-003364 |

[51] Int. Cl.[7] .................................................. B60T 8/34
[52] U.S. Cl. .............................. 303/113.2; 303/113.5; 303/115.1; 303/116.1
[58] Field of Search .................... 303/113.5, 115.1, 303/116.1, 116.2, DIG. 11, 113.1, 113.2

[56] References Cited

U.S. PATENT DOCUMENTS

| 4,435,782 | 3/1984 | Arikawa et al. . |
| 4,453,782 | 6/1984 | Arikawa et al. . |
| 4,580,847 | 4/1986 | Burgdorf . |
| 5,158,343 | 10/1992 | Reichelt et al. . |

(List continued on next page.)

FOREIGN PATENT DOCUMENTS

| 2653725 | 5/1991 | France . |
|---|---|---|
| 1800633 | 5/1970 | Germany . |
| 4338906 | 5/1995 | Germany . |
| 54-162207 | 12/1979 | Japan . |
| 55-025621 | 2/1980 | Japan . |
| 59-045256 | 3/1984 | Japan . |
| 61-287850 | 12/1986 | Japan . |
| 1-257658 | 10/1989 | Japan . |
| 4-087868 | 3/1992 | Japan . |
| 4-121260 | 4/1992 | Japan . |
| 5-170074 | 7/1993 | Japan . |
| 5-92483 | 12/1993 | Japan . |
| 6-032212 | 2/1994 | Japan . |
| 7-076267 | 3/1995 | Japan . |
| 8-128392 | 5/1996 | Japan . |
| 8-230634 | 9/1996 | Japan . |
| 8-291793 | 11/1996 | Japan . |
| 2 297 134 | 7/1996 | United Kingdom . |

OTHER PUBLICATIONS

Catalogue for a inner–contact type gear motor.

*Primary Examiner*—Peter M. Poon
*Attorney, Agent, or Firm*—Pillsbury Madison & Sutro LLP

[57] ABSTRACT

A hydraulic circuit has a rotary type pump comprising a rotor rotating with a driving shaft and a casing which holds the rotor and the driving shaft. The casing further comprises an inlet port through which fluid is introduced to spaces formed by the rotor, an outlet port through which fluid is discharged from the spaces, and a hydraulic path for leading fluid from clearance around said driving shaft to the outside of the casing. A reservoir is provided to store fluid coming through the hydraulic path. A return conduit is disposed between the reservoir and an upstream side conduit connected to the inlet port in order that fluid stored in the reservoir is returned to the upstream side conduit. In the return conduit, a check valve is disposed to prevent the reverse flow of fluid from the upstream side conduit to the reservoir.

25 Claims, 52 Drawing Sheets

U.S. PATENT DOCUMENTS

| | | | |
|---|---|---|---|
| 5,169,214 | 12/1992 | Holzmann et al. | 303/116.1 |
| 5,236,256 | 8/1993 | Schmidt et al. | 303/113.2 |
| 5,261,730 | 11/1993 | Steiner et al. | |
| 5,281,012 | 1/1994 | Binder et al. | 303/113.5 |
| 5,322,363 | 6/1994 | Sekiguchi et al. | |
| 5,342,120 | 8/1994 | Zimmer et al. | 303/116.2 |
| 5,350,224 | 9/1994 | Nell et al. | |
| 5,350,225 | 9/1994 | Steiner et al. | |
| 5,367,942 | 11/1994 | Nell et al. | |
| 5,374,112 | 12/1994 | Takata et al. | 303/116.1 |
| 5,383,719 | 1/1995 | Farr . | |
| 5,383,720 | 1/1995 | Schmidt | 303/113.5 |
| 5,393,131 | 2/1995 | Nomura et al. | |
| 5,401,083 | 3/1995 | Altmann et al. | 303/113.2 |
| 5,405,191 | 4/1995 | Nishiyama et al. | 303/116.2 |
| 5,427,442 | 6/1995 | Heibel . | |
| 5,445,441 | 8/1995 | Inagawa et al. | |
| 5,445,444 | 8/1995 | Rump et al. | 303/113.2 |
| 5,487,597 | 1/1996 | Lebret . | |
| 5,492,394 | 2/1996 | Kusano et al. | |
| 5,496,099 | 3/1996 | Resch . | |
| 5,586,814 | 12/1996 | Steiner . | |
| 5,727,852 | 3/1998 | Pueschel et al. | |
| 5,779,328 | 7/1998 | Mergenthaler et al. | 303/116.1 |
| 5,961,188 | 10/1999 | Sawada | 303/113.5 |
| 5,967,626 | 10/1999 | Terao et al. | 303/116.2 |
| 5,967,628 | 10/1999 | Abe et al. | 303/116.1 |

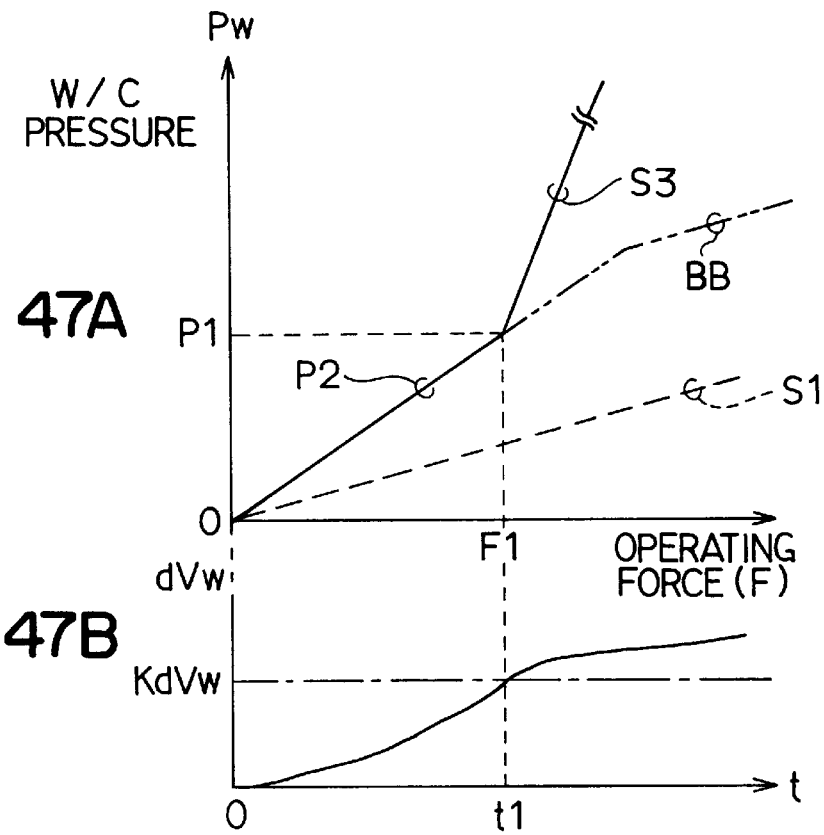
FIG. 47A
FIG. 47B
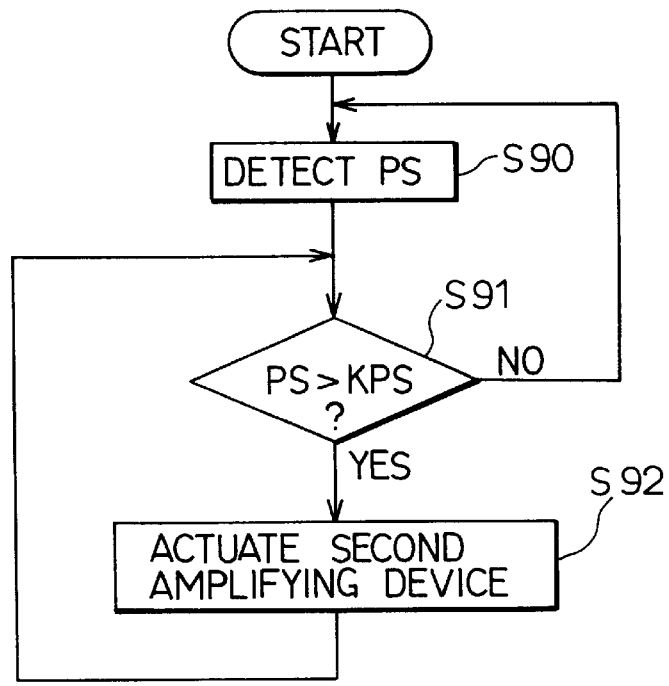
FIG. 48

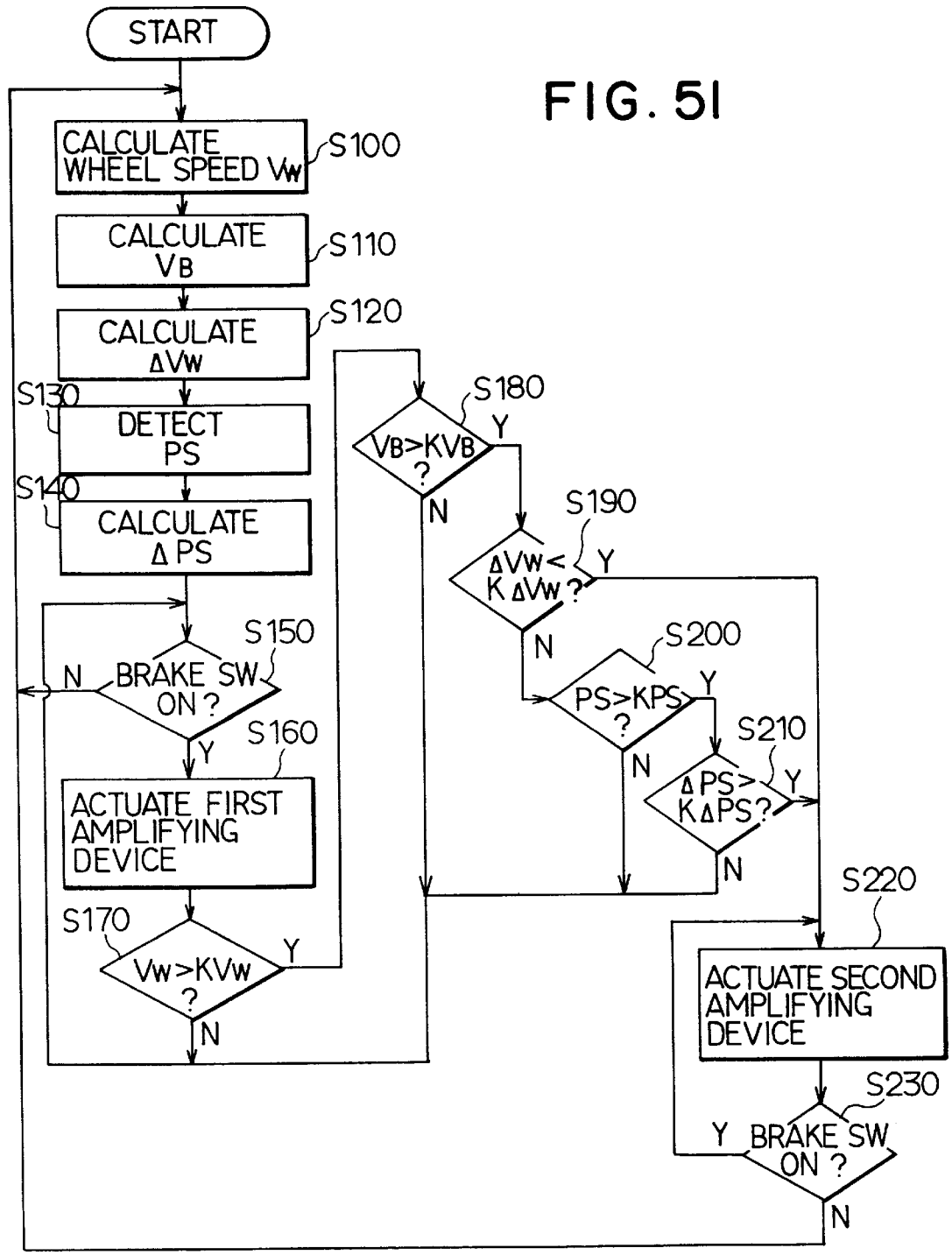

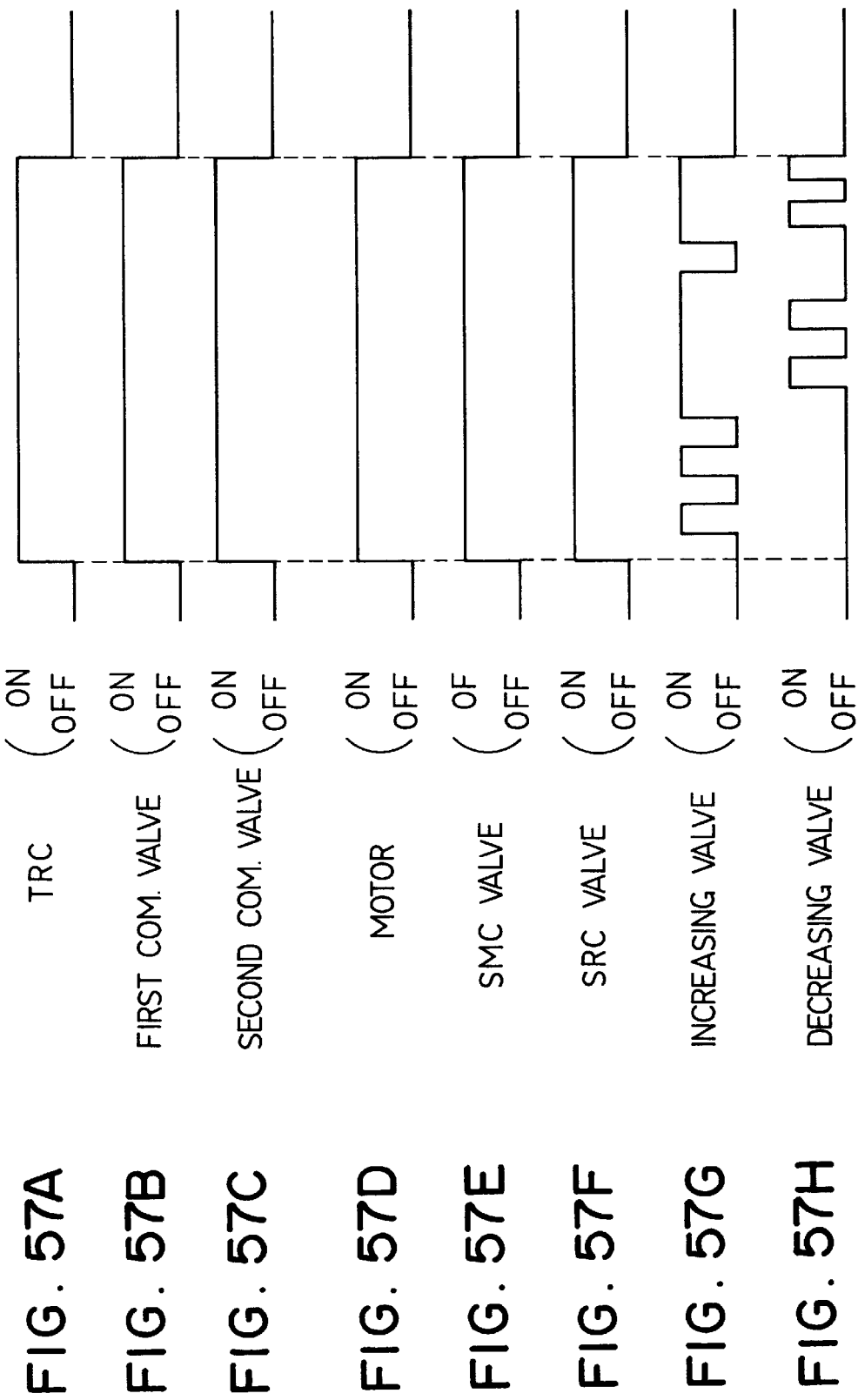

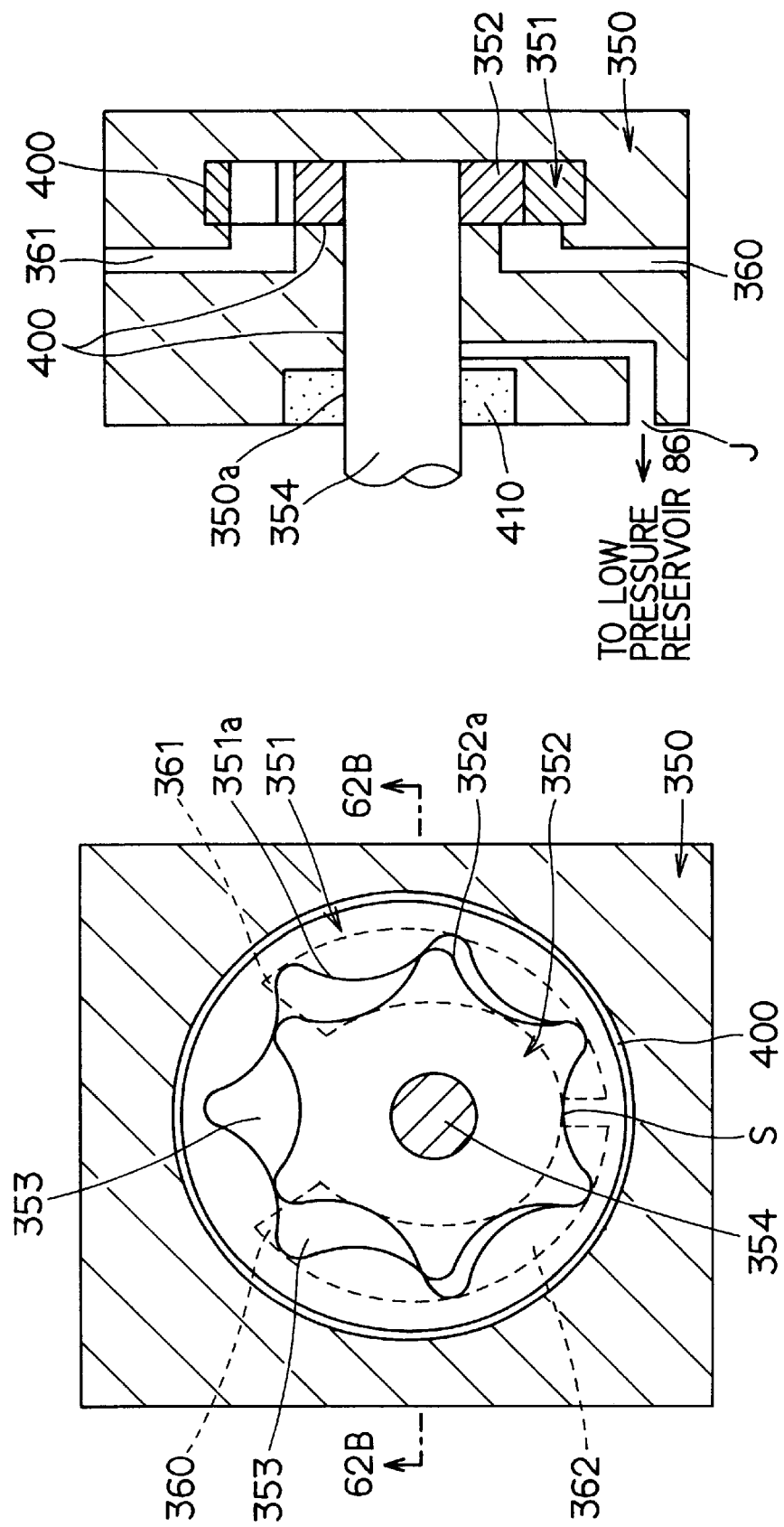

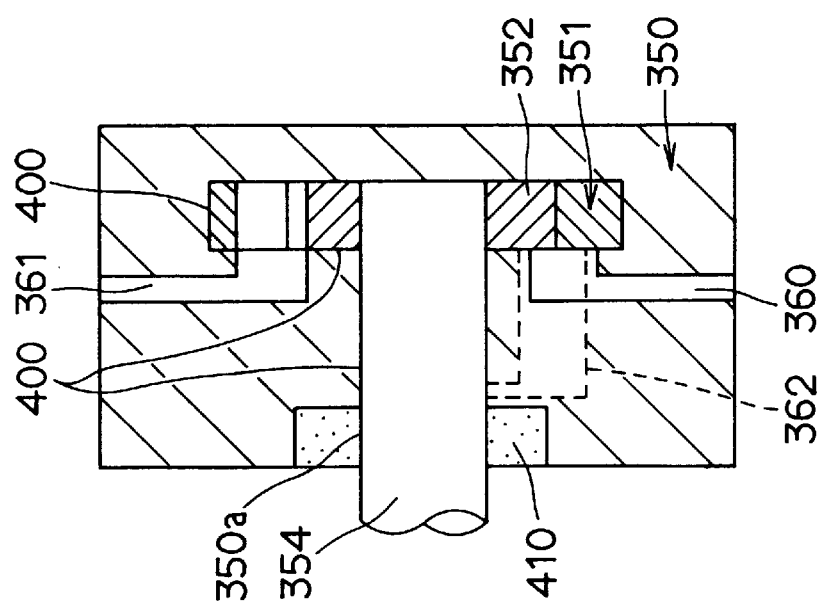
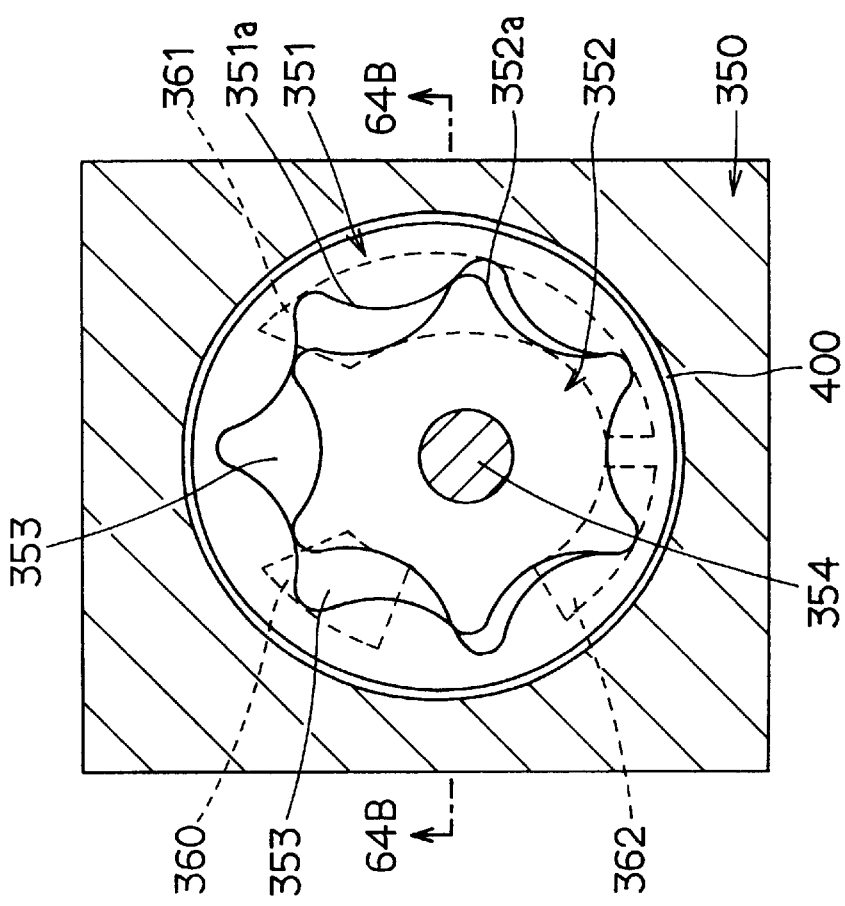

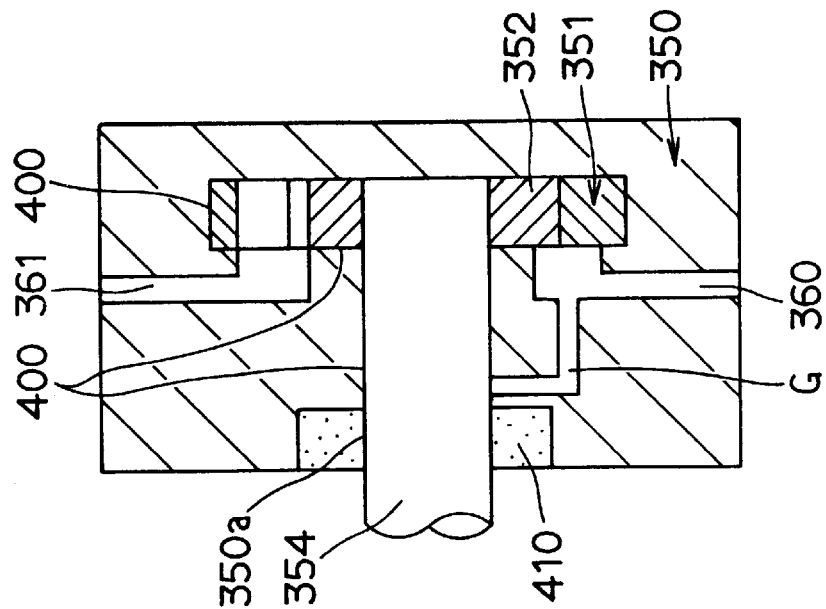
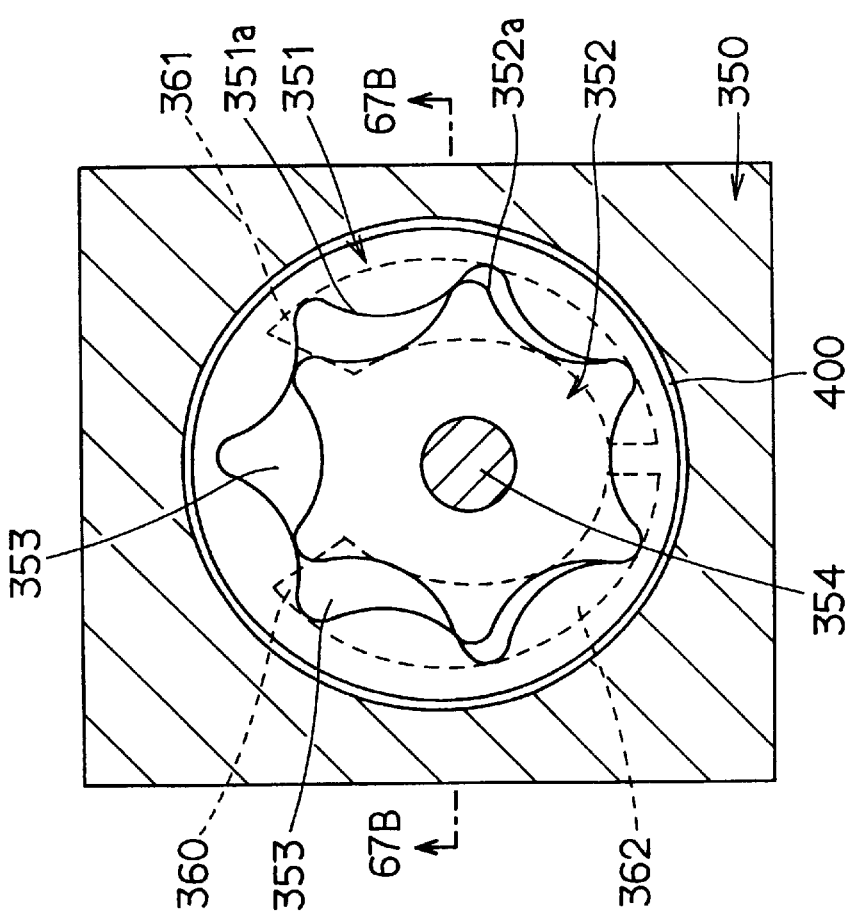

HYDRAULIC CIRCUIT HAVING A ROTARY TYPE PUMP AND BRAKE APPARATUS FOR A VEHICLE PROVIDED WITH THE SAME

CROSS REFERENCE TO RELATED APPLICATION

The present application is a continuation in part of U.S. patent application Ser. No. 08/773,765 filed on Dec. 24, 1996 now U.S. Pat. No. 6,024,420 and is based upon and claims the benefit of priority of the prior Japanese Patent Applications No. Hei 7-339555 filed on Dec. 26, 1995, No. Hei 8-63371 filed on Mar. 19, 1996, No. Hei 8-63372 filed on Mar. 19, 1996, No. Hei 8-63373 filed on Mar. 19, 1996, No. Hei 8-63374 filed on Mar. 19, 1996, No. Hei 8-63375 filed on Mar. 19, 1996, No. Hei 8-63376 filed on Mar. 19, 1996, No. Hei 8-72430 filed on Mar. 27, 1996, No. Hei 8-141479 filed on Jun. 4, 1996, No. Hei 8-274955 filed on Oct. 17, 1996, No. Hei 9-20716 filed on Feb. 3, 1997, the contents of which are incorporated by reference.

BACKGROUND OF THE INVENTION

1. Field of the Invention

The present invention relates to a hydraulic circuit having a rotary type pump and a brake apparatus provided with the hydraulic circuit having the rotary type pump.

2. Related Arts

A schematic view of a conventional inner-contact rotary type pump is shown in FIG. 67A. A sectional view taken on line 67B—67B in FIG. 67A is shown in FIG. 67B. As shown in FIG. 67A, an outer rotor 351 and an inner rotor 352 are assembled in a rotor chamber of a casing 350 of the inner-contact rotary type pump. An inner teeth portion 351a is formed on an inner periphery of the outer rotor 351 and an outer teeth portion 352a is formed on an outer periphery of the inner rotor 352. The inner teeth portion 351a and the outer teeth portion 352a are engaged to each other while forming a gap 353 therebetween. As shown in FIG. 67B, a center hole 350a is formed at a center of the casing 350 and a driving shaft 354 to be connected to the inner rotor 352 is inserted into the center hole 350a. The outer rotor 351 is rotatably disposed in the rotor chamber of the casing 350. An inlet port 360 and an outlet port 361 are formed in the rotor chamber of the casing 350, interposing the central axes of the rotors 351, 352 therebetween.

When the pump is driven, the inner rotor 352 rotates with the driving shaft 354. Along with the rotation of the inner rotor 352, the outer rotor 351 also rotates in the same direction as the inner rotor 352 since the outer teeth portion 352a and the inner teeth portion 351a are engaged to each other. During the rotations of the inner and outer rotors 351, 352, the volume of the gap 353 decreases and then increases to its original while the inner and outer rotors 351 and 352 make one rotation. As a result, fluid is drawn in the gap 353 from the inlet port 360 and discharged into the outlet port 361.

To rotate the inner and outer rotors 351, 352 smoothly, a clearance 400 is provided between the casing 350 and the outer rotor 351, inner rotor 352, or driving shaft 354. However, because fluid leakage occurs from the clearance 400, the central hole 350a is sealed by an oil seal 410 to prevent the fluid leakage. In addition, a return path G is provided in the casing 350 to return fluid within the clearance 400 to the inlet port 360. The fluid within the clearance 400 is low in pressure. However, if the fluid cannot escape out of the clearance 400, pressure in the clearance 400 becomes high due to the fluid injected thereinto. For this reason, the return path G is provided and, with the fluid returned to the inlet port 360 therethrough, pressurization of the clearance 400 and fluid leakage to outside can be prevented.

Fluid flows from a high pressure side to a low pressure side. Therefore, if the pressure of fluid within the inlet port 360 is higher than the pressure of fluid within the clearance 400, fluid having leaked into the clearance 400 can not return to the inlet port 360 through the return path G, thereby causing the pressurization of the clearance 400. Further, if the pressure of fluid within the clearance 400 exceeds an allowable pressure of the oil seal 410, fluid leakage to outside occurs.

Therefore, it is a first object of the present invention to provide hydraulic circuit having a rotary type pump which can prevent fluid leakage to outside.

It is a second object of the present invention to provide a brake system which can prevent fluid leakage to outside by using such a hydraulic circuit.

SUMMARY OF THE INVENTION

To achieve these objects, the hydraulic circuit according to the present invention has a rotary type pump comprising a rotor rotating with a driving shaft and a casing which holds the rotor and has an opening into which the driving shaft is inserted. The casing further comprises an inlet port through which fluid is introduced to the rotor, an outlet port through which fluid is discharged from the rotor, and a hydraulic path for leading fluid from the opening to the outside of the casing. An upstream side conduit is connected to the inlet port and a downstream side conduit is connected to the outlet port. A reservoir is provided to store fluid coming through the hydraulic path. A return conduit is disposed between the reservoir and the upstream side conduit in order that fluid stored in the reservoir is returned to the upstream side conduit. In the return conduit, a check valve is disposed to prevent the reverse flow of fluid from the upstream side conduit to the reservoir.

According to the above-described hydraulic circuit, because the fluid within the opening is stored in the reservoir by way of the hydraulic path, the pressurization of fluid in the opening can be prevented. As a result, it can be prevented that the pressure of fluid within the opening becomes higher than an endurance limit pressure of an oil seal which is provided in the casing and fluid leakage from the opening to outside can be avoided.

A control valve which is switchable between a flow-through position and a cut-off position may be provided in the upstream side conduit on a further upstream side than a connection point of the return conduit to the upstream side conduit. When the control valve is suitably switched to the cut-off position, the fluid pressure in the upstream side conduit can be made smaller than the fluid pressure in the reservoir. As a result, the fluid stored in the reservoir can be sent back to the upstream side conduit. Due to the presence of the control valve The volume of the reservoir can be reduced.

The hydraulic circuit may have a rotary type pump a comprising a casing which has an opening into which a driving shaft is inserted, a rotor which forms a plurality of spaces in the casing, each of spaces changing its volume when the rotor rotates with the driving shaft, and an oil seal for preventing fluid leakage from the opening to outside. The casing further comprises a first inlet port through which fluid is introduced to a first part of the plurality of spaces, an outlet port through which fluid is discharged from the spaces, and a second inlet port connected to the opening for introducing the fluid within the opening into a second part of the plurality of spaces, which is different from the first part of the plurality of spaces. An upstream side conduit is connected to the first inlet port and a downstream side conduit is connected to the outlet port.

As described above, because the second inlet port is provided separately from the first inlet port, the fluid within the opening is successively drawn in the second part of the plurality of spaces regardless of the fluid pressure of the upstream side conduit. Therefore, the pressurization of fluid within the opening can be prevented.

Further, the hydraulic circuit may have a rotary type pump comprising a rotor rotating with a driving shaft, a casing which holds the rotor and has an opening into which the driving shaft is inserted, and an oil seal for preventing fluid leakage from the opening to outside. The casing further comprises an inlet port through which fluid is introduced to the rotor, an outlet port through which fluid is discharged from the rotor and a return path connecting the opening to the inlet port. A pressure-regulating valve is disposed in an upstream side conduit connected to the inlet port. The pressure-regulating valve regulates the pressure of fluid to be introduced into the inlet port so as to maintain at a predetermined pressure or less. Therefore, the fluid leaking into the opening can return to the inlet port (upstream side conduit). The fluid pressure applied to the oil seal can be held to be lower than the endurance limit pressure of the oil seal.

Any one of hydraulic circuits described above can be incorporated in a brake system. The brake system has a brake fluid pressure producing device, a wheel braking force generating device, a main conduit connecting the wheel braking force generating device to the brake fluid pressure producing device, and an auxiliary conduit connecting said brake fluid pressure producing device to a midway of the main conduit. The hydraulic circuit is disposed in the auxiliary conduit. The upstream side conduit of the hydraulic circuit is connected to the brake fluid pressure producing device and the downstream side conduit thereof is connected to the main conduit. In this connection, by driving the rotary type pump, brake fluid can be drawn from the brake fluid pressure producing device and the rotary type pump can produce brake fluid pressure irrespective of the braking operation of a driver. Therefore, traction control and the like can be carried out by using brake fluid pressure produced by the rotary type pump.

Further, the brake fluid pressure in the auxiliary conduit becomes high due to brake fluid pressure produced by a braking operation of a driver. However, even if high brake fluid pressure is applied to the inlet port of the rotary type pump, fluid leakage to outside can be reliably prevented.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIGS. 47A and 47B are characteristic diagrams indicating a mode of operation of the twenty-second embodiment;

FIG. 48 is a flowchart indicating control processing of a twenty-third embodiment;

FIG. 51 is a flowchart according to the twenty-fourth embodiment;

FIGS. 57A to 57H are time charts indicating operation of the brake control apparatus of the twenty-fifth embodiment;

FIG. 62A is a sectional view of the rotary type pump 40 of the twenty-seventh embodiment;

FIG. 62B is a sectional view taken on line 62B—62B in FIG. 62A;

FIG. 64A is a sectional view of the rotary type pump 40 of the twenty-eighth embodiment;

FIG. 64B is a sectional view taken on line 64B—64B in FIG. 64A;

FIG. 67A is a sectional view of a conventional rotary type pump; and

FIG. 67B is a sectional view taken on line 67B—67B in FIG. 67A.

DETAILED DESCRIPTION OF THE PREFERRED EMBODIMENTS

A first embodiment of a brake control apparatus according to the present invention will be described hereinafter with reference to the drawings.

Figure 1:
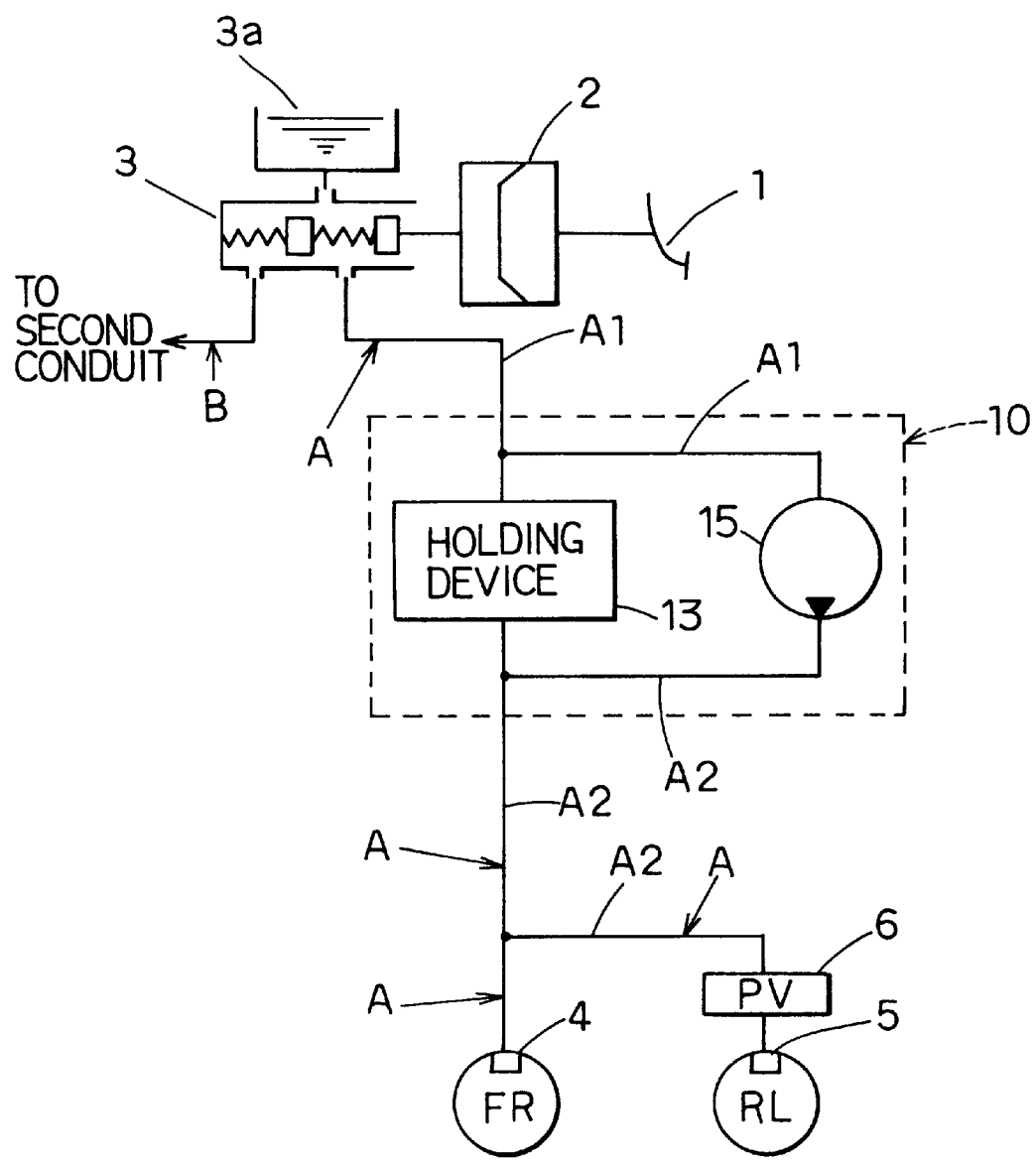
FIG. 1 is a model diagram indicating a first embodiment according to the present invention.

FIG. 1 is a structural view indicating the first embodiment according to the present invention. In the first embodiment, the brake control apparatus is applied in a vehicle of a diagonal brake-fluid conduit system provided with respective brake-fluid conduits of connecting front-right wheel cylinder with rear-left wheel cylinder and connecting front-left wheel cylinder with rear-right wheel cylinder in a front-wheel drive four-wheeled vehicle.

In FIG. 1, a brake pedal 1 depressed by a driver when applying braking force to the vehicle is connected to a booster 2, and depression force applied to the pedal 1 and pedal stroke thereof are conveyed to this booster 2. The booster 2 has at least two chambers, a first chamber and a second chamber, and for example the first chamber can be set as an atmospheric-pressure chamber and the second chamber can be set as a vacuum chamber. Intake-manifold vacuum of an engine, vacuum generated by a vacuum pump or the like is employed as the vacuum introduced in the vacuum chamber. Accordingly, this booster 2 directly boosts the driver's pedal depression or pedal stroke by a pressure differential of the atmospheric-pressure chamber and the vacuum chamber. The booster 2 has a push rod or the like to convey the depression force or pedal stroke boosted in this way to a master cylinder 3, and this push rod generates master-cylinder pressure PU by compressing a master piston disposed on the master cylinder 3. The master cylinder 3 is provided with an independent master reservoir 3a to supply brake fluid to the master cylinder 3 or to accumulate excess brake fluid from the master cylinder 3.

In this way, an ordinary vehicle is provided with the brake pedal 1, booster 2, master cylinder 3, and so on as a brake-fluid pressure-generating device for imparting braking force to the vehicle body.

The master-cylinder pressure PU generated in the master cylinder 3 is conveyed to brake fluid within a first conduit A linking the master cylinder 3 and a first wheel cylinder 4 disposed in the front-right wheel FR to impart braking force to this wheel, and the master 3 and a second wheel cylinder 5 disposed in the rear-left wheel RL to impart braking force to this wheel. The master-cylinder pressure PU is similarly conveyed also to a second conduit linking respective wheel cylinders disposed in the front-left wheel and the rear-right wheel to the master cylinder 3. However, because structure similar to the first conduit A can be employed, detailed description will be omitted.

The first conduit A is made up from two parts separated by a pressure-amplifying device 10 disposed in this first conduit A. That is to say, the first conduit A has a first conduit part A1 to receive the master-cylinder pressure PU in the interval from the master cylinder 3 to the pressure-amplifying device 10 and a second conduit part A2 in the interval from the pressure-amplifying device 10 to the several wheel cylinders 4 and 5.

The pressure-amplifying device 10 moves brake fluid of the first conduit part A1 to the second conduit part A2 and holds the pressure at the second conduit part A2 at second brake-fluid pressure PL when the pedal 1 is depressed and the master-cylinder pressure PU is generated within the first conduit A. According to this first embodiment, this pressure-amplifying device 10 is made up of a holding device 13 and a pump 15 which will be described later. Additionally, in the structure of the first conduit A, the first conduit part A1 is formed between the holding device 13 and the master cylinder 3 as well as the pump 15 and the master cylinder 3. The second conduit part A2 is formed between the several wheel cylinders 4 and 5 and holding device 13 as well as the several wheel cylinders 4 and 5 and the pump 15. Furthermore, a normal proportioning control valve 6 as well-known is disposed at the second conduit part A2 to operate so that the brake-fluid pressure applied to the second wheel cylinder 5 on the rear-left wheel RL side becomes smaller than the brake-fluid pressure (i.e., the master-cylinder pressure PU) applied to the first wheel cylinder 4 on the front-right wheel FR. This normal proportioning control valve 6 is provided to prevent the rear wheel, as far as is possible, from falling into a locking state earlier than the front wheel in a case where load movement of the vehicle or the like has occurred during vehicle braking, but elimination is also possible.

The pump 15 is connected within the first conduit A in parallel with the holding device 13, and takes in brake fluid from the first conduit part A1 and discharges brake fluid to the second conduit part A2 during generation of the master-cylinder pressure PU. That is to say, the pump 15 and the holding device 13 are structured as an example of a brake-fluid moving device to move the brake fluid in the first conduit part A1 to the second conduit part A2 when the master-cylinder pressure PU has been generated.

A plunger pump utilized in an ordinary antiskid apparatus or the like may be employed as this pump 15, or a compressor or the like may be employed as the pump 15. Additionally, the pump 15 may be constantly driven during generation of the master-cylinder pressure PU, or may be driven in accordance with for example pedal depression force, pedal stroke of the brake pedal 1 or the master-cylinder pressure PU. Additionally, the pump 15 may be driven by a motor (not illustrated) utilized in an ordinary antiskid apparatus or the like.

In a case where brake fluid has been moved from the first conduit part A1 to the second conduit part A2 by the pump 15 and the brake-fluid pressure of the second conduit part A2 has become the second brake-fluid pressure PL which is greater than the master-cylinder pressure PU, the holding device 13 acts to maintain this differential pressure (PL−PU). In a case where the driver's foot has been removed from the brake pedal 1 and the master-cylinder pressure PU has been released, it is preferred that the brake fluid which had been applying the second brake-fluid pressure PL to the wheel cylinders 4 and 5 be returned to the master cylinder 3 side. At this time, the brake fluid may be returned through this holding device 13, or the brake fluid may be returned by detecting that the pedal 1 has entered a nondepressed state on a basis of output from a brake switch or the like, and changing a two-way valve or the like connected in parallel to the holding device 13 from an interrupted state to a communicated state.

In this way, the pressure-amplifying device 10 provided with the pump 15 and the holding device 13 moves the brake fluid of the first conduit part A1 which has assumed the same pressure as the master-cylinder pressure PU accompanying depression of the brake pedal 1 to the second conduit part A2, reduces the brake-fluid pressure within the first conduit part A1, i.e., the master-cylinder pressure PU. The pressure-amplifying device 10 simultaneously maintains the differential pressure of the amplified second brake-fluid pressure PL within the second conduit part A2 and the master-cylinder pressure PU. The pressure-amplifying device 10 performs pressure amplification in this way.

The second brake-fluid pressure PL which has been caused to be greater than the master-cylinder pressure PU is applied to the several wheel cylinders 4 and 5, so that high braking force is ensured.

A mode of operation according to the brake apparatus structured as was described above will be described hereinafter.

The pump 15 is driven when master-cylinder pressure PU has been generated during vehicle braking. The brake fluid at the first conduit part A1 is moved to the second conduit part A2 due to the drive of the pump 15. As a result, the master-cylinder pressure PU is reduced, and increase in master-cylinder pressure PU is suppressed even in a case where the driver has depressed the pedal 1 still more forcefully. Accordingly, reaction force transmitted to the driver through the pedal 1 is lessened by the master-cylinder pressure PU not becoming excessively great. Accordingly, the load for generating master-cylinder pressure PU by the driver can be alleviated, and the load applied to the master cylinder 3 and the like to generate the master-cylinder pressure PU also can be alleviated. Accordingly, the master-cylinder pressure PU is suppressed as was described above, but simultaneously the brake-fluid pressure applied to the wheel cylinders 4 and 5 is increased by the pressure-amplifying device 10 as the brake-fluid moving device. Therefore, vehicle braking force can sufficiently be ensured.

Because pressure amplification of the second conduit part A2 is performed utilizing the brake fluid within the first conduit part A1, the brake-fluid quantity returned to the master cylinder 3 from the first conduit A when the driver has released the pedal 1 comes to be equivalent to the brake-fluid quantity originally introduced into the first conduit A from the master cylinder 3. Accordingly, return of brake fluid to the master cylinder 3 also can be realized without providing excessive brake fluid to the master cylinder 3.

A specific structure and mode of operation of the above-described holding device 13 will variously be indicated hereinafter with reference to FIG. 2A through FIG. 5B.

Figure 2A:
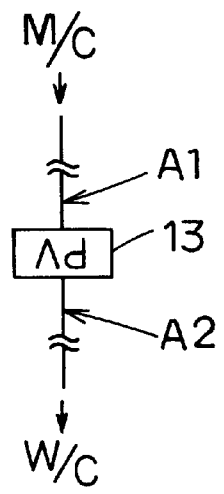
FIG. 2A is a drawing indicating detailed structure of a holding device in the first embodiment.

FIG. 2A is an example of structure of the holding device 13 employing a proportioning control valve (P valve).

Figure 2B:
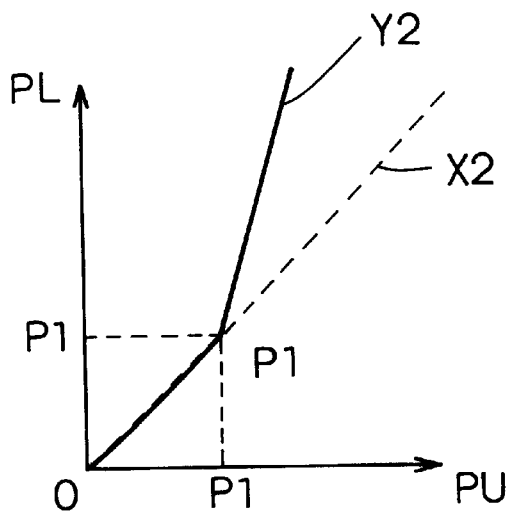
FIG. 2B is a graph illustrating characteristic of the holding device.

As shown in FIG. 2A, the proportioning control valve 13 is connected in reverse at the location of the holding device 13 in FIG. 1. The proportioning control valve 13 ordinarily acts to convey basic pressure of the brake fluid to a downstream side while attenuating the brake-fluid pressure with a predetermined attenuation ratio when the brake fluid is flowing in a normal direction. Accordingly, when the proportioning control valve 13 is connected in reverse as shown in FIG. 2A, the second conduit part A2 side comes to generate the foregoing basic pressure and the first conduit part A1 side becomes the downstream side when the brake fluid flows from the second conduit part A2 to the first conduit part A1 through the proportioning control valve 13. Accordingly, as shown in FIG. 2B, in a case where the brake-fluid pressure PL within the second conduit part A2 has become not less than split-point pressure P1 established for the proportioning control valve 13 accompanying increase in the brake-fluid quantity within the second conduit part A2 due to the drive of the pump 15, the second brake-fluid pressure PL within the second conduit part A2 is conveyed to the first conduit part A1 in accordance with the slope of line Y2, i.e., the predetermined attenuation ratio. Accordingly, when the master-cylinder pressure PU in the first conduit part A1 is seen as a reference, the second brake-fluid pressure PL increased by discharge of the pump 15 due to this proportioning control valve 13 comes to be held in a state amplified in an inverse relationship with the above-described predetermined attenuation ratio. Additionally, because brake-fluid pressure corresponding to the brake-fluid pressure of the second conduit part A2, i.e., the second brake-fluid pressure PL, is held within the first conduit part A1 as well, a suitable master-cylinder pressure PU can be assured even if the pump 15 should be driven excessively. Accordingly, an abnormal decline in the brake-fluid pressure of the first conduit part A1, i.e., the master-cylinder pressure PU, and occurrence of an abnormal increase in the stroke of the pedal 1 and a no-load state of pedal reaction force can be prevented.

The master-cylinder pressure PU declines when depression of the pedal 1 by the driver has weakened. However, at this time, the second brake-fluid pressure PL also declines through the proportioning control valve 13 accompanying the decline in the master-cylinder pressure PU. Thus, brake operation that gives high regard to the intention of the driver can be obtained. As is understood from FIG. 2B, in a state where the second brake-fluid pressure PL has a smaller brake-fluid pressure than the split-point pressure P1 of the proportioning control valve 13, the second brake-fluid pressure PL is in a state of having passed through the proportioning control valve 13 and been released to the first conduit part A1 side. Consequently, no differential pressure is established between the first conduit part A1 and the second conduit part A2. Additionally, because the second brake-fluid pressure PL is adjusted in accordance with the master-cylinder pressure PU when the second brake-fluid pressure PL is smaller than the split-point pressure P1, no differential pressure is established between the master-cylinder pressure PU and the second brake-fluid pressure PL. That is to say, in a case where the master-cylinder pressure PU or the second brake-fluid pressure PL is smaller than the split-point pressure P1, relationship between the master-cylinder pressure PU and the second brake-fluid pressure PL in FIG. 2B comes to accord with line X2 indicating that this relationship is one to one.

Accordingly, by setting the split-point pressure P1 of the proportioning control valve 13 to a pressure which is high to a certain extent, the second brake-fluid pressure PL applied to the wheel cylinders 4 and 5 can be increased in comparison with the master-cylinder pressure PU only in a case where high braking force is required and the brake pedal 1 has been forcefully depressed.

When the split-point pressure P1 has been established at 0, a differential pressure is ensured so that the second brake-fluid pressure PL is unfailingly increased with respect to the master-cylinder pressure PU and the second brake-fluid pressure PL becomes greater than the master-cylinder pressure PU when brake fluid is moved by the pump 15.

In a case where brake fluid flows from the first conduit part A1 to the second conduit part A2 through the proportioning control valve 13, brake-fluid pressure similar to the basic pressure is conveyed to the downstream side without performing attenuation of the brake-fluid pressure. According to this embodiment, the basic-pressure side of the proportioning control valve 13 is the first conduit part A1 side, and the downstream side is the second conduit part A2 side. That is to say, a case where brake fluid flows from the master cylinder 3 side to the wheel cylinder 4 and 5 side corresponds. Accordingly, when the proportioning control valve 13 is connected in reverse as shown in FIG. 2A, as in this embodiment, at least the master-cylinder pressure PU can be applied to the wheel cylinders 4 and 5 even if a situation should occur wherein the master-cylinder pressure PU cannot be increased to the second brake-fluid pressure PL due to faulty drive or the like of the pump 5.

When the proportioning control valve 13 is employed as the holding device in this way, not only can a pressure-amplifying operation of the brake-fluid pressure applied to the several wheel cylinders 4 and 5 be realized with the mechanical structure, but because the foregoing split-point pressure P1 is establishable as a matter of mechanical design, pressure-amplifying operation which accords with the intention of the driver can be realized with substantially no electrical control. For example, pressure-amplifying operation is not realized when the master-cylinder pressure PU is not more than the split-point pressure P1, even when pump drive is started in accompaniment with depression of the brake pedal 1 and the pump 15 is driven constantly during vehicle braking. That is to say, when the value of the split-point pressure P1 is established at a master-cylinder pressure PU whereat it can be estimated that the brake pedal 1 has been forcefully depressed and the driver requires large braking force, pressure-amplifying operation is executed and brake assistance can be realized with no electrical control when the master-cylinder pressure PU has risen to this split-point pressure P1 or more. Furthermore, there exists the advantage that it is sufficient to utilize a brake switch or the like already ordinarily provided on the vehicle in determination of execution of pump drive, with no need to add sensor components, complex control, or the like.

A load-sensing proportioning valve as well-known may be utilized as the proportioning control valve 13. In this case, it is possible to vary the amplifying effect of the second brake-fluid pressure, i.e., the split-point pressure P1, in correspondence with vehicle weight which changes according to loaded weight and so on.

Figure 3A:
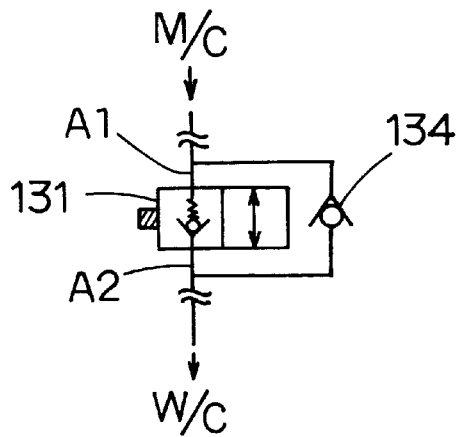
FIG. 3A is a drawing indicating detailed structure of a modification of the holding device.
Figure 3B:
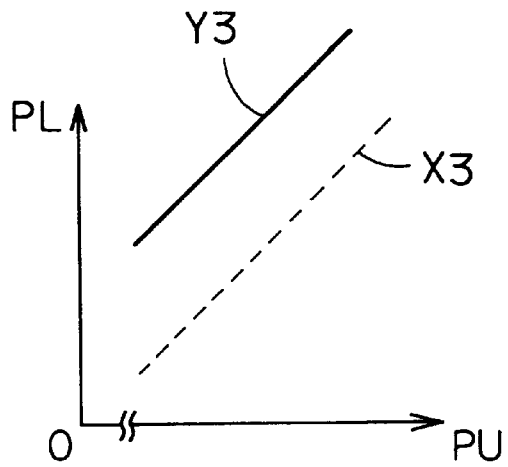
FIG. 3B is a graph illustrating characteristic of the modification of the holding device.

Next, mode of operation and effects when employing a two-way valve 131 having a port having a differential-pressure valve and a port to realize a communicated state as the holding device 13 in FIG. 1 will be described utilizing FIGS. 3A and 3B.

When a needle valve of the two-way valve 131 is moved and the two-way valve 131 takes a position as shown in FIG.

3 A in a case where the brake pedal 1 is depressed and the master-cylinder pressure PU is generated, flow of brake fluid from the first conduit part A1 side to the second conduit part A2 side is prohibited. In contrary, flow of brake fluid in the direction from the second conduit part A2 to the first conduit part A1 is permitted in a case where differential pressure of the second brake-fluid pressure PL at the second conduit part A2 and the master-cylinder pressure PU at the first conduit part A1 has reached a predetermined value. Accordingly, when the pump 15 has been driven, differential pressure between the second brake-fluid pressure PL at the second conduit part A2 and the master-cylinder pressure PU at the first conduit part A1 is maintained to a predetermined pressure. The second brake-fluid pressure PL which is higher than the master-cylinder pressure PU (shown by a line X3 in FIG. 3B) by a value corresponding to the predetermined pressure is applied to the several wheel cylinders 4 and 5, as shown by a line Y3 in FIG. 3B.

When braking operation by the driver has finished, the two-way valve 131 is switched to a communicated state and the brake fluid establishing the second brake-fluid pressure PL is released to the master cylinder 3 side.

A check valve 134 is connected in parallel to the two-way valve 131. This check valve 134 allows flow of brake fluid from the first conduit part A1 to the second conduit part A2. Accordingly, the second brake-fluid pressure PL is maintained as it is higher than the master cylinder pressure PU even in a case where the second brake-fluid pressure PL has been increased with respect to the master-cylinder pressure PU. At least the master-cylinder pressure PU can be assured to be applied to the wheel cylinders 4 and 5 due to the check valve 134 being connected in this way, even if a problem that the two-way valve 131 is held at the valve position of the differential-pressure valve should occur or a faulty drive of the pump 15 should occur.

Next, mode of operation and effects in a case where a restrictor 132 is employed as the holding device 13 will be described with reference to FIGS. 4A and 4B.

Figure 4A:
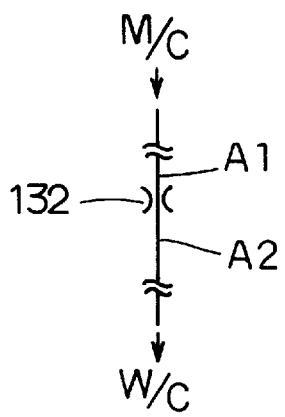
FIG. 4A is a drawing indicating detailed structure of an another modification of the holding device.

When the restrictor 132 is disposed in the first conduit part A1 as shown in FIG. 4A, the brake-fluid pressure of the second conduit part A2 can be caused to be brake-fluid pressure (the second brake-fluid pressure) which is higher than the master-cylinder pressure PU within the first conduit part A1 due to flow resistance of the restrictor 132 when brake fluid within the first conduit part A1 is moved to the second conduit part A2 by the pump 15.

Figure 4B:
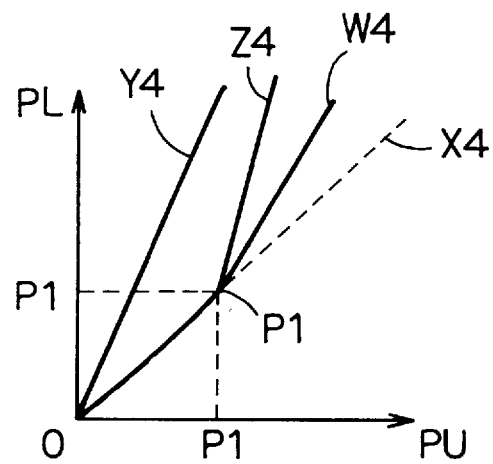
FIG. 4B is a graph illustrating characteristic of the another modification of the holding device.

In this case, it is possible to increase the second brake-fluid pressure PL at a certain uniform ratio with respect to the master-cylinder pressure PU, as shown by a line Y4 in FIG. 4B, according to the drive method of the pump 15. That is to say, when the pump 15 is driven at a uniform discharge capacity, the characteristic indicated by line Y4 in FIG. 4B can be exhibited. Additionally, when the pump 15 is driven after the brake-fluid pressure of either the master-cylinder pressure PU or the second brake-fluid pressure PL has reached a predetermined pressure P1, without driving the pump 15 until the brake-fluid pressure of either the master-cylinder pressure PU or the second brake-fluid pressure PL becomes the predetermined pressure P1, the characteristic of a line Z4 or line W4 in FIG. 4B can be obtained. The characteristic of line Z4 or the characteristic of line W4 can be obtained by varying the discharge capacity of the pump 15.

Figure 5A:
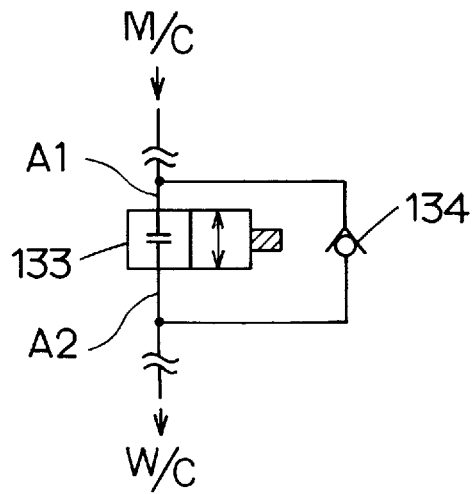
FIG. 5A is a drawing indicating detailed structure of the other modification of the holding device.
Figure 5B:
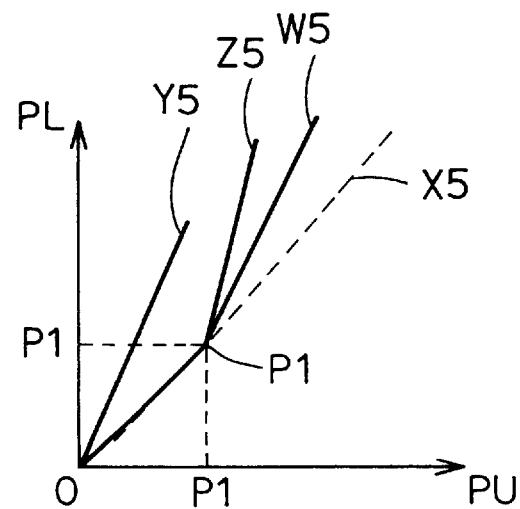
FIG. 5B is a graph illustrating characteristic of the other modification of the holding device.

Next, mode of operation and effects will be described when employing a two-way valve 133 provided merely with an interrupted position and a communicated position as the holding device 13, as shown in FIGS. 5A and 5B.

When the pump 15 is driven after generation of the master-cylinder pressure PU, assurance of differential pressure of the second brake-fluid pressure PL and the master-cylinder pressure PU is realized by interrupting the flow of brake fluid between the first conduit part A1 and the second conduit part A2 by this two-way valve 133 as shown in FIG. 5A. Driving of the pump 15 may be performed at this time so that a uniform discharge capacity is maintained. In this case, when the interrupted state and the communicated state are variably controlled with a predetermined duty ratio with respect to the valve position of the two-way valve 133, the slope of the relationship between the second brake-fluid pressure PL and the master-cylinder pressure PU can be varied as is indicated by line Y5 or line Z5 in FIG. 5B. Further, execution of duty control of the two-way valve 133 may be started in accordance with the master-cylinder pressure PU or the second brake-fluid pressure PL. In this case, the master-cylinder pressure PU and the second brake-fluid pressure PL are in a one-to-one relationship until the master-cylinder pressure PU and the second brake-fluid pressure PL become the predetermined pressure P1 as is indicated by line Z5 or line W5. In a case where the master-cylinder pressure PU and the second brake-fluid pressure PL have become the predetermined pressure P1 or more, the second brake-fluid pressure PL is increased with respect to the master-cylinder pressure PU by variably controlling the communicated/interrupted state of the two-way valve 133.

Additionally, when execution of communication/interruption control of the two-way valve 133 is started at a uniform duty ration synchronously with the generation of the master-cylinder pressure PU while the pump is being driven at a uniform discharge capacity, an approximately linear pressure-ratio characteristic having a predetermined slope can be obtained, as is indicated by line Y5 in FIG. 5B.

Up through the description hereinabove, a characteristic in the relationship of the master-cylinder pressure PU and the second brake-fluid pressure PL as indicated by line Y5, line Z5, and line W5 was obtained by variably duty-controlling the two-way valve 133 while driving the pump 15 with uniform discharge capacity. However, it is possible also for example to execute the communication/interruption control of the two-way valve 133 at a uniform duty ratio. In this case, to obtain a characteristic as is indicated in line Y5, line Z5 or line W5, the discharge capacity of the pump 15 is varied. Furthermore, to uniformly or variably control the pump discharge capacity, temperature of the brake fluid or a voltage value or the like for pump drive may be controlled so as to adjust pump capacity.

Next, a second embodiment further adding an antiskid system 30 to a brake control apparatus according to the present invention will be described with reference to FIG. 6. Description will be omitted of structure as well as mode of operation and effects which are similar to the first embodiment.

The antiskid system 30 (ABS system) is provided with a structure which will be described hereinafter. Firstly, a first pressure-increasing control valve 31 to control increase in pressure of brake fluid to the first wheel cylinder 4 and a second pressure-increasing control valve 32 to control increase in pressure of brake fluid to the second wheel cylinder 5 are disposed in the second conduit part A2. These first and second pressure-increasing control valves 31 and 32 are made up of a two-way valve which controls a communicated/interrupted state. Accordingly, when these two-way valves 31 and 32 have been controlled in a communicated state, brake-fluid pressure due to the master-cylinder pressure PU or the brake fluid discharged from the pump 15 can be applied to the several wheel cylinders 4 and 5.

During normal braking wherein antiskid control (ABS control) is not executed, these first and second pressure-increasing control valves 31 and 32 are constantly controlled to a communicated state.

A first pressure-reducing control valve 33 and a second pressure-reducing control valve 34 are respectively disposed in conduits linking the second conduit part A2 between the above-described first and second pressure-increasing control valves 31 and 32 and the several wheel cylinders 4 and 5 and a second reservoir hole 26 of a reservoir 20 which will be described later. These first and second pressure-reducing control valves 33 and 34 are caused to be constantly in an interruption state during normal braking.

Communication/interruption control of these first and second pressure-reducing control valves 33 and 34 is executed in a case where antiskid control has started and the first and second pressure-increasing control valves 31 and 32 have been driven in an interrupted state. In the state described earlier, when the first or second pressure-reducing control valve 33 or 34 has been caused to be in an interrupted state, the wheel-cylinder pressure of the corresponding wheel cylinder 4 or 5 is maintained. Additionally, when a locking state of a wheel has been detected, the first or second pressure-reducing control valve 33 or 34 is caused to be in a communicated state, and the wheel-cylinder pressure of the corresponding wheel cylinder 4 or 5 is reduced. At this time, brake fluid which has been applied to the wheel cylinder 4 or 5 passes through the first or second pressure-reducing control valve 33 or 34 and the second reservoir hole 26 and is stored within a reservoir chamber 27. As a result, the several wheel-cylinder pressures can be reduced.

Additionally, in a case where restraining a locking tendency of the wheel and increasing the wheel-cylinder pressure are desired, the wheel-cylinder pressure is increased utilizing brake fluid accumulated within the reservoir chamber 27. That is to say, the pump 15 takes in brake fluid from the second reservoir hole 26. The brake fluid discharged from the pump 15 passes through the first or second pressure-increasing control valve 31 or 32, and reaches the wheel cylinder 4 or 5. Thus, brake-fluid pressure is applied to the wheel cylinder 4 or 5.

When brake fluid is accumulated in the reservoir 20 during antiskid control in the way, the pump 15 takes in brake fluid from the second reservoir hole 26 and increases the brake-fluid pressure applied to the several wheel cylinders 4 and 5. The reservoir 20 is structured so that the flow of brake fluid between the interior of the reservoir 20 and the first conduit part A1 is interrupted in a case where brake fluid is accumulated within this reservoir 20.

Structure of the reservoir 20 will be described hereinafter.

Figure 6:
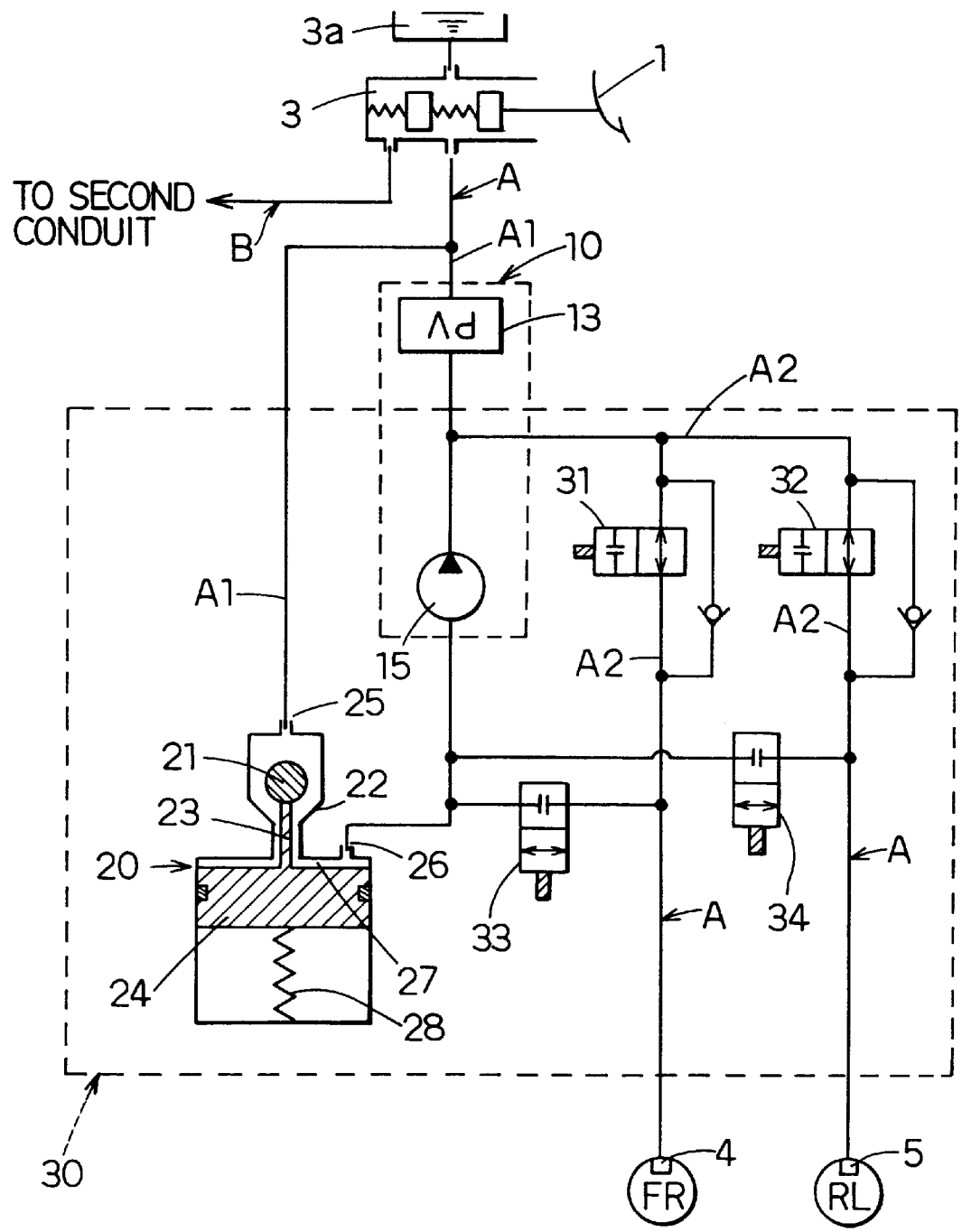
FIG. 6 is a structural view indicating a second embodiment of the present invention.

As shown in FIG. 6, the reservoir 20 is connected between the first conduit part A1 and the brake-fluid intake side of the pump 15. This reservoir 20 has a first reservoir hole 25 which is connected to the first conduit part A1 between the master cylinder 3 and the proportioning control valve 13. The reservoir 20 receives brake fluid from the first conduit part A1 which comes to have pressure equivalent to the master-cylinder pressure PU. A ball valve 21 is disposed further into the interior of the reservoir 20 than this reservoir hole 25. A rod 23 which has a predetermined stroke to move this ball valve 21 up or down is provided on an underside of this ball valve 21. A piston 24 interlocked with the rod 23 is provided within the reservoir chamber 27. This piston 24 slides downward in a case where brake fluid has flowed from the second reservoir hole 26, accumulating brake fluid within the reservoir chamber 27. Additionally, in a case where brake fluid has been accumulated in this way, the piston 24 moves downward. The rod 23 also moves downward in accompaniment thereto, and the ball valve 21 contacts a valve seat 22. Accordingly, when the ball valve 21 contact the valve seat by the brake fluid accumulated within the reservoir chamber 27, the communication between the intake side of the pump 15 and the first conduit part A1 is interrupted by the ball valve 21 and the valve seat 22. This ball valve 21 and the valve seat 22 constitute a similar mode of operation even in a state of ordinary braking prior to execution of antiskid control. That is to say, when the master-cylinder pressure PU has been generated in an ordinary braking state, brake fluid flows through the first conduit part A1 to the reservoir 20. However, when an amount of brake fluid corresponding to the stroke of the rod 23 has accumulated within the reservoir 20, the flow of brake fluid is interrupted by the ball valve 21 and the valve seat 22. Accordingly, the reservoir 20 is not filled with brake fluid during ordinary braking, and it is possible to cause brake fluid to be contained within the reservoir 20 during pressure-reduction in antiskid control.

As described above, because the ball valve 21 and the rod 23 are formed separately, a containing capacity within the reservoir 20 during pressure-reduction in antiskid control can be gained without the stroke of the rod 23 becoming exceedingly long.

When brake fluid within a reservoir chamber 27 has been consumed by the intake of the pump 15 during pressure-increasing in antiskid control, the piston 24 moves to the upper side, and the rod 23 pushes the ball valve 21 to the upper side in accompaniment thereto. Accordingly, the ball valve 21 is separated from the valve seat 22, and the intake side of the pump 15 and the first conduit part A1 are communicated. When communicated in this way, a mode of operation of a pressure-amplifying device 10 is executed; namely, the pump 15 takes in brake fluid from the first conduit part A1 and performs an increase in the wheel-cylinder pressure. Accordingly, there is immediate transfer to pressure-amplifying operation due to the pressure-amplifying device 10 and high braking force can be obtained, even in a case where optimal braking force cannot be obtained solely by the brake-fluid quantity within the reservoir 20, for example when the running road of the vehicle changes from a low-friction (low-$\mu$) road to a high-friction (high-$\mu$) road.

A spring 28 which compresses the piston 24 to the upper side and generates force which attempts to expel brake fluid within the reservoir chamber 27 is incorporated within the reservoir 20.

When antiskid control has been completed, brake fluid within the reservoir 20 may be returned through the proportioning control valve 13 to the master-cylinder 3 side by the pump 15 so as to empty the interior of the reservoir 20. When this is done, sufficient brake fluid can be accumulated within the reservoir 20 when subsequent antiskid control is executed and wheel-cylinder pressure is reduced. When spring force of the spring 28 is set to be a predetermined value or more, it becomes possible also to return brake fluid from the first reservoir hole 25 by this spring force.

When the reservoir 20 structured in this way is utilized, the pump 15 for heightening the second brake fluid pressure in the second conduit part A2 and the pump driven when the wheel-cylinder pressure in the antiskid system is increased or the brake fluid within the reservoir 20 is returned to the master-cylinder 3 side can be used in common.

If a three-port two-way valve which can switch a communication mode between a first mode communicating the intake side of the pump 15 and the reservoir 20 and a second mode communicating the intake side of the pump 15 and the first conduit part A1 is provided in the antiskid system 30, brake fluid accumulated within the reservoir 20 can be controlled to be less than a predetermined quantity. That is to say, when a detector detects the brake fluid quantity more than the predetermined quantity during ordinary braking or during operation of the pressure-amplifying device 10, the three-port two-way valve is driven to the first mode to reduce the brake fluid quantity within the reservoir 20. As a result, because the brake fluid quantity within the reservoir 20 is kept to the predetermined quantity or less, when antiskid control is executed, it is possible to immediately execute pressure reduction control in antiskid control.

A third embodiment according to the present invention will be described next with reference to FIG. 7 and FIG. 8.

The third embodiment relates to a brake control apparatus including an brake-fluid quantity amplifying device 40 in addition to the pressure-amplifying device 10 described in the first embodiment.

The brake-fluid quantity amplifying device 40 will be described with reference to FIG. 7. The brake-fluid quantity amplifying device 40 is provided with an independent reservoir 41 and an brake-fluid quantity amplifying pump 42 taking in brake fluid from the reservoir 41 and discharge the pressurized brake fluid to a second pressure chamber 47 within a pressure-proportioning cylinder 45.

In the pressure-proportioning cylinder 45, a first pressure chamber 46 into which the master-cylinder pressure PU from the first conduit part A1 is introduced, the second pressure chamber 47, and a third pressure chamber 48 are formed by a piston 49 disposed therein. The reservoir 41 is communicated with the second pressure chamber 47. However, when the brake pedal 1 has been depressed and a predetermined pressure has been generated in the master cylinder 3, the communication between the reservoir 41 and the pressure chamber 47 are interrupted by the piston 49 moving leftward in the drawing. Additionally, accompanying this movement of the piston 49, a discharge port of the brake-fluid quantity amplifying pump 42 and the second pressure chamber 47 are communicated. The brake-fluid pressure within the second pressure chamber 47 becomes high pressure. When the depression of the brake pedal 1 is weakened, the master-cylinder pressure PU falls down to a predetermined value, and the piston 49 causes the second pressure chamber 47 and the independent reservoir 41 to communicate as shown in FIG. 7, the brake-fluid pressure of the second pressure chamber 47 is released to the reservoir 41 side. At this time, the discharge port of the brake-fluid quantity amplifying pump 42 is interrupted by the piston 49 moving rightward in the drawing.

The third pressure chamber 48 and the second pressure chamber 47 are communicated via a brake-fluid quantity amplifying proportioning control valve 43. This brake-fluid quantity amplifying proportioning control valve 43 attenuates the brake-fluid pressure from the second pressure chamber 47 with a predetermined ratio and conveys the attenuated brake-fluid pressure to the third pressure chamber 48.

The relationship between the brake-fluid pressure introduced in the third pressure chamber 48 through the brake-fluid quantity amplifying proportioning control valve 43 and the brake-fluid pressure within the second pressure chamber 47 when the brake-fluid pressure of the second pressure chamber 47 has been caused to be high pressure by the brake-fluid quantity amplifying pump 42 is determined by the attenuation ratio established in the brake-fluid quantity amplifying proportioning control valve 43.

The piston 49 is moved laterally by the relationship between the master-cylinder pressure PU and the brake-fluid pressure in the third pressure chamber 48. When the brake fluid pressure in the third pressure chamber 48 is larger than the master-cylinder pressure PU, the second pressure chamber 47 communicates with the reservoir 41 and the communication of brake-fluid quantity amplifying pump 42 and the second pressure chamber 47 is prohibited. As a result, the brake fluid pressure in the second pressure chamber 47 is reduced. The brake fluid pressure in the third pressure chamber 48 is also reduced in response to decrease of the brake fluid pressure in the second pressure chamber 47. However, the brake fluid pressure in the third pressure chamber 48 is lower than the brake fluid pressure in the second pressure chamber 47 by a value corresponding to an attenuation ratio of the brake-fluid quantity amplifying proportioning control valve 43. When the brake fluid pressure in the third pressure chamber 48 reduces below the master-cylinder pressure PU, the piston 49 moves leftward in the drawing. As a result, the brake-fluid quantity amplifying pump 42 is communicated with the second pressure chamber 47 and the communication between the second pressure chamber 47 and the reservoir 41 is interrupted. Accordingly, the brake-fluid pressure in the second pressure chamber 47 is increased by the pressurized brake fluid discharged from the brake-fluid quantity amplifying pump 42. In this way, the brake-fluid pressure in the second pressure chamber is kept to the pressure higher than the master cylinder pressure PU by the value corresponding to the attenuation ratio of the brake-fluid quantity amplifying proportioning control valve 43.

Communication or interruption of the brake-fluid within the second pressure chamber 47 to the second conduit part A2 is controlled by a brake-fluid quantity amplifying control valve 44. This brake-fluid quantity amplifying control valve 44 is normally caused to be in an interrupted state, but is controlled to a communicated state according to vehicle behavior such as a slippage state of a wheel. When the brake fluid quantity amplifying control valve 44 has been caused to be in a communicated state, high-pressure brake fluid flows through the brake-fluid quantity amplifying control valve 44 to the several wheel cylinders 4 and 5. Further, the brake-fluid quantity amplifying control valve 44 is not exclusively limited to being controlled according to the vehicle behavior, but may be controlled in accordance with a state of the brake pedal 1. For example, the brake-fluid quantity amplifying control valve 44 is controlled to a communicated state when the brake pedal 1 has been depressed and a predetermined period of time has elapsed.

In the brake control apparatus having the brake-fluid quantity amplifying device 40, brake-fluid pressure even higher than the second brake-fluid pressure PL of the second conduit part A2 increased by the pressure-amplifying device 10 can be realized. Additionally, brake-fluid quantity comes to be amplified with respect to the brake fluid in the second conduit part A2 as a result that brake fluid is supplied to the second conduit part A2 from the independent reservoir 41. When the operation of the brake-fluid quantity amplifying device 40 is started subsequently to termination of operation of, for example, the pressure-amplifying device 10, still greater braking force can be ensured by the brake-fluid quantity amplifying device 40 while maintaining a lowered state of depression force due to the pressure-amplifying device 10 and causing only a light burden to remain with the driver. At this time, suitable reaction force can be caused to remain with pedal feel without further alleviation of the reaction force being performed, due to the operation of the pressure-amplifying device 10 being terminated. Additionally, when switched from operation of the pressure-amplifying device 10 to operation of the brake-fluid quantity amplifying device 40, reduction of the brake-fluid quantity of the first conduit part A1, i.e., reduction of the brake-fluid pressure within the first conduit part A1, by the pressure-amplifying device 10 is terminated. The pressure of the second conduit part A2 is increased due to brake-fluid quantity amplification, and so it becomes possible to prevent excessive lengthening of the pedal stroke while ensuring braking force.

Amplification of the brake-fluid quantity with respect to the second conduit part A2 by the brake-fluid quantity amplifying device 40 and movement and pressure-increasing of brake fluid from the first conduit part A1 to the second conduit part A2 by the pressure-amplifying device 10 may be alternately switched and controlled or simultaneously executed. In this case, alleviation of the reaction force and amplification of the pressure applied to the wheel cylinders 4 and 5 by the pressure-amplifying device 10 can be realized. At the same time, it is possible to prevent the reaction force from the brake pedal 1 to an extremely low value and impart an appropriate reaction force to the driver by the pressure-amplifying device 10.

A modification of the above-described third embodiment will be described next with reference to FIG. 8.

Figure 7:
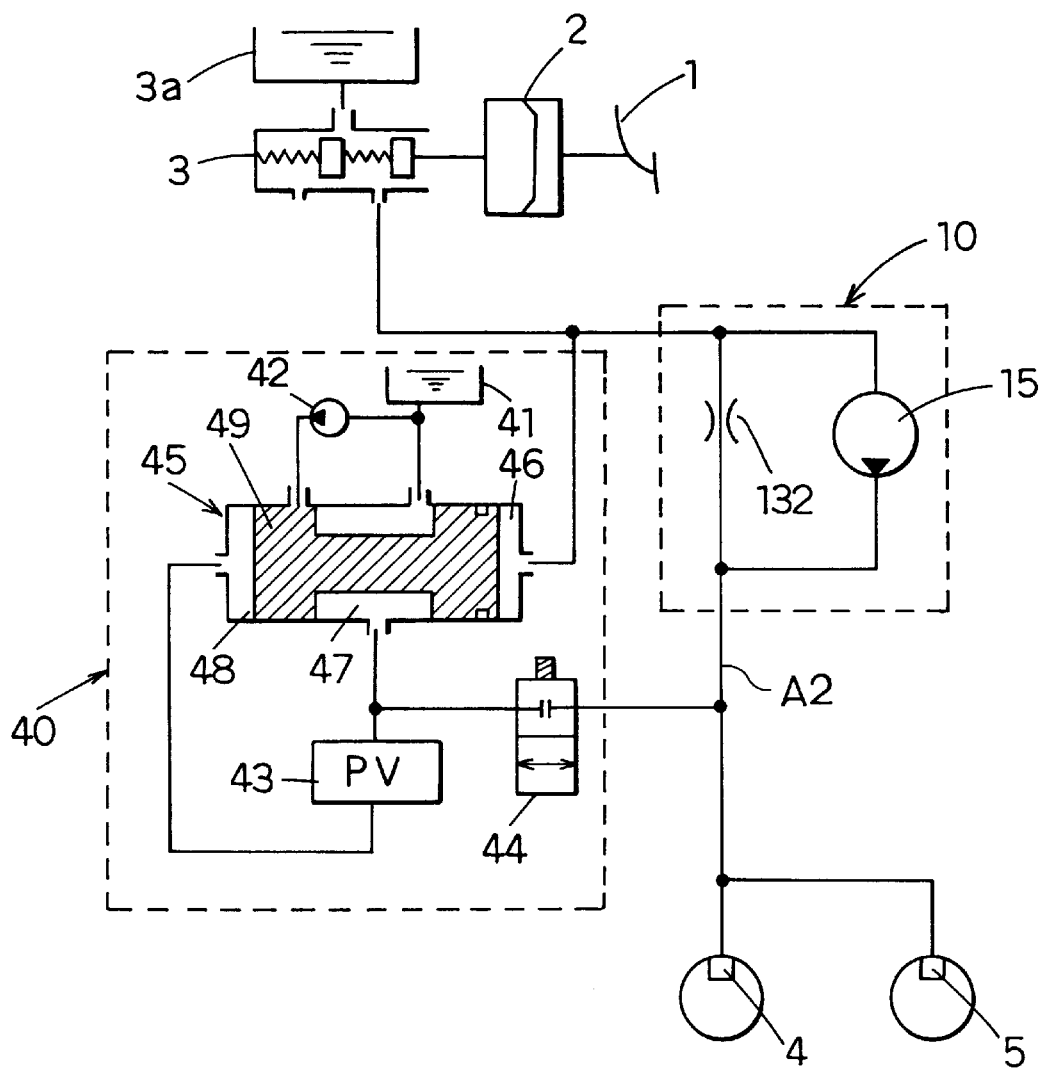
FIG. 7 is a structural view indicating a third embodiment of the present invention.
Figure 8:
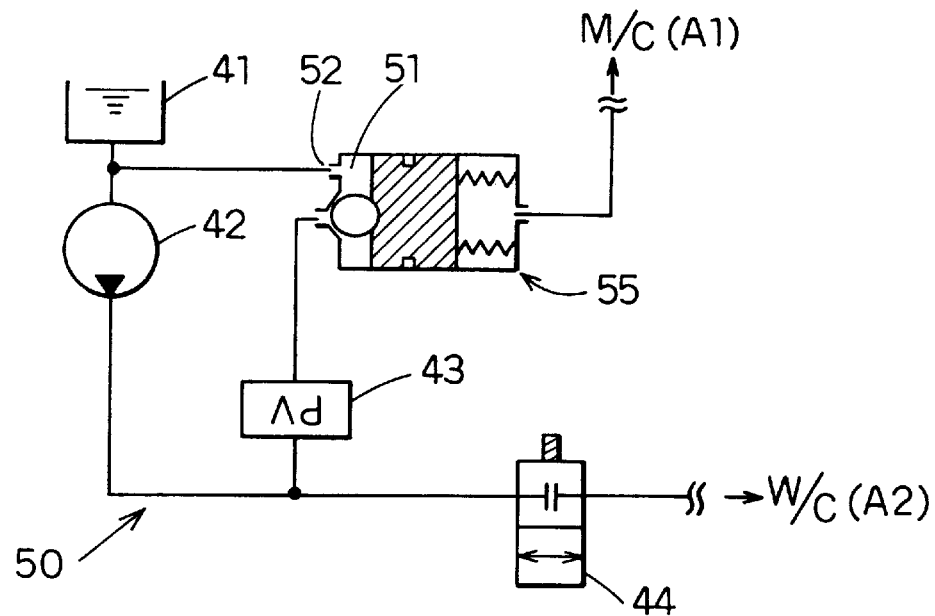
FIG. 8 is a modification of a brake-fluid amplifying device in the third embodiment.

FIG. 8 indicates a brake-fluid quantity amplifying device 50 which can be substituted for the brake-fluid quantity amplifying device 40 in FIG. 7.

This brake-fluid quantity amplifying device 50, similarly to the foregoing third embodiment, is provided with an independent reservoir 41 and a brake-fluid quantity amplifying pump 42 which can taken in brake fluid from the reservoir 41 and discharge the brake fluid under high pressure. The discharge line of the brake-fluid quantity amplifying pump 42 is connected to the second conduit part A2 via the brake-fluid quantity amplifying control valve 44. A brake-fluid quantity amplifying proportioning control valve 43 which attenuates the brake-fluid pressure with a predetermined attenuation ratio when high-pressure brake fluid from the brake-fluid quantity amplifying pump 42 has passed is connected to a conduit extending from the conduit between the discharge side of the brake-fluid quantity amplifying pump 42 and the brake-fluid quantity amplifying control valve 44. A check valve 55 is disposed in a conduit connecting the brake-fluid quantity amplifying proportioning control valve 43 and the first conduit part A1. This check valve 55 acts so that the master-cylinder pressure PU from the first conduit part A1 side and the pressure of the brake fluid existing between the brake-fluid quantity amplifying proportioning control valve 43 and the check valve 55 become substantially identical. That is to say, the check valve 50 acts so that the master-cylinder pressure PU and the brake-fluid pressure attenuated by the brake-fluid quantity amplifying proportioning control valve 43 in brake fluid discharged by the brake-fluid quantity amplifying pump 42 become substantially identical in pressure. In more detail, the check valve 50 compares the master-cylinder pressure PU and the brake-fluid pressure attenuated by the brake-fluid quantity amplifying proportioning control valve 43. When the brake-fluid pressure between the brake-fluid quantity amplifying proportioning control valve 43 and the check valve 55 has become higher than the master-cylinder pressure PU, the brake-fluid pressure in a fluid chamber 51 in the check valve 55 is reduced based on the fact that the brake fluid returns to the reservoir 41 via a hole 52. As a result, brake-fluid pressure equivalent to the master-cylinder pressure PU is obtained in the fluid chamber 51. When the brake-fluid pressure in the fluid chamber becomes below the master-cylinder pressure PU, the brake fluid pressurized by the brake-fluid quantity amplifying pump 42 is introduced into the fluid chamber via the brake-fluid quantity amplifying proportioning control valve 43. As a result, the brake-fluid pressure of the conduit between the brake-fluid quantity amplifying control valve 44 and the brake-fluid quantity amplifying pump 42, which is heightened by the pressurized brake fluid discharged from the brake-fluid quantity amplifying pump 42 is increased or reduced to a pressure value of a predetermined ratio with respect to the master-cylinder pressure PU. That is to say, in a case where the master-cylinder pressure PU is not less than the split-point pressure of the brake-fluid quantity amplifying proportioning control valve 43, the brake-fluid pressure of the conduit between the brake-fluid quantity amplifying control valve 44 between the brake-fluid quantity amplifying pump 42 is increased at a reciprocal multiple of the attenuation ratio established in the brake-fluid quantity amplifying proportioning control valve 42 with respect to the master-cylinder pressure PU. Accordingly, when the established value of the attenuation ratio established in the brake-fluid quantity amplifying proportioning control valve 42 is uniform, the brake-fluid pressure of the conduit between the brake-fluid quantity amplifying control valve 44 between the brake-fluid quantity amplifying pump 42 is increased or reduced, accompanying the increase or reduction in the master-cylinder pressure PU, in inverse proportion to the attenuation ratio established in the brake-fluid quantity amplifying control valve 44.

In this way, brake fluid caused to be at a high brake-fluid pressure in response to the master-cylinder pressure PU flows to the second conduit part A2 due to the brake-fluid quantity amplifying control valve 44 being communicated. As a result, the brake-fluid quantity of the second conduit part A2 is amplified. By performing amplification of the brake-fluid quantity in this way, effects similar to the third embodiment described earlier can be obtained.

Furthermore, the check valve 55 may act so as to cause the brake-fluid pressure in the conduit between the brake-fluid quantity amplifying proportioning control valve 43 and the check valve 55 not to be identical with the master-cylinder pressure PU but rather to be pressure having a predetermined ratio with respect to the master-cylinder pressure PU.

Additionally, it is possible to omit the brake-fluid quantity amplifying control valve 44; In this case, pressure-amplification by the pressure-amplifying device 10 with respect to the second conduit part A2 and amplification of the brake-fluid quantity by the brake-fluid quantity amplifying device 50 are executed simultaneously in accordance with the generation of the master-cylinder pressure PU. Accordingly, the reaction-force alleviation and increase in pressure due to the movement of brake fluid from the first conduit part A1 to the second conduit part A2 executed by the pressure-amplifying device 10, and an increase in pressure and prevention of an excessive increase in pedal stroke due to the increase in the brake-fluid quantity with respect to second conduit part A2 by the brake-fluid quantity amplifying device 50 can both be realized.

The restrictor 132 making up the pressure-amplifying device 10 in FIG. 7 may be replaced with the proportioning control valve 13 described in the first embodiment. In this case, the split-point pressure in this proportioning control valve 13 and the split-point pressure in the brake-fluid quantity amplifying proportioning control valve 43 may be established at differing values. When, for example, the split-point pressure in the brake-fluid quantity amplifying proportioning control valve 43 is established to be greater than the split-point pressure in the proportioning control valve 13, the brake-fluid quantity is amplified only in a case where the second brake-fluid pressure PL in the second conduit part A2 has become greater than the split-point pressure established in the proportioning control valve 13 and moreover has become greater than the split-point pressure established in the brake-fluid quantity amplifying proportioning control valve 43.

A fourth embodiment will be described next with reference to FIG. 10. For structure exhibiting a mode of operation and effects similarly to the embodiments described hereinabove, symbols similar to the foregoing will be attached and description thereof will be omitted.

A characteristic point of the fourth embodiment exists in that the proportioning control valve 13 as the holding device and the pump 15 as the brake-fluid moving device are incorporated within the wheel cylinders 4 and 5 to generate braking force at the wheels. That is to say, the proportioning control valve 13 and the pump 15 are disposed within components of the wheel cylinders 4 and 5. Moreover, a conduit communicating between the proportioning control valve 13 and pump 15 and a wheel piston 63 to actually generate wheel braking force is also disposed within the components of the wheel cylinders 4 and 5.

When the wheel piston 63 receives brake-fluid pressure and is moved rightward in the drawing, a pad 61 is compressed against a disc rotor 60 and braking force is generated at the wheel. The disc rotor 60 rotates integrally with the wheel, and the wheel is braked by friction between the disc rotor 60 and the pad 61.

The pump 15 in this embodiment receives drive energy from the disc rotor 60 rotating together with the wheel. That is to say, a transmission member 62 interconnecting the interval between the pump 15 and the disc rotor 60 and transmitting the rotational energy of the disc rotor 60 to the pump 15, and a clutch 65 disposed in this transmission member 62 to control an interconnected state between the pump 15 and the disc rotor 62 are provided.

The transmission member 62 may be disposed to be eccentric by a predetermined quantity from the center of a wheel axle 64, so as to generate piston motion or scroll motion or the like in the pump 15. In this embodiment, the clutch 65 is structured solely on the rear-wheel side, and is not provided on the front-wheel side. As a result, the front-wheel side is in a state of constantly being driven by the pump 15 while the wheels are rotating. However, when master-cylinder pressure has not been generated, the proportioning control valve 13 does not exert pressure-holding action. Therefore, brake fluid merely circulates along the conduit, and the pad 61 is not pushed toward the disc rotor 60. Moreover, because hydraulic pulsation constantly acts upon the wheel piston 63 due to the brake fluid circulating in this way, clearance between the wheel piston 63 and the pad 61 can be maintained at a minimum distance, and initial response at the time of brake-pedal depression can be enhanced. That is to say, because force is constantly applied to the wheel piston 63 by the hydraulic pulsation, there is no movement of the wheel piston 63 leftward in the drawing and no enlargement of clearance due to body vibration or the like. Additionally, when the pump 15 is constantly driven on the front-wheel side, a constant pressure-amplifying action is exerted at a time that master-cylinder pressure not less than the split-point pressure of the proportioning control valve 13 has been generated in the master cylinder 3 when the brake pedal 1 has been depressed by the driver. Furthermore, the rotational speed and discharge pressure (discharge quantity per unit time) of the pump 15 also changed in accordance with wheel rotational speed. That is to say, the discharge pressure of the pump 15 becomes small in a case where wheel rotational speed is low, and the discharge pressure of the pump 15 becomes large in a case where wheel rotational speed is high. Even when the master-cylinder pressure PU is uniform, a large pressure-amplifying action can be exhibited in a case where wheel rotational speed is high, and only a small pressure-amplifying action is exhibited in a case where wheel rotational speed is low. As a result, so-called jerky braking can be prevented in a case where body speed is low. Further, pressure-increase gain of the brake-fluid pressure applied to the wheel piston 63 can be made to be large and short-distance braking can be realized in a case where body speed is high.

Because a clutch 65 is employed on the rear-wheel side, the brake control apparatus may be such that the clutch 65 is connected and pressure-amplifying action is realized after a predetermined time has elapsed subsequently to, for example, brake-pedal depression.

An electrical type clutch mechanism may be utilized in this clutch 65, or a mechanical type clutch mechanism may be also utilized. When, for example, an electrical type clutch mechanism has been actuated, a brake-switch signal (not illustrated) may be received and the clutch connected; when a mechanical type clutch mechanism has been employed, the clutch may be connected when the master-cylinder pressure becomes a predetermined pressure.

In the fourth embodiment, rotational energy of the wheel can be recovered with favorable efficiency and utilized to drive the pump. That is, a role can be played in regenerative braking.

When the fourth embodiment is applied in an electric vehicle, great energy can be obtained in comparison with regenerative braking by a retarder of known art and in particular braking-force insufficiency during rapid braking can be avoided.

Figure 10:
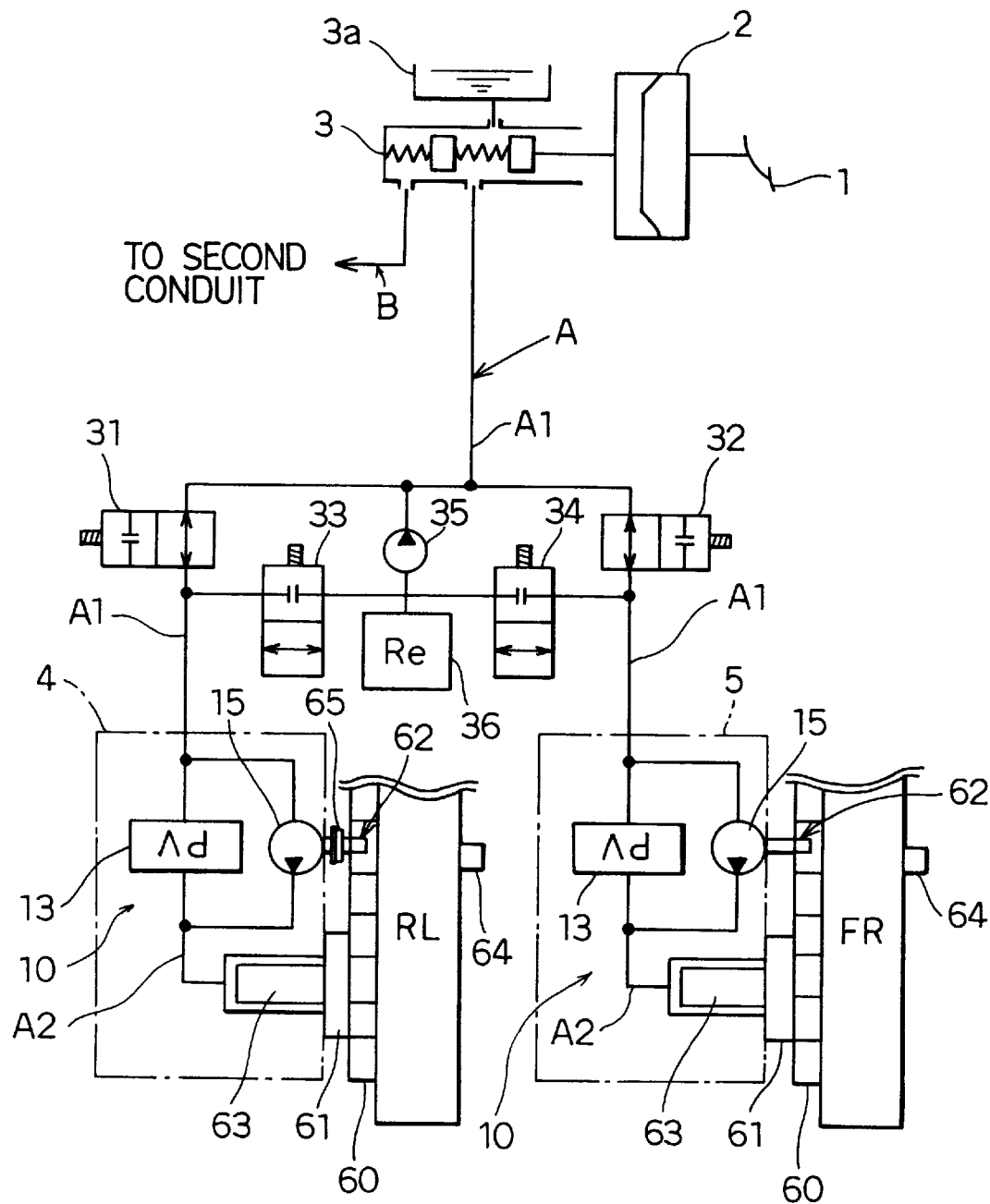
FIG. 10 is a structural view indicating a fourth embodiment of the present invention.

In the fourth embodiment, the pressure-increasing control valves 31 and 32 and the pressure-reducing control valves 33 and 34 realizing antiskid-control action are disposed between the master cylinder 3 and the wheel cylinders 4 and 5 as shown in FIG. 10. Further, an ABS pump 35 to discharge brake fluid accumulated in an ABS reservoir 36 which accumulates brake fluid corresponding to the amount of reduction in wheel-cylinder pressure during antiskid control is provided. Pressure-increasing and pressure-reducing control is executed within a range of lower pressure than the brake-fluid pressure applied to the wheel piston 63 in the interval from the master cylinder 3 to the proportioning control valve 13. Therefore, load applied to the several control valves and the like is alleviated.

Brake piping and an ABS actuator block mounted on a vehicle will be described next as a fifth embodiment with reference to FIG. 11. For structure exhibiting a mode of operation and effects similarly to the embodiments described hereinabove, symbols similar to the foregoing will be attached and description thereof will be omitted.

Figure 11:
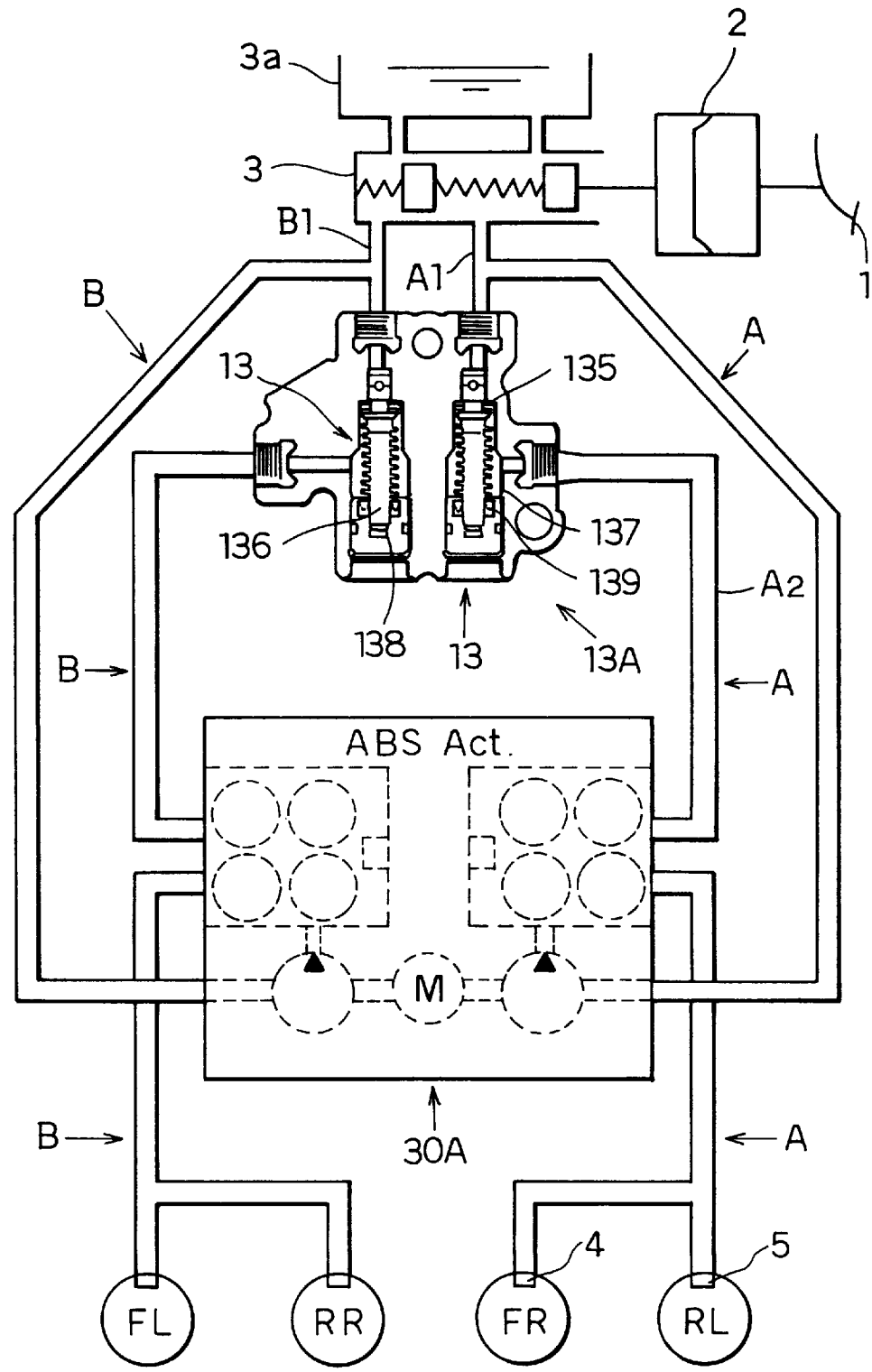
FIG. 11 is a structural view indicating a fifth embodiment of the present invention.

A first conduit A and a second conduit B are illustrated in FIG. 11; diagonal piping is employed wherein the wheel cylinder 4 of the front-right wheel FR and the wheel cylinder 5 of the rear-left wheel RL are connected to the first conduit A and the wheel cylinder of the front-left wheel FL and the wheel cylinder of the rear-right wheel RR are connected to the second conduit B.

In an ABS actuator 30A, a total of four pressure-increasing control valves and a total of four pressure-reducing control valves respectively disposed in the first conduit A and the second conduit B, a total of two reservoirs, a total of two pumps, and a motor to drive these pumps are components in a single block.

Proportioning control valves 13 disposed respectively in the first conduit A and the second conduit B are each structured by an integrated proportioning control-valve block 13A.

When the ABS actuator 30A and the integrated proportioning control-valve block 13A are formed into discrete components connected by the first and second conduits A and B, an ABS actuator 30A having little need to change its specifications for each vehicle type can be used in common for several vehicle types. Instead, the proportioning control valves 13 for which there is great need to vary establishment of split points and so on for each of several vehicle types can alone be caused to have the specification suitable for each vehicle type. When the ABS actuator 30A common for several vehicle types can be employed, overall product cost can be reduced.

To describe in detail the structure of the integrated proportioning control-valve block 13A, master-cylinder pressure PU generated in the master cylinder 3 during ordinary braking is conveyed to second conduit parts A2 and B2 through first conduit parts A1 and B1 and valve seals 135, with substantially no pressure attenuation. The conveyed brake-fluid pressure is applied to the several wheel cylinders 4 and 5. Thereafter, when brake fluid is taken in from the first conduit parts A1 and B1 and discharged to the second conduit parts A2 and B2 by the pumps, this brake-fluid pressure of the second conduit parts A2 and B2 becomes second brake-fluid pressure which is higher than the master-cylinder pressure PU. Accordingly, a proportioning control-valve piston 136 is constantly compressed upwardly by a coil spring 137 until the second brake-fluid pressure becomes a split-point pressure or more and during ordinary braking. Consequently, a clearance is opened between the valve seal 135 and the proportioning control-valve piston 136. The first conduit parts A1 and B1 and the second conduit parts A2 and B2 assume a state of communication. When the brake-fluid pressure in the second conduit parts A2 and B2 reaches the split-point pressure due to pump discharge, the force applied to the proportioning control-valve piston 136 becomes larger than the spring force of the coil spring 137. the proportioning control-valve piston 136 is pressed to an air chamber 138 side (lower in the drawing). The valve seal 135 and a shoulder portion of the proportioning control-valve piston 136 make contact due to this action, interrupting the communication. Furthermore, when the brake-fluid pressure in the second conduit parts A2 and B2 becomes higher than the split-point pressure, force to press the proportioning control-valve piston 136 upwardly is exerted. The master-cylinder pressure is exerted as force to press the proportioning control-valve piston 136 downward. Therefore, action of the proportioning control-valve piston 136 is such that these two forces are held in balance. In this way, the proportioning control-valve piston 136 constantly repeats minute oscillation and reduces pressure conveyed from the second conduit parts A2 and B2 to the first conduit parts A1 and B1 by a defined pressure in a case where the brake-fluid pressure of the second conduit parts A2 and B21 is displaced at a higher pressure than the split-point pressure. The pressure of the second conduit parts A2 and B2 is maintained at a higher level by the defined pressure than the brake-fluid pressure of the first conduit parts A1 and B1. Because the brake-fluid pressure of the second conduit parts A2 and B2 acts upon an annular cross-sectional area B–A (where B>A) which is a valve-seal diameter cross-sectional area B minus a cross-sectional area A of the proportioning control-valve piston 136. The master-cylinder pressure PU acts upon the valve-seal diameter cross-sectional area B. As a result, the brake-fluid pressure of the second conduit parts A2 and B2 maintains equilibrium in the proportioning valves 13 at a high fluid pressure compared with the master-cylinder pressure PU. This fluid-pressure equilibrium ratio is, in other words, the attenuation ratio of the brake-fluid pressure in the second conduit parts A2 and B2. This is determined by the ratio (B/A) of the two pressure-receiving surface areas A and B. When this ratio (B/A) is large the attenuation ratio is increased, and the pressure-increasing gradient of the brake-fluid pressure in the second conduit parts A2 and B2 becomes greater. Accordingly, in a case where the present embodiment has been employed, for example, in front-rear piping, when the ratio (B/A) of the pressure-receiving surface areas A and B of the proportioning control valve 13 on the rear-wheel side is established at a low value and the ratio (B/A) of the pressure-receiving surface areas A and B of the proportioning control valve 13 on the front-wheel side is established at a high value, large brake-fluid pressure is applied to the wheel cylinders on the front-wheel side and brake-fluid pressure lower than for the front-wheel side is applied to the wheel cylinders on the rear-wheel side when pumps having the same discharge capacity are driven with respect to the front and rear wheels. As a result, braking-force distribution for the front and rear wheels can be realized while applying higher pressure than the master-cylinder pressure to the front and rear wheel cylinders. Further, 139 is a cap.

A sixth embodiment will be described next with reference to FIG. 12. For structure exhibiting a mode of operation and effects similarly to the embodiments described hereinabove, symbols similar to the foregoing will be attached and description thereof will be omitted.

Figure 12:
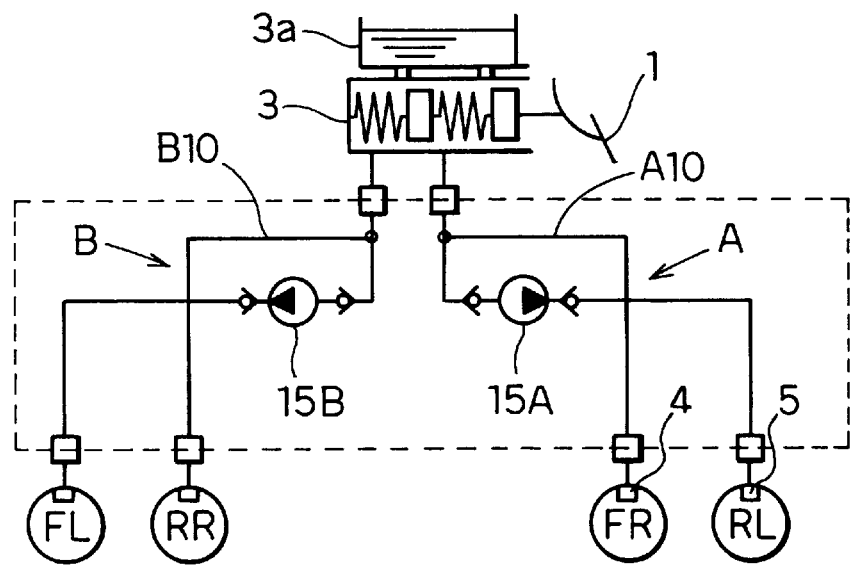
FIG. 12 is a structural view indicating a sixth embodiment of the present invention.

As shown in FIG. 12, a first conduit A and a second conduit B are respectively provided with pumps 15A and 15B to taken in brake fluid from the master cylinder 3 side and discharge the brake fluid toward the several wheel cylinders 4 and 5. These pumps 15A and 15B are respectively provided with conduits A10 and B10 in parallel, and are formed so that pump discharge is refluxable.

Figure 13:
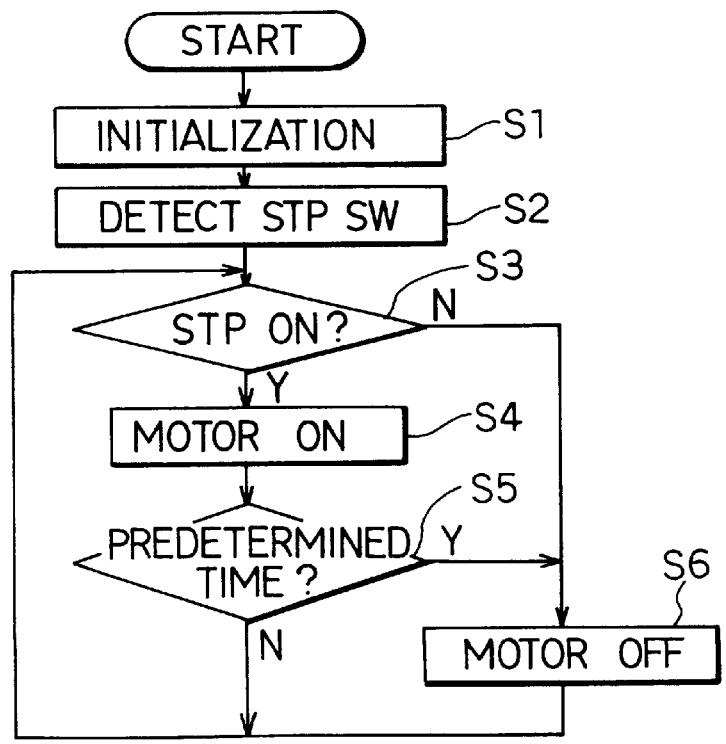
FIG. 13 is a flowchart indicating control content of the sixth embodiment.

The flowchart shown in FIG. 13 indicates a condition for starting to drive the pumps 15A and 15B. Firstly, in step S1, initialization for several flags and the like is performed. In step S2, input from a brake switch (not illustrated) is received. This brake switch assumes an "on" state when the brake pedal 1 has been depressed by the driver, producing a vehicle-braking state. In step S3, it is determined whether the brake switch is ON. In a case where the determination is affirmative, the process advances to step S4. A motor (not illustrated) to drive the pumps 15A and 15B is electrified, and pump intake and discharge operation is executed. The process advances to step S5 and it is determined whether a predetermined time has elapsed since starting to electrify the motor. In a case where the determination is affirmative, the process advances to step S6; in a case where the determination is negative, the process returns to step 3. In step S6, the electrification of the motor is switched off. Furthermore, in step S3, the process advances to step S6 in a case where the determination is negative.

Figure 14:
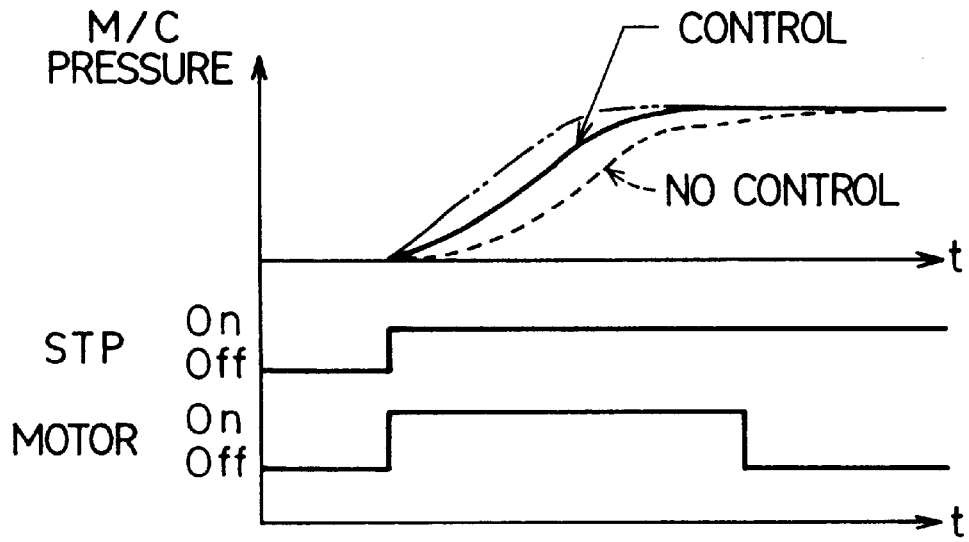
FIG. 14 is a time chart illustrating control result according to the sixth embodiment.

Mode of operation and effects will be described hereinafter with reference to FIG. 14. Change in wheel-cylinder pressure is illustrated in a case where the brake switch is in an "on" state, i.e., where a vehicle-braking state is obtained. The solid line in the drawing represents change in wheel-cylinder pressure in a case where there is control by the present embodiment wherein the motor is electrified, the dotted line represents change in wheel-cylinder pressure in a case where there is no control by this embodiment, and the double-dotted broken line represents change in wheel-cylinder pressure in a case where fluid resistance of the brake fluid is assumed to be substantially nonexistent. As is understood from FIG. 14, in the present embodiment the speed of movement of the brake fluid can be assisted by pump drive and reflux of the brake fluid. Fluid resistance can be alleviated, and so response in increasing wheel-cylinder pressure can be enhanced.

Figure 15:
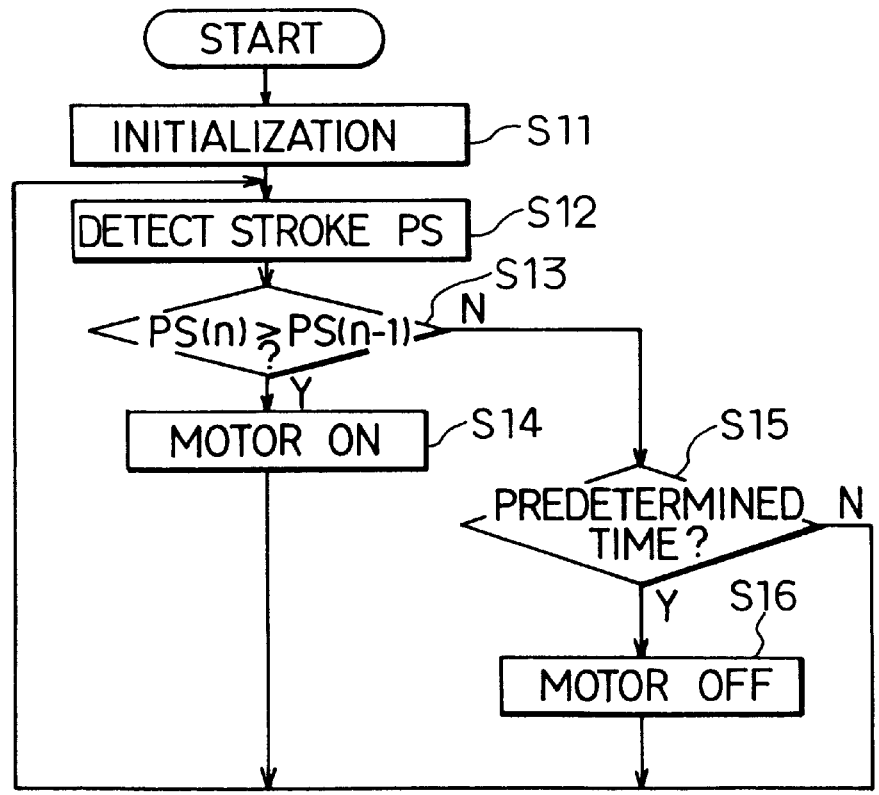
FIG. 15 is a modification of the flowchart according to the sixth embodiment.

As shown in FIG. 15, pump drive control may be executed in response to change in pedal stroke. That is to say, in step S11, initialization is performed, and in step S12, pedal stroke PS is detected by a stroke sensor (not illustrated). In step S13, it is determined whether present pedal-stroke detected value PS (n) is greater than previous pedal-stroke detected value PS (n–1). When determined in the affirmative, the motor is electrified in step S14. In a case where the determination is negative, the process advances to step S15. In step S15, it is determined whether a predetermined time has elapsed since electrification of the motor. In a case where the determination is affirmative, the process advances to step S16, and motor electrification is stopped. In a case where the determination is negative, the process returns to step S12.

In this way, a similar effects can be obtained even when brake-fluid movement speed is assisted by the pump when there exists change in pedal stroke. Moreover, because play is present in an ordinary brake pedal, the pump can be driven in the interval of play in the pedal if the pump drive is stated in response to change in brake-pedal stroke. As a result, brake-fluid flows within the first conduit A while master-cylinder pressure PU is actually being generated. Accordingly, it is possible to respond sufficiently even during the initial period of brake-pedal depression. Furthermore, master-cylinder pressure, depression force, or the like may be detected as a value corresponding to the stroke of the brake pedal, to control pump drive.

A modification of the embodiments hereinabove will be described hereinafter.

Figure 9:
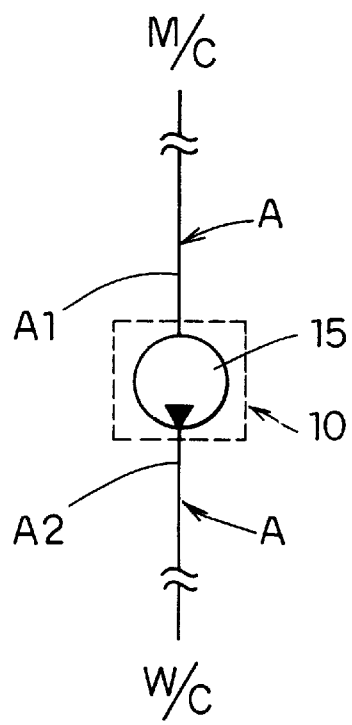
FIG. 9 is a drawing indicating a modification of the pressure-amplifying device.

In, for example, the first embodiment or the like, the pressure-amplifying device 10 was made up of the pump 15 and the holding device 13. However, the pressure-amplifying device 10 is not exclusively restricted thereto, and may utilize a simple structure directly connecting the pump 15 in the first conduit A, as shown in FIG. 9. In this case, movement of brake fluid may be realized by, for example, disposing the pump 15 so as to be buried within the first conduit A and driving the pump 15 in the normal direction in accordance with the operating state of the brake pedal 1, in order to take in the brake fluid of the first conduit part A1 and discharge the brake fluid to the second conduit part A2. In a case where weakening of the pedal depression force by the driver has been detected from the brake-pedal state, the pump 15 may be driven in reverse direction so as to reduce the brake-fluid pressure applied to the wheel cylinders to a normal state. Furthermore, it is preferred that a holding device such as to cause the pressure in the second conduit part A2 to be at least the master-cylinder pressure PU or more be provided in the pump 15 so that at least the master-cylinder pressure PU is applied to the wheel cylinders even in a case where failure of the pump 15 may have occurred.

In the embodiments hereinabove, pressure amplification of the second conduit part A2 by the pressure-amplifying device 10 and amplification of brake-fluid quantity with respect to the second conduit part A2 by the brake-fluid quantity amplifying device 40 were performed with respect to both the front-right wheel FR and the rear-left wheel RL. However, pressure amplification by the pressure-amplifying device 10 or amplification of brake-fluid quantity with respect to the second conduit part A2 by the brake-fluid quantity amplifying device 40 may be performed only at the front-right and front-left wheels. There may be cases wherein assurance of braking force in the rear-right and rear-left wheels cannot be expected due to load movement occurring during vehicle braking. When great load movement occurs, it even arises possibility that the rear wheels become prone to slippage when large braking force is applied to the rear wheels. In such a case, efficient braking force can be gained by performing pressure amplification only at the front-right and front-left wheels.

The brake-fluid quantity amplifying pump 42 was employed as the brake-fluid quantity amplifying device 40 described with reference to FIG. 7 and FIG. 8, to take in brake fluid from the reservoir 41 and discharge high-pressure brake fluid. However, it is also possible to replace this brake-fluid quantity amplifying pump 42 and reservoir 41 with a fluid-collecting chamber to collect a predetermined quantity of brake fluid at high pressure. The brake-fluid quantity of the second conduit part A2 may be amplified utilizing the high-pressure brake fluid from this fluid-collecting chamber.

In the embodiments hereinabove, the generation of brake-fluid pressure by the brake-fluid pressure-generating device was realized by the master-cylinder pressure PU being generated in the master cylinder 3 due to the driver operating the brake pedal 1. However, the present invention may be applied in an automatic brake apparatus which actuates a brake when, for example, distance between vehicles has become a predetermined distance or less, irrespectively of brake-pedal depression by a driver. In this case, a pump or the like for automatic-brake use may be provided as the brake-fluid pressure-generating device in substitution for the brake pedal, master cylinder, and so on. Also, load for generating the first brake-fluid pressure in the pump and the like making up the brake-fluid pressure-generating device can be alleviated when the pressure-amplifying device 10 is provided.

Because the second brake-fluid pressure can be increased by the pressure-amplifying device 10 according to the forgoing embodiments, it is possible to reduce the capacity of the booster 2 provided in the foregoing embodiments and make the booster 2 compact, or even to eliminate the booster 2. That is to say, the load on pedal depression force by the driver can be sufficiently lessened and high braking force can be ensured even when there is no pressure-increasing action on the master-cylinder pressure PU by the booster 2.

Furthermore, in the above-described embodiments this invention was applied in a front-wheel drive vehicle with diagonal piping. However, the present invention can be carried out without restriction to a particular drive format or piping system, and is applicable even in a vehicle provided with, for example, T-T piping of connecting front-right wheel cylinder and front-left wheel cylinder and of connecting rear-right wheel cylinder and rear-left wheel cylinder.

A seventh embodiment will be described with reference to FIG. 16.

This embodiment combines an antiskid control system with the basic structure of a brake control apparatus; herein will be described an example wherein a brake control apparatus for a vehicle according to the present invention is applied in a vehicle of diagonal piping provided with respective conduits of connecting a front-right wheel cylinder and a rear-left wheel cylinder and of connecting a front-left wheel cylinder and a rear-right wheel cylinder in a front-wheel drive, four-wheeled car.

Firstly, basic structure of the brake control apparatus will be described with reference to the model diagram indicated in FIG. 16. For structure exhibiting a mode of operation and effects similarly to the embodiments described hereinabove, symbols similar to the foregoing will be attached and description thereof will be provided briefly.

Figure 16:
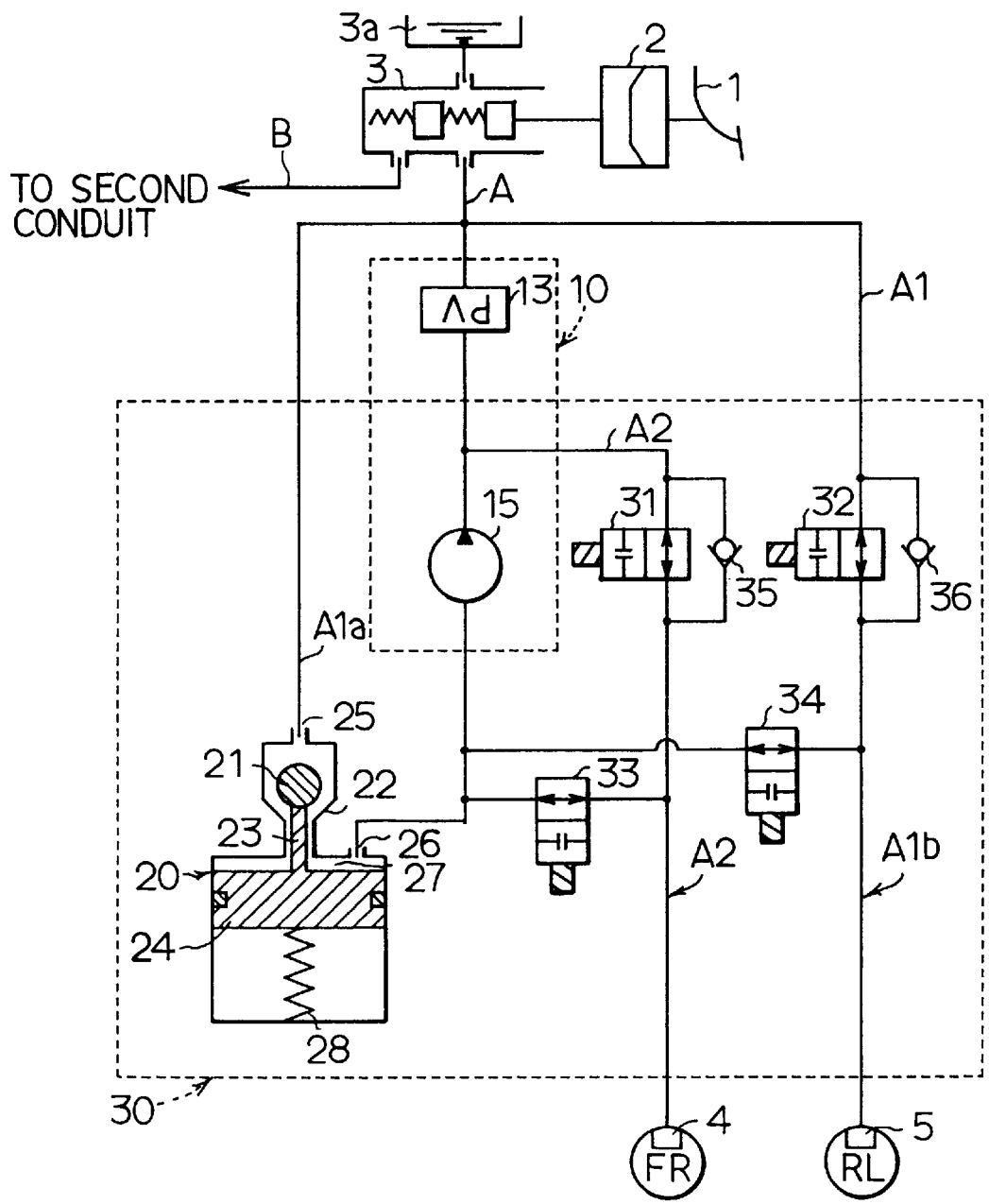
FIG. 16 is a structural view indicating a seventh embodiment of the present invention.

In FIG. 16, a brake pedal 1 depressed by a driver when applying braking force to the vehicle is connected to a booster 2, and depression force applied to the pedal 1 and pedal stroke are conveyed to this booster 2.

A master cylinder 3 imparts brake-fluid pressure boosted by the booster 2 to the entirety of a brake conduit. The master cylinder 3 is provided with an independent master reservoir 3a to supply brake fluid to within the master cylinder 3 or to accumulate excess brake fluid from the master cylinder 3.

The master-cylinder pressure PU generated in the master cylinder 3 is conveyed to brake fluid within a first conduit A linking the master cylinder 3 and a first wheel cylinder (W/C) 4 disposed in the front-right wheel FR to impart braking force to this wheel FR, and the master cylinder 3 and a second wheel cylinder 5 disposed in the rear-left wheel RL to impart braking force to this wheel RL. The master-cylinder pressure PU is similarly conveyed also to a second conduit B linking respective wheel cylinders disposed in the front-left wheel and the rear-right wheel to the master cylinder 3.

The first conduit A is made up of two parts separated by a pressure-amplifying device 10 disposed in this first conduit A. That is to say, the first conduit A has a first conduit part A1 to receive the master-cylinder pressure PU in the interval from the master cylinder 3 to the pressure-amplifying device 10 and a second conduit part A2 in the interval from the pressure-amplifying device 10 to the first wheel cylinder 4. Furthermore, the foregoing first conduit part A1 is provided with a first branching conduit part A1a extending from the master cylinder 3 via a reservoir 20 to a pump 15, and a second branching conduit part A1b extending from the master cylinder 3 to the second wheel cylinder 5.

The pressure-amplifying device 10 moves brake fluid of the first conduit part A1 to the second conduit part A2 and holds the pressure at the second conduit part A2 at second brake-fluid pressure PL when the brake pedal 1 is depressed and the master-cylinder pressure PU is generated within the first conduit A. According to the seventh embodiment, this pressure-amplifying device 10 is made up of a proportioning control valve (PV) 13 and a pump 15.

The pump 15 is connected to the first conduit A in series with the proportioning control valve 13, and takes in brake fluid from the first branching conduit part A1a and discharges brake fluid to the second conduit part A2 during generation of the master-cylinder pressure PU.

In a case where brake fluid has been moved from the first branching conduit part A1 to the second conduit part A2 by the pump 15 and the brake-fluid pressure of the second conduit part A2 has become the second brake-fluid pressure PL which is greater than the master-cylinder pressure PU, the proportioning control valve 13 acts to maintain this differential pressure (PL−PU).

In this way, the pressure-amplifying device 10 provided with the pump 15 and the proportioning control valve 13 moves the brake fluid of the first conduit part A1 which generates the master-cylinder pressure PU accompanying depression of the brake pedal 1 to the second conduit part A2. As a result, the brake-fluid pressure within the first conduit location A1, i.e., the master-cylinder pressure is reduced, and simultaneously thereto, the differential pressure of the second brake-fluid pressure PL amplified within the second conduit part A2 and the master-cylinder pressure PU is maintained. In this way, the pressure-amplifying device 10 performs pressure amplification.

Consequently, the second brake-fluid pressure PL which is greater than the master-cylinder pressure PU is applied via the second conduit part A2 to the first wheel cylinder 4, and so high braking force is imparted to the front-wheel side (i.e., to the front-right wheel FR). Meanwhile, the master-cylinder pressure PU which is lower than the second brake-fluid pressure PL is applied via the second branching conduit part A1b to the second wheel cylinder 5. Accordingly, braking force lower than on the front-wheel side is imparted to the rear-wheel side (i.e., to the rear-left wheel RL).

Antiskid control and pressure-amplifying control (i.e., control by the pressure-amplifying device 10) which causes brake fluid to be moved from the master cylinder 3 side to the side of the wheel cylinder 4 and thereby heightens braking force are performed by an electronic control unit (ECU) not illustrated. This ECU is structured as a microcomputer provided with a CPU, a ROM, a RAM, an input/output portion, a bus line, and the like of known art.

According to the seventh embodiment, the first conduit part A1 of the low-pressure side and the second conduit part A2 of the high-pressure side are structured by disposing the pressure-amplifying device 10 in the first conduit A and connecting the proportioning control valve 13 in a reverse direction. Further, the first conduit part A1 is made up of the first branching conduit part A1a extending from the master cylinder 3 via the reservoir 20 to the pump 15, and the second branching conduit part A1b extending from the master cylinder 3 to the second wheel cylinder 5. Therefore, the high-pressure second brake-fluid pressure PL is applied to the first wheel cylinder 4 and the master-cylinder pressure PU lower than the second brake-fluid pressure PL is applied to the second wheel cylinder 5.

Consequently, because the second brake-fluid pressure PL which is higher in pressure than the master-cylinder pressure PU is applied to the first wheel cylinder 4, high pressure is imparted to the front-wheel side (i.e., to the front-right wheel FR) and high braking force can be demonstrated. Meanwhile, because the master-cylinder pressure PU is applied to the rear-wheel side (i.e., to the rear-left wheel RL), susceptibility to the occurrence of locking is reduced.

Figure 17A:
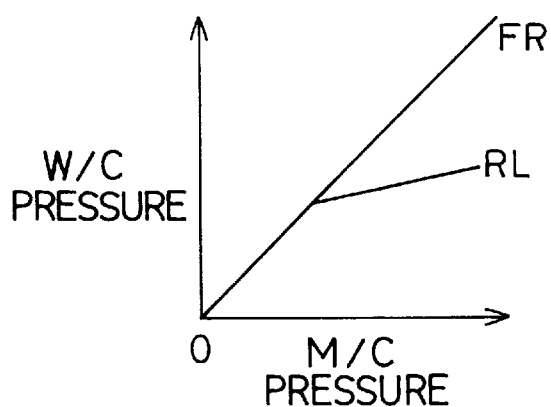
FIGS. 17A and 17B are explanatory diagrams indicating states of pressure applied to wheel cylinders.
Figure 17B:
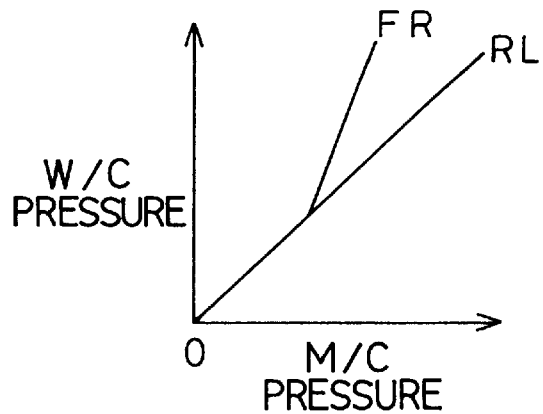

This state is indicated in FIGS. 17A and 17B; in an example wherein a pressure-amplifying device according to the present embodiment is absent and a proportioning control valve is connected in the normal direction with respect to the rear-left wheel RL, the state of pressure of the front-right wheel FR and the rear-left wheel RL is such that both are suppressed to an equal to or lower level than the wheel-cylinder pressure PU (W/C pressure), as shown in FIG. 17A. However, according to the seventh embodiment, the state of pressure of the front-right wheel FR and the rear-left wheel RL is such that both are established at higher levels compared with the prior art, as shown in FIGS. 17B.

That is to say, due to structure such as this, ideal braking-force distribution at the front and rear wheels is obtained.

That is to say, the brake-fluid pressure applied to the wheel cylinder 4 on the front-wheel side is caused to be greater than the brake-fluid pressure applied to the wheel cylinder 5 on the rear-wheel side and brake-fluid pressure can be established at a high value overall. Therefore, braking force for the vehicle overall can be enhanced while demonstrating an effect of lessening depression force.

Additionally, because brake-fluid pressure higher than the master-cylinder pressure PU is applied to the front-wheel side and master-cylinder pressure PU is applied as-is to the rear-wheel side, there exists an effect wherein the wheel-cylinder pressure can be increased with maximum efficiency without causing any loss in the master-cylinder pressure PU.

Furthermore, because an antiskid control system 30 is provided in this embodiment, there exists an advantage in that locking of the wheels does not occur even when the brake-fluid pressure applied to the wheel cylinder 4 on the front-wheel side is caused to become greater than the brake-fluid pressure PU applied to the wheel cylinder 5 on the rear-wheel side. As a result, the brake-fluid pressure is established at a high level overall.

In this embodiment, an example which does not dispose a proportioning control valve in a conduit connecting to the second wheel cylinder 5 was described. However, a proportioning control valve may be connected in the normal direction as in the prior art. In this case, the difference between the brake-fluid pressure of the second wheel cylinder 5 and the brake-fluid pressure of the first wheel cylinder 4 can be caused to be still larger.

Figure 59:
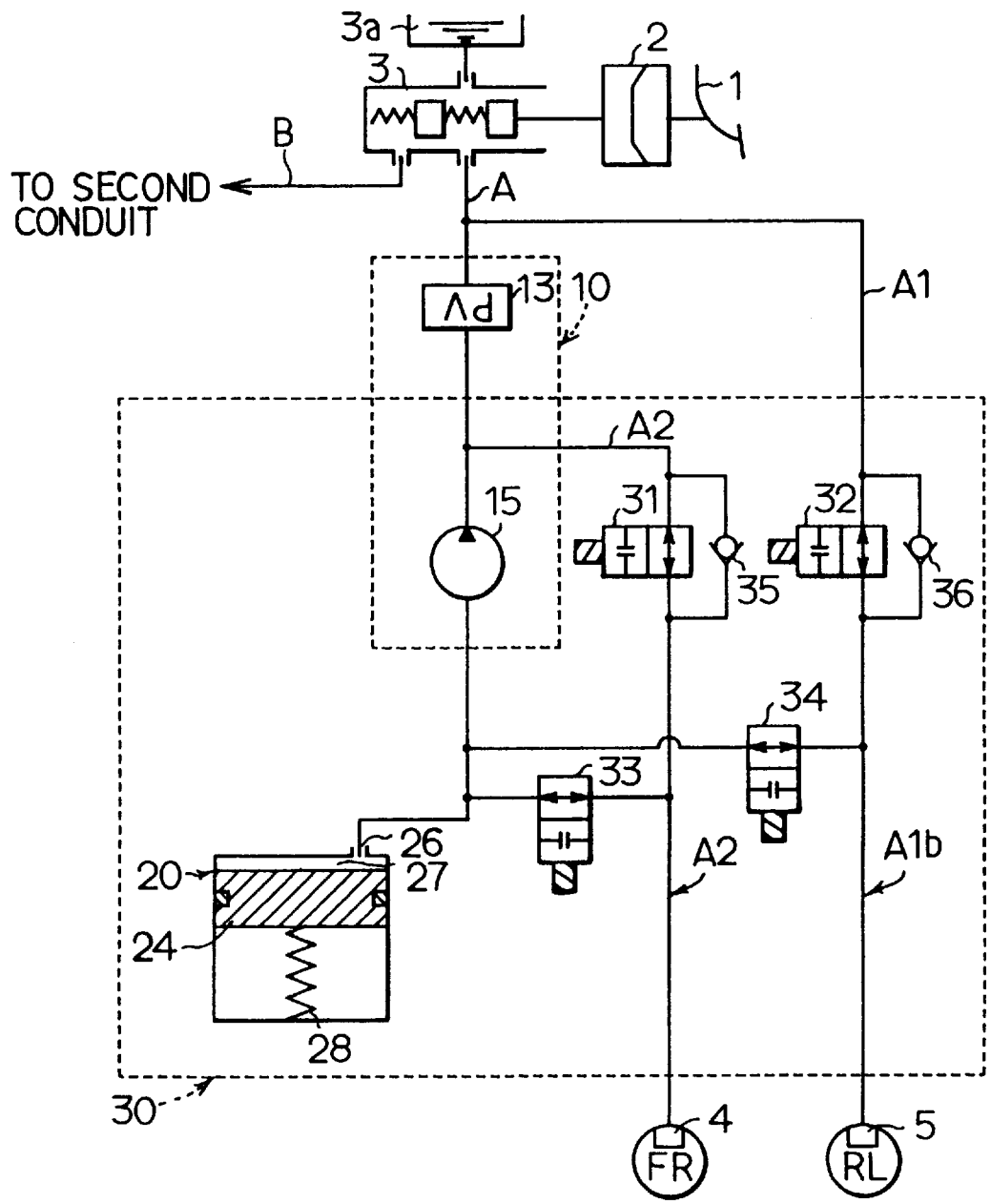
FIG. 59 is a structural view indicating a modification of the seventeenth embodiment.

It is to be noted that the conduit A1$a$ connecting the master cylinder 3 side and the reservoir 20 may be deleted and the reservoir 20 may be structured as a normal reservoir which is used in an antiskid system as shown in FIG. 59. In this modification, to establish wheel-cylinder pressure higher than master-cylinder pressure, ECU executes control as described below.

Firstly, well-known antiskid control is executed with respect to the front and rear wheels FR and RL. In this antiskid control, when the locking tendency (slip ratio) of the rear wheel RL becomes large, the pressure-increasing control valve 32 is interrupted and the pressure-decreasing control valve 34 is communicated to reduce the brake-fluid pressure applied to the wheel cylinder 5. At that time, the pump 15 takes in the brake fluid discharged from the wheel cylinder 5 and sends out it to the second conduit part A2. Therefore, due to the pressure-holding function of the proportional control valve 13, the brake fluid pressure applied to the wheel cylinder 4 of the front wheel FR is increased to a brake-fluid pressure higher than the master-cylinder pressure.

In this way, even if the conduit A1$a$ is deleted, the wheel braking-force exhibited by the front wheel FR can be increased in accompaniment to antiskid control.

When the above-described control is executed, it is preferable that the braking force is distributed to the front wheel FR and the rear wheel RL so that the rear wheel RL locks prior to the front wheel FR in the master-cylinder pressure corresponding to urgent braking. As a result, when antiskid control is executed with respect to the rear wheel RL and the brake fluid pressure of the wheel cylinder 5 is reduced during urgent braking, the brake-fluid pressure in the wheel cylinder 4 of the front wheel FR is increased to a pressure higher than the master-cylinder pressure by effectively utilizing the brake fluid discharged from the wheel cylinder 5. Therefore, because the front wheel FR can be immediately controlled to an optimal slip state, the braking distance can be shortened compared to normal antiskid control.

Figure 19:
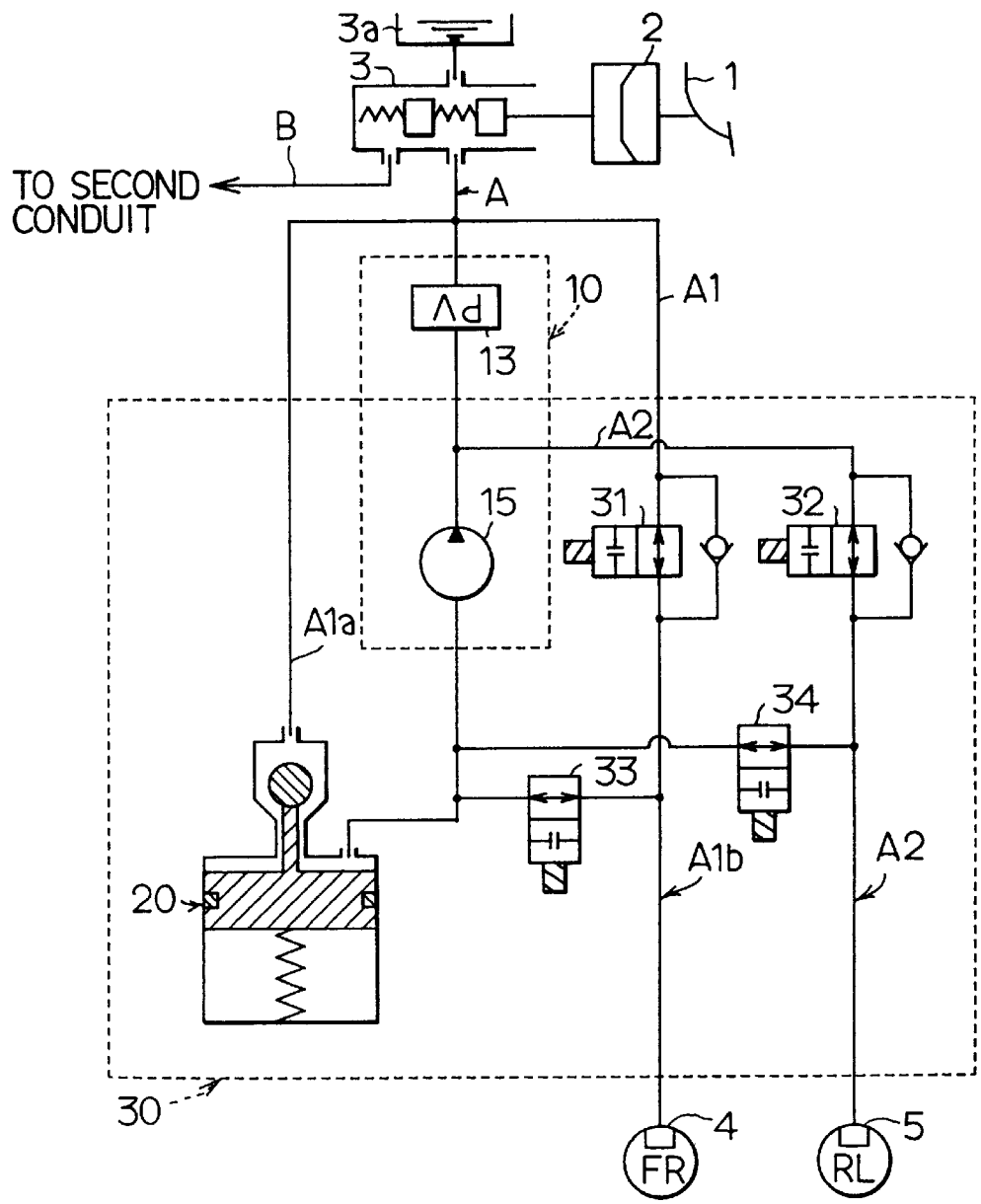
FIG. 19 is a structural view indicating a ninth embodiment of the present invention.

The structure described above can be adopted to a brake control apparatus shown in FIG. 19. In this case, the front and rear wheels have a reverse relationship in brake-fluid pressure against the brake control apparatus shown in FIG. 59. Further, two-way, two-port valve can be used as substitute for the proportional control valve 13. Moreover, the structure described above can be applied to a brake control apparatus in which wheel cylinders of a front-right wheel and front-left wheel are connected by a conduit. In this case, for example, when a driver brakes the vehicle during turning, the same effect as described above can be obtained by brake fluid movement from the wheel cylinder of an inner side wheel to the wheel cylinder of an outer side wheel.

An eighth embodiment will be described next, but description of portions similar to the embodiments described hereinabove will be simplified.

This embodiment provides an antiskid control system which differs from the foregoing seventh embodiment.

Firstly, basic structure of the brake control apparatus will be described with reference to the model diagram indicated in FIG. 18.

Figure 18:
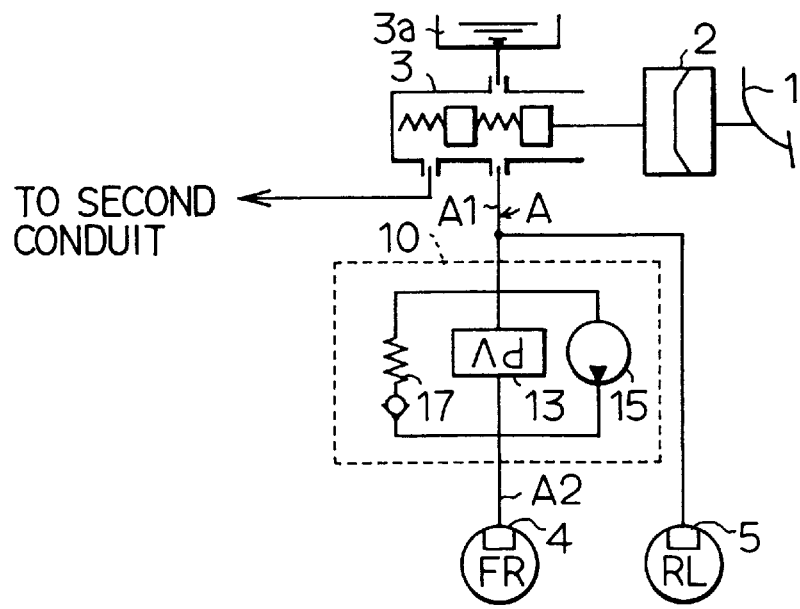
FIG. 18 is a structural view indicating a eighth embodiment of the present invention.

In FIG. 18, a brake pedal 1 is connected to a booster 2, and a master cylinder 3 is provided with a master reservoir 3$a$.

Master-cylinder pressure PU is conveyed by brake fluid within a first conduit A extending from the master cylinder 3 to first and second wheel cylinders 4 and 5. The master-cylinder pressure PU is similarly conveyed to a second conduit as well, but because structure similar to the first conduit A can be employed, detailed description will be omitted.

The first conduit A is made up of two parts separated by a pressure-amplifying device 10. Namely, the first conduit A has a first conduit part A1 to receive the master-cylinder pressure PU in the interval from the master cylinder 3 to the pressure-amplifying device 10. That is to say, a first conduit part A1 extends from the master cylinder 3 to the second wheel cylinder 5. The first conduit A also has a second conduit part A2 in the interval from the pressure-amplifying device 10 to the first wheel cylinder 4.

The pressure-amplifying device 10 moves brake fluid of the first conduit part A1 to the second conduit part A2 and holds the pressure at the second conduit part A2 at second brake-fluid pressure PL when the brake pedal 1 is depressed and the master-cylinder pressure PU is generated within the first conduit A. According to this embodiment, this pressure-amplifying device 10 is made up of a proportioning control valve (PV) 13 and a pump 15.

The pump 15 is connected to the first conduit A in parallel with the proportioning control valve 13, and takes in brake fluid from the first conduit part A1 and discharges brake fluid to the second conduit part A2 during generation of the master-cylinder pressure PU.

The proportioning control valve 13 is connected to the first conduit A in a reverse direction. In a case where brake fluid from the first conduit part A1 has been moved to the second conduit part A2 by the pump 15 and the brake-fluid pressure of the second conduit part A2 has become the second brake-fluid pressure PL which is greater than the master-cylinder pressure PU, the proportioning control valve 13 acts to maintain this differential pressure (PL–PU). Additionally, a relief valve 17 is provided in parallel with the proportioning control valve 13.

In this way, this embodiment is not provided with a antiskid control system, but by disposing the pressure-amplifying device 10 in the first conduit A together with connecting the proportioning control valve 13 in the reverse direction, the first conduit part A1 on the low-pressure side and the second conduit part A2 on the high-pressure side are structured.

Consequently, because the second brake-fluid pressure PL of the second conduit part A2 which is higher in pressure than the master-cylinder pressure PU is applied to the first wheel cylinder 4, high pressure is imparted to the front-wheel side (i.e., to the front-right wheel FR) and high braking force can be demonstrated. Meanwhile, because the master-cylinder pressure PU of the first conduit part A1 which is lower in pressure than on the front-wheel side is applied to the rear-wheel side (i.e., to the rear-left wheel RL), susceptibility to the occurrence of locking is reduced.

That is to say, similarly to the above-described seventh embodiment, ideal braking-force distribution at the front and rear wheels is obtained. In other words, the brake-fluid pressure applied to the wheel cylinder 4 on the front-wheel side is caused to be greater than the brake-fluid pressure applied to the wheel cylinder 5 on the rear-wheel side and brake-fluid pressure can be established at a high value overall. Therefore, braking force for the vehicle overall can be enhanced while demonstrating an effect of lessening depression force.

Additionally, because brake-fluid pressure higher than the master-cylinder pressure PU is applied to the front-wheel side and master-cylinder pressure PU is applied as-is to the rear-wheel side, there exists an effect wherein the wheel-cylinder pressure can be increased with maximum efficiency without causing any loss in the master-cylinder pressure PU.

In this embodiment, an example which does not dispose a proportioning control valve with respect to the second wheel cylinder 5 was described. However, a proportioning control valve may be connected to the second wheel cylinder 5 in the normal direction as in the prior art. In this case, the difference between the brake-fluid pressure of the second wheel cylinder 5 and the brake-fluid pressure of the first wheel cylinder 4 can be caused to be still larger.

A ninth embodiment will be described next, but description of portions similar to the embodiments described hereinabove will be simplified.

This embodiment provides the basic structure of a brake control apparatus and an antiskid control system, similarly to the above-described seventh embodiment. However, a characteristic of the brake-fluid pressure applied to the first and second wheel cylinders 4 and 5 is oppositely to the foregoing seventh embodiment at the front-wheel side and the rear-wheel side.

Firstly, basic structure of the brake control apparatus will be described with reference to the model diagram indicated in FIG. 19.

A brake pedal 1 is connected to a booster 2, and a master cylinder 3 is provided with a master reservoir 3a.

Master-cylinder pressure PU is conveyed by brake fluid within a first conduit A extending from the master cylinder 3 to first and second wheel cylinders 4 and 5. The master-cylinder pressure PU is similarly conveyed to a second conduit as well, but because structure similar to the first conduit A can be employed, detailed description will be omitted.

The first conduit A is made up of two parts separated by a pressure-amplifying device 10. That is to say, the first conduit A has a first conduit part A1 to receive the master-cylinder pressure PU in the interval from the master cylinder 3 to the pressure-amplifying device 10 and a second conduit part A2 in the interval from the pressure-amplifying device 10 to the second wheel cylinder 5. Furthermore, the first conduit part A1 is provided with a first branching conduit part A1a extending from the master cylinder 3 via a reservoir 20 to a pump 15, and a second branching conduit part A1b extending from the master cylinder 3 to the first wheel cylinder 4.

The pressure-amplifying device 10 moves brake fluid of the first conduit part A1 to the second conduit part A2 and holds the pressure in the second conduit part A2 at second brake-fluid pressure PL when the brake pedal 1 is depressed and the master-cylinder pressure PU is generated within the first conduit A. According to this embodiment, this pressure-amplifying device 10, similarly to the foregoing seventh embodiment, is made up of the proportioning control valve (PV) 13 and the pump 15.

Additionally, a reservoir 20, first and second pressure-increasing control valves 31 and 32, first and second pressure-reducing control valves 33 and 34, and so on are also similar to the seventh embodiment.

In this way, according to this embodiment, the first conduit part A1 of the low-pressure side and the second conduit part A2 of the high-pressure side are structured by disposing the pressure-amplifying device 10 in the first conduit A and connecting the proportioning control valve 13 in the reverse direction. Further, the first conduit part A1 is made up of the first branching conduit part A1a extending from the master cylinder 3 via the reservoir 20 to the pump 15, and the second branching conduit part A1b extending from the master cylinder 3 to the first wheel cylinder 4.

That is to say, oppositely to the foregoing seventh embodiment, the high-pressure second brake-fluid pressure PL is applied to the second wheel cylinder 5 and the master-cylinder pressure PU lower than the second brake-fluid pressure PL is applied to the first wheel cylinder 4.

Consequently, because the second brake-fluid pressure PL which is higher in pressure than the master-cylinder pressure PU is applied to the second wheel cylinder 5, high pressure is imparted to the rear-wheel side (i.e., to the rear-left wheel RL); meanwhile, the master-cylinder pressure PU which is lower in pressure than on the rear-wheel side is applied the front-wheel side (i.e., to the front-right wheel FR).

Figure 20A:
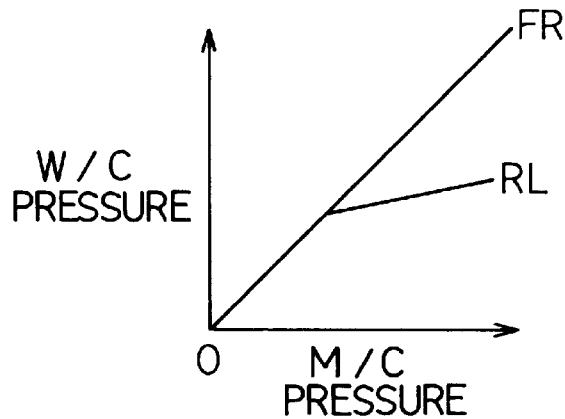
FIGS. 20A and 20B are explanatory diagrams indicating states of pressure applied to wheel cylinders.
Figure 20B:
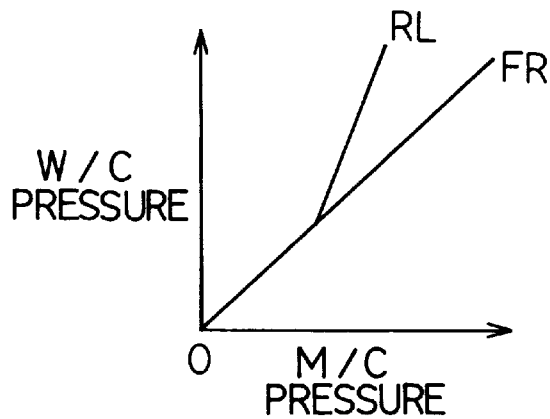

This state is indicated in FIGS. 20A and 20B; in an example wherein a pressure-amplifying device 10 according to the present embodiment is absent and a proportioning control valve is connected in the normal direction with respect to the rear-left wheel RL, the state of pressure of the front-right wheel FR and the rear-left wheel RL is such that both are suppressed to an equal to or lower level than the master-cylinder pressure PU, as shown in FIG. 20A. Meanwhile, according to the present embodiment, the state of pressure of the front-right wheel FR and the rear-left wheel RL is such that, conversely to the case of the first embodiment indicated in FIG. 1, the pressure at the rear-left wheel RL is established at a higher level while maintaining the brake-fluid pressure in the first wheel cylinder 4 at the master-cylinder pressure PU, as shown in FIG. 20B.

Because the brake-fluid pressure applied to the wheel cylinder 5 on the rear-wheel side is caused to be greater than the brake-fluid pressure applied to the wheel cylinder 4 on the front-wheel side, brake-fluid pressure can be established at a high value overall, and so the braking force for the vehicle overall can be enhanced while demonstrating an effect of lessening depression force.

Particularly in a case of, for example, a large amount of cargo, load movement is small and large load weight is placed on the rear-wheel side during braking. According to this embodiment, the brake-fluid pressure of the wheel cylinder 5 on the rear-wheel side is heightened and the braking force on the rear-wheel side can be increased, and so there exists the advantage that braking performance can be enhanced in a case of a large amount of cargo.

Moreover, the braking force on the front-wheel side is actually established to be greater than the braking force on the rear-wheel side due to the structure of the brake pads and the like, even in a case where the brake-fluid pressure applied to the wheel cylinder 5 on the rear-wheel side has been caused to be larger than the brake-fluid pressure applied to the wheel cylinder 4 on the front-wheel side, as in this embodiment. Therefore, the rear-wheel can be prevented from falling prior to the front-wheel into a locking state even in a case where load movement or the like has occurred during vehicle braking.

In this embodiment, an example provided with an antiskid control system was described, but this embodiment can be applied also in an example not provided with an antiskid control system, as in the above-described first embodiment. In this case, the matter of the brake-fluid pressure applied to the wheel cylinder on the rear-wheel side being caused to be larger than the brake-fluid pressure applied to the wheel cylinder on the front-wheel side differs from the foregoing first embodiment.

Figure 21:
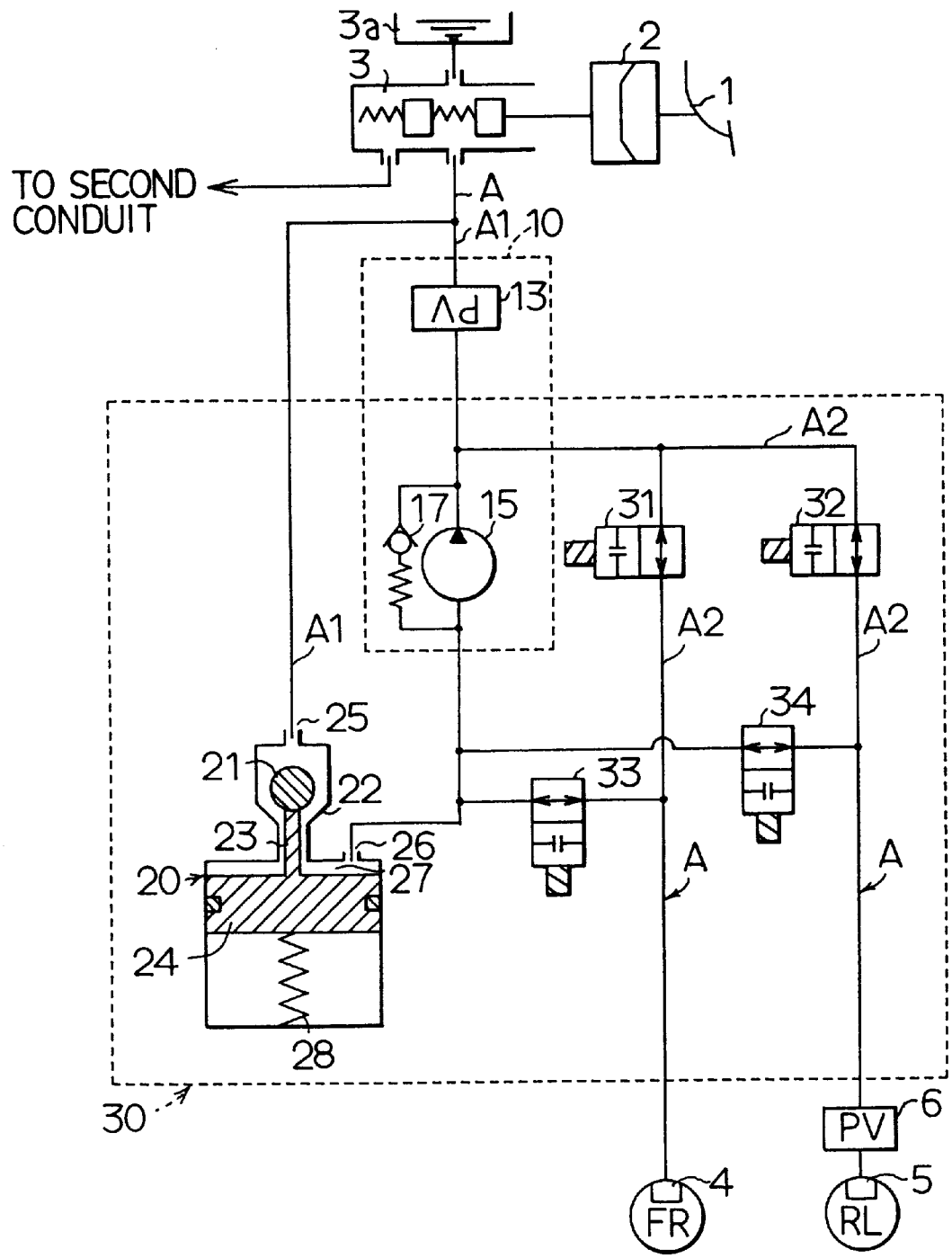
FIG. 21 is a structural view indicating a tenth embodiment of the present invention.

A tenth embodiment of the present invention will be described next with reference to FIG. 21.

The tenth embodiment combines an antiskid control system with the basic structure of a brake control apparatus; herein will be described an example wherein the brake control apparatus for a vehicle according to the present invention is applied in a vehicle of diagonal piping provided with respective conduits of connecting a front-right wheel cylinder and a rear-left wheel cylinder and of connecting a front-left wheel cylinder and a rear-right wheel cylinder in a front-wheel drive, four-wheeled vehicle.

Firstly, basic structure of the brake control apparatus will be described with reference to the model diagram indicated in FIG. 21. For structure exhibiting a mode of operation and effects similarly to the embodiments described hereinabove, symbols similar to the foregoing will be attached and description thereof will be simplified.

A first conduit A is made up of two parts separated by a pressure-amplifying device 10. Namely, the first conduit A has a first conduit part A1 to receive master-cylinder pressure PU in the interval from a master cylinder 3 to the pressure-amplifying device 10, and a second conduit part A2 in the interval from the pressure-amplifying device 10 to respective wheel cylinders 4 and 5.

The pressure-amplifying device 10 functions as a power brake which performs so-called brake assist; the pressure-amplifying device 10 moves brake fluid of the first conduit part A1 to the second conduit part A2 and holds the pressure at the second conduit part A2 at second brake-fluid pressure PL when the brake pedal 1 is depressed and the master-cylinder pressure PU is generated within the first conduit A.

According to the tenth embodiment, the pressure-amplifying device 10 is made up of a proportioning control valve (PV) 13 and a pump 15. In the structure of the first conduit A, the first conduit part A1 is formed between the proportioning control valve 13 and the master cylinder 3, and the second conduit part A2 is formed from the respective wheel cylinders 4 and 5 to the proportioning control valve 13 and the pump 15.

The pressure-amplifying device 10 provided with the pump 15 and the proportioning control valve 13 moves the brake fluid of the first conduit part A1 which is provided with the master-cylinder pressure PU accompanying depression of the brake pedal 1 to the second conduit part A2, thereby reduces the brake-fluid pressure (i.e., the master-cylinder pressure PU) within the first conduit part A1, and maintains a differential pressure of the second brake-fluid pressure PL within the second conduit part A2 and the master-cylinder pressure PU with the proportioning control valve 13. In this way, the pressure-amplifying device 10 performs pressure amplification.

The second brake-fluid pressure PL which has been caused to be greater than the master-cylinder pressure PU is applied to the respective wheel cylinders 4 and 5, so as to ensure high braking force.

In particular, according to the tenth embodiment, a relative-pressure relief valve 17 is disposed in parallel to the pump 15. This relative-pressure relief valve 17 opens in a case where brake-fluid pressure of a conduit between the proportioning control valve 13 and the pump 15 has become larger by a predetermined value than brake-fluid pressure of a conduit between the a reservoir 20 and the pump 15. That is to say, in a case where the brake-fluid pressure of the second conduit part A2 has become larger by a predetermined value than the brake-fluid pressure of the first conduit part A1, the relative-pressure relief valve 17 allows the brake fluid within the second conduit parts A2 to escape to the first conduit part A1, and thereby reduces the brake-fluid pressure within the second conduit part A2.

The brake-fluid pressure within the second conduit part A2 no longer rises to a predetermined value or more (i.e., a predetermined differential pressure or more) beyond the brake-fluid pressure of the first conduit part A1.

In this way, this embodiment employs a structure wherein an antiskid control system is combined with the basic structure of the brake control apparatus. The relative-pressure relief valve 17 is disposed in parallel with the pump 15.

In a case where the brake-fluid pressure of the second conduit part A2 has become larger by the predetermined value than the brake-fluid pressure of the first conduit part A1, the brake fluid within the second conduit part A2 is allowed to escape to the first conduit part A1 due to opening of the relative-pressure relief valve 17. The brake-fluid pressure within the second conduit part A2 can be reduced.

In a case where the brake-fluid pressure within the second conduit part A2 is reduced through the relative-pressure relief valve 17, the relative-pressure relief valve 17 functions as a relative-pressure relief valve immediately subsequently to reduction of the brake-fluid pressure. That is, when a differential pressure between the brake-fluid pressures of the first and second conduit parts A1 and A2 is the predetermined value or more, the relative-pressure relief valve opens. But thereafter, when a piston 24 of the reservoir 20 is pressed downward and the first conduit part A1 and an intake port of the pump 15 are interrupted by a ball valve 21, brake-fluid pressure is released into a reservoir chamber 27 having only approximately several atmospheres of pressure by a spring 28. Therefore, the functioning of the relative-pressure relief valve 17 approaches that of an absolute-pressure relief valve.

Figure 22:
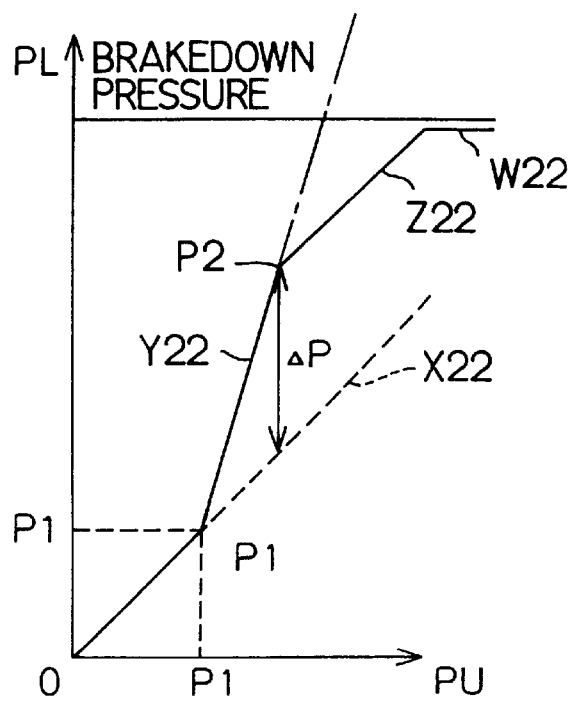
FIG. 22 is a graph indicating change in brake-fluid pressure according to the tenth embodiment.

This situation is exemplified in FIG. 22. In a case where, for example, there is no relative-pressure relief valve 17, the brake-fluid pressure (wheel-cylinder pressure PL) of the second conduit part A2 increases rapidly, as shown by line Y22 in FIG. 22. This brake-fluid pressure rapidly approaches the breakdown pressure of the second conduit part A2, as shown by the dotted line. However, in a case where the relative-pressure relief valve 17 is present, as in this embodiment, the relative-pressure relief valve 17 opens at a time when differential pressure ΔP of the wheel-cylinder pressure PL and the master-cylinder pressure PU becomes the predetermined value or more, the brake fluid is allowed to escape from the high-pressure side (i.e., the second conduit part A2) to the low-pressure side (i.e., the first conduit part A1). Therefore, the differential pressure ΔP of the wheel-cylinder pressure PL and the master-cylinder pressure PU is regulated so as to fall below a predetermined value, as shown by line Z22 in FIG. 22.

When reduction of the brake-fluid pressure within the second conduit part A2 is performed and the first conduit part A1 and the intake port of the pump 15 are interrupted by the ball valve 21 as was described above, the relative-pressure relief valve 17 exhibits functioning in the manner of an absolute-pressure relief valve as shown by line W22 in FIG. 22.

The extent of increase in the wheel-cylinder pressure PL becomes less steep, and so the wheel-cylinder pressure PL becomes less prone to reaching the conduit's breakdown pressure. Consequently, the brake-fluid pressure in the second conduit part A2 can substantially be prevented from becoming breakdown pressure or more by utilizing a relative-pressure relief valve 17. Therefore, there exists the effect that durability of the brake control apparatus is increased, and failure also becomes less frequent.

Additionally, according to this embodiment, an extreme degree of breakdown-pressure performance is not required for the brake-fluid conduit, and so breakdown-pressure of the brake-fluid conduit also can be reduced. Accordingly there exists the advantage of contribution to lower cost.

Furthermore, because this structure making it difficult for the brake-fluid pressure to reach the conduit's breakdown pressure does not utilize any sensors or the like, but rather utilizes the circuit structure itself, safety thereof is extremely high and is unaffected by failure of sensors or the like.

An eleventh embodiment will be described next with reference to FIG. 23, but description of portions similar to the above-described first embodiment will be simplified.

This embodiment combines an antiskid control system with the basic structure of a brake control apparatus, similarly to the above-described tenth embodiment, but is characterized in utilizing not merely the foregoing relative-pressure relief valve but also an absolute-pressure relief valve.

Figure 23:
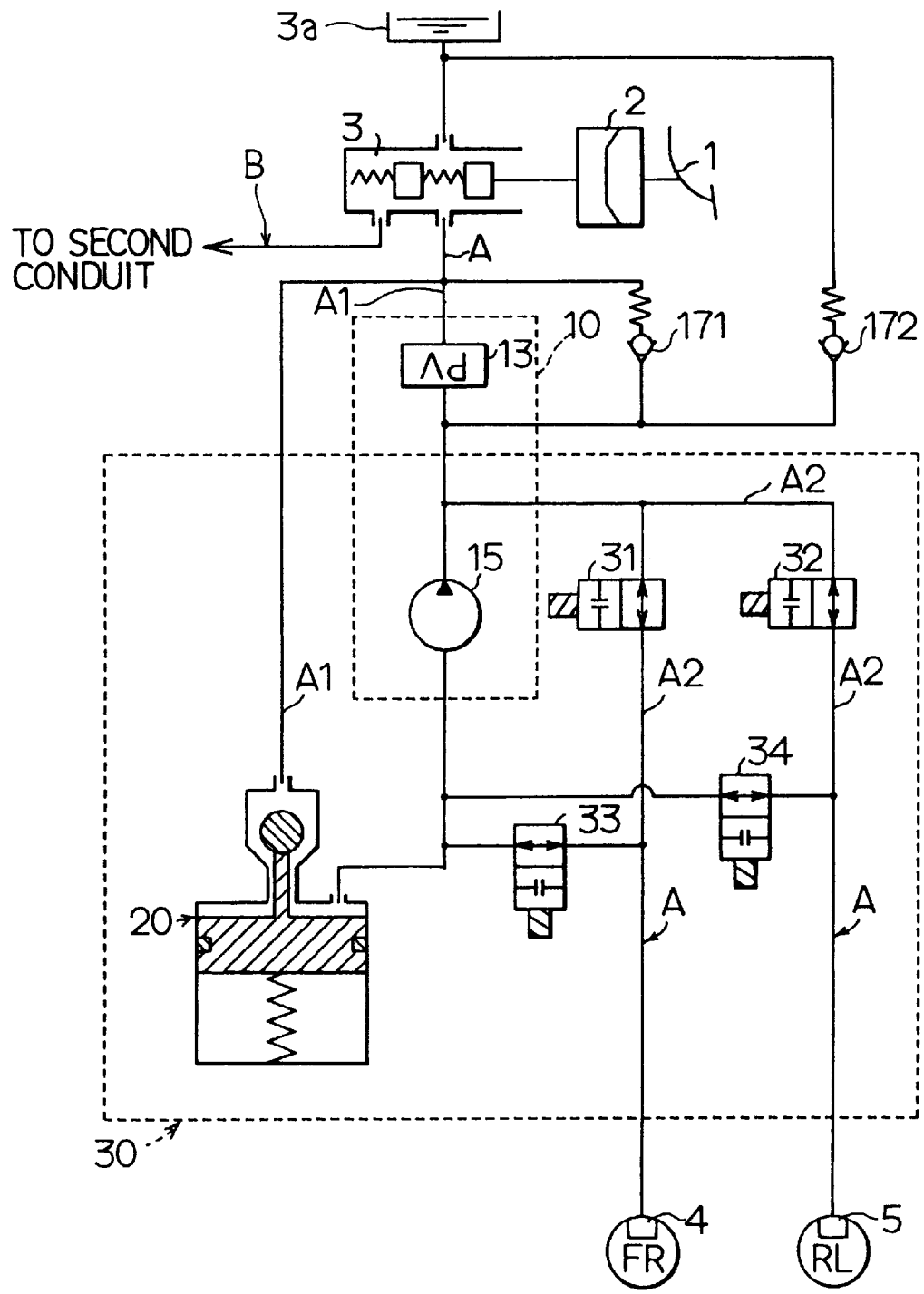
FIG. 23 is a structural view indicating an eleventh embodiment of the present invention.

In FIG. 23, a brake pedal 1 is connected to a booster 2, and a master cylinder 3 is provided with a master reservoir 3a.

Master-cylinder pressure PU is conveyed by brake fluid within a first conduit A extending to first and second wheel cylinders 4 and 5. The master-cylinder pressure PU is similarly conveyed to a second conduit B as well, but because structure similar to the first conduit A can be employed, detailed description will be omitted.

In particular, according to this embodiment, a relative-pressure relief valve 171 is disposed in parallel to a proportioning control valve 13. This relative-pressure relief valve 171 opens in a case where brake-fluid pressure of a conduit between the proportioning control valve 13 and a pump 15 has become larger by a predetermined value or more than brake-fluid pressure of a conduit between the proportioning control valve 13 and a master cylinder 3. That is to say, in a case where the brake-fluid pressure of the second conduit part A2 has become larger by a predetermined value or more than the brake-fluid pressure of the first conduit part A1, the relative-pressure relief valve 171 allows the brake fluid within the second conduit part A2 to escape to the first conduit part A1, and thereby reduces the brake-fluid pressure within the second conduit part A2.

The brake-fluid pressure within the second conduit part A2 no longer rises to a predetermined value or more beyond the brake-fluid pressure of the first conduit part A1.

Furthermore, an absolute-pressure relief valve 172 is provided in addition to the foregoing relative-pressure relief valve 171. This absolute-pressure relief valve 172 is provided in a conduit connecting the second conduit part A2 and a master reservoir 3a. In a case where the brake-fluid pressure of the second conduit part A2 has become larger by a predetermined value or more than the brake-fluid pressure (substantially atmospheric pressure) within the master reservoir 3a, the absolute-pressure relief valve 172 opens. Accordingly, the brake fluid within the second conduit part A2 is allowed to escape to the master reservoir 3a, and the brake-fluid pressure within the second conduit part A2 is reduced.

The brake-fluid pressure within the second conduit part A2 no longer rises to the predetermined value or more beyond a predetermined pressure (i.e., a pressure derived from atmospheric pressure).

In this way, this embodiment is provided with the above-described relative-pressure relief valve 171 and absolute-pressure relief valve 172. Consequently, a structure with greater safety than the foregoing first embodiment is obtained.

Figure 24:
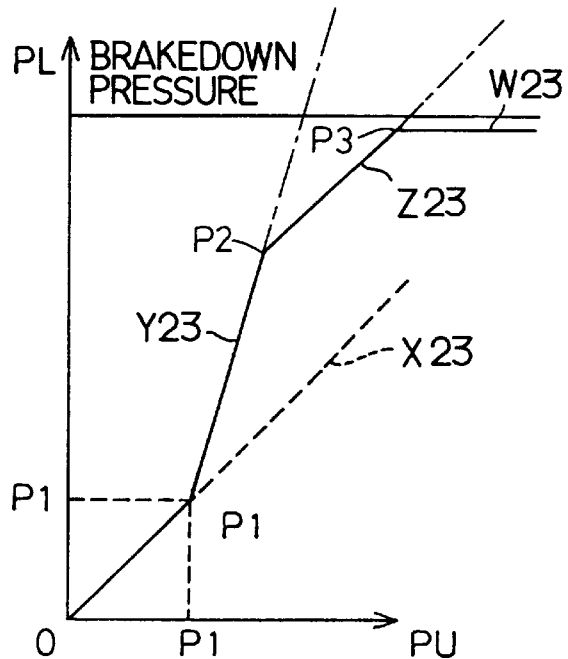
FIG. 24 is a graph indicating change in brake-fluid pressure according to the eleventh embodiment.

This situation is exemplified in FIG. 24. In a case where, for example, there exists the relative-pressure relief valve 171 but no absolute-pressure relief valve 172, the brake-fluid pressure (wheel-cylinder pressure PL) of the second conduit part A2 increases rapidly, as shown by line Y23 in FIG. 24. Thereafter, the brake-fluid pressure within the second conduit part A2 changes with a gentle slope from split-point pressure P2 and gradually approaches the breakdown pressure of the conduit, as shown by line Z23 in FIG. 24. If this state continues without change, the brake-fluid pressure PL will reach the breakdown pressure as indicated by the dotted line. However, in a case where the absolute-pressure relief valve 172 is present, as in this embodiment, the absolute-pressure relief valve 172 opens when the absolute pressure at split-point pressure P3 is reached, even when the wheel-cylinder pressure PL increases as in line Z23. Consequently, the brake fluid is allowed to escape from the high-pressure side to the low-pressure side and the conduit's brake-fluid pressure is regulated as shown by line W23 in FIG. 24 so that the breakdown voltage is not exceeded.

The wheel-cylinder pressure PL never becomes the breakdown pressure or more, and so adverse effects on the brake control apparatus due to excessive rise in brake-fluid pressure can be prevented. That is to say, there exists a remarkable advantage in being able to reliably prevent excessive rise in brake-fluid pressure in comparison with a case of solely the relative-pressure relief valve 171.

A twelfth embodiment will be described next, but description of portions similar to the above-described tenth embodiment will be simplified.

This embodiment combines an antiskid control system with the basic structure of a brake control apparatus, similarly to the foregoing tenth embodiment, but is characterized in employing a structure to control operation of the pump in substitution for the above-mentioned relative-pressure relief valve.

Figure 25:
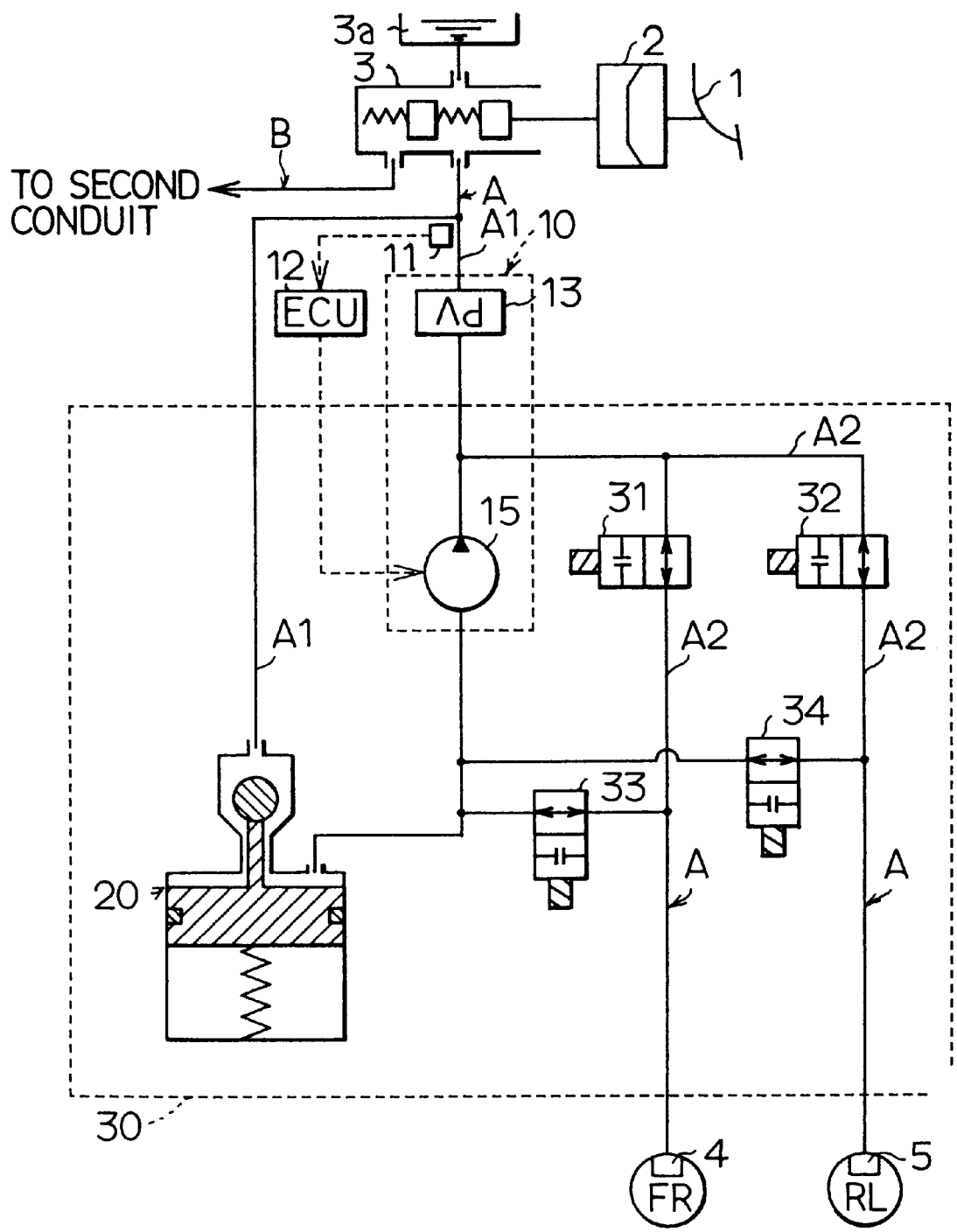
FIG. 25 is a structural view indicating a twelfth embodiment of the present invention.

Firstly, basic structure of the brake control apparatus will be described with reference to the model diagram indicated in FIG. 25.

According to this embodiment, a pressure sensor 11 for detecting brake-fluid pressure of a first conduit part A1 is provided between a proportioning control valve 13 and a master cylinder 3. Accordingly, the signal of this pressure sensor 11 is scanned by an ECU 12 and a control signal is sent from the ECU 12 to a pump 15.

Figure 26:
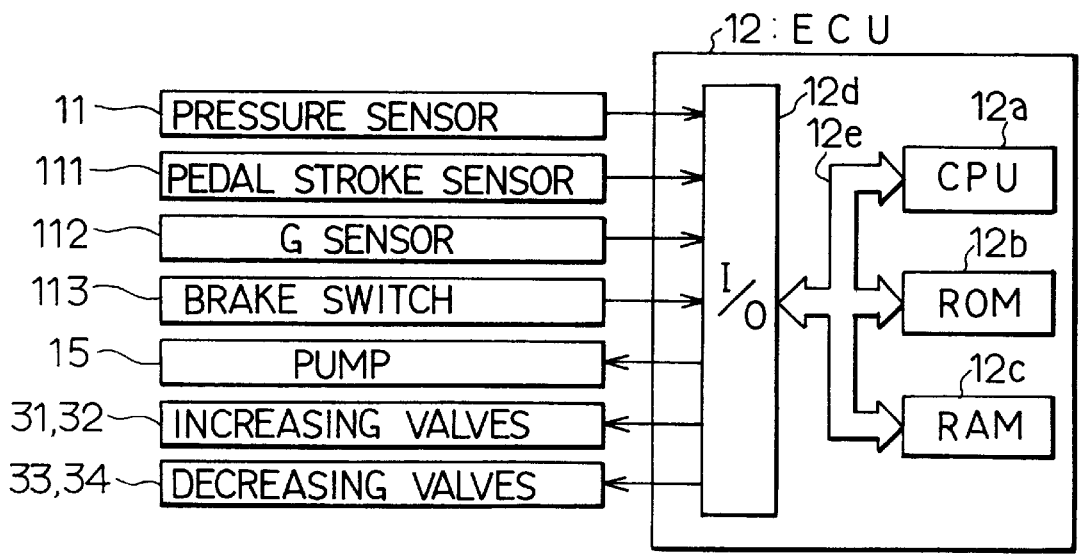
FIG. 26 is a block diagram indicating an electrical control unit of the twelfth embodiment.

The ECU 12 is provided with a CPU 12a, a ROM 12b, a RAM 12c, an input/output portion 12d, a bus line 12e, and the like of known art, as shown in FIG. 26. In addition to the pressure sensor 11, a pedal-stroke sensor 111 to detect the amount of depression of the brake pedal 1, a G sensor 112 to detect deceleration and acceleration of the vehicle, a brake switch 113 to detect depression of the brake pedal, and the like are connected to the input/output portion 14d. Further, first and second pressure-increasing control valves 31 and 32, first and second pressure-reducing control valves 33 and 34 are also connected to the input/output portion 14d.

Data on brake-fluid pressure obtained by the pressure sensor 11 represents the brake-fluid pressure in the first conduit part A1. However, because a predetermined proportional relationship exists between the brake-fluid pressure of the first conduit part A1 and the brake-fluid pressure of the second conduit part A2, the brake-fluid pressure of the second conduit part A2 can be calculated by converting the value detected by the pressure sensor 11 to the pressure of the second conduit part A2 using a map or the like. Alternatively, because the above-mentioned proportional relationship exists, the brake-fluid pressure of the first conduit part A1 also can be used unchanged as a value suggesting the brake-fluid pressure of the second conduit part A2.

Control processing performed by the ECU 12 in this embodiment will be described hereinafter with reference to the flowchart of FIG. 27. This processing is started when an ignition switch is switched on.

Figure 27:
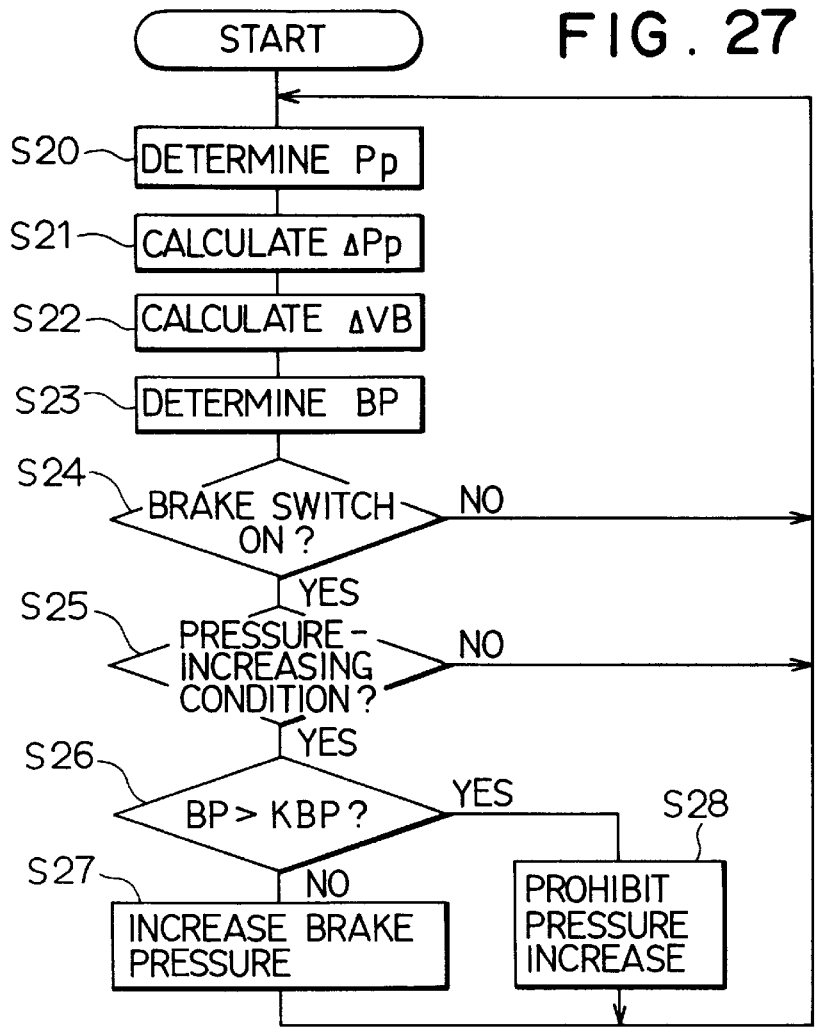
FIG. 27 is a flowchart indicating control processing of the twelfth embodiment.

In step S20 to step S23 in FIG. 27, computation is performed for conditions which permit pressure amplification by the pump 15 (i.e., pressure-increasing execution conditions).

Namely, in step S20, pedal-stroke quantity Pp is determined based on signals from the pedal-stroke sensor 111.

Next, in step S21, pedal-stroke change quantity ΔPp is computed from the pedal-stroke quantity Pp determined in the foregoing step S20.

Next, in step S22, the signal from the G sensor 112 is read and the vehicle's deceleration or acceleration ΔVB is calculated.

Next, in step S23, brake-fluid pressure BP in the first conduit part A1 is determined based on signals from the pressure sensor 11.

Next, in step S24, it is determined whether the brake pedal 1 has been depressed by determining whether the brake switch 113 is on. When an affirmative determination is made herein, the processing advances to step S25; when a negative determination is made, the processing returns to the foregoing step S20.

In step S25, it is determined whether even one of the conditions is satisfied by the values calculated in the foregoing step 20, step 21, and step 22. That is to say, the several values already calculated in the forgoing steps are compared with predetermined reference values, respectively, and it is determined whether even one of calculated values exceeds the compared reference value. When an affirmative determination is made herein, the processing advances to step S26; when a negative determination is made, the processing returns to the foregoing step S20.

In step S26, it is determined whether the detected brake-fluid pressure BP in the first conduit part A1 surpasses a predetermined reference value KBP. Here, the brake-fluid pressure BP of the first conduit part A1 is not converted to the brake-fluid pressure of the second conduit part A2. However, rather the reference value KBP for the brake-fluid pressure BP of the first conduit part A1 is established so that the brake-fluid pressure of the second conduit part A2 does not exceed the conduit's breakdown pressure. When an affirmative determination is made herein, the processing advances to step S27; when a negative determination is made, the processing advances to step S28.

In step S27, because pressure increase has been permitted, the pump 15 is driven and increase in the brake-fluid pressure of the second conduit part A2 is executed.

Additionally, in step S28, pressure increase has been prohibited. That is, drive of the pump 15 is stopped and increase in the brake-fluid pressure of the second conduit part A2 is prohibited, and the processing returns to step 20.

In this way, according to this embodiment, drive of the pump 15 is prohibited in a case where none of the predetermined pressure-increasing execution conditions is satisfied or in a case where the brake-fluid pressure BP of the first conduit part A1 (which suggests the brake-fluid pressure of the second conduit part A2) exceeds the reference value KBP, even in a case where the brake pedal 1 has been depressed. Accordingly, the brake-fluid pressure of the second conduit part A2 can be prevented from rising excessively and reaching the conduit's breakdown pressure.

According to this embodiment, the pressure sensor 11 was disposed in the first conduit part A1, but the pressure sensor 11 may be disposed in the second conduit part A2. In this case, the brake-fluid pressure of the second conduit part A2 can be directly detected, and there exists the advantage that appropriate action based on more accurate brake-fluid pressure can be undertaken, and computational processing as well can be reduced.

A thirteenth embodiment will be described next. Description of portions similar to the above-described twelfth embodiment will be simplified or omitted.

Figure 28:
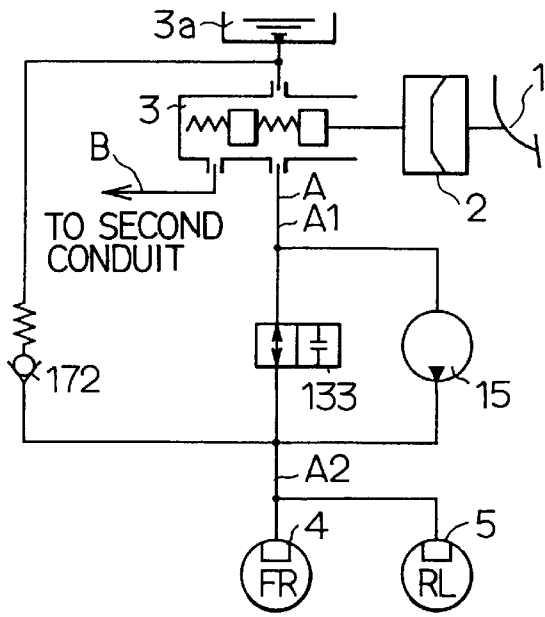
FIG. 28 is a structural view indicating a thirteenth embodiment of the present invention.

According to this embodiment, as shown in FIG. 28, a two-way valve 133 controlled at two positions (open or closed), and not a proportioning control valve, is provided in a first conduit A between a master cylinder 3 and a wheel cylinders 4 and 5.

A pump 15 is also disposed in parallel to this two-way valve 133. The pump 15 sends brake fluid under pressure from a first conduit part A1 to a second conduit part A2, and increases the brake-fluid pressure of the second conduit part A2 to more than the brake-fluid pressure of the first conduit part A1.

Furthermore, an absolute-pressure relief valve 172 is provided in the interval between a master reservoir 3a and a conduit (second conduit location A2) between the two-way valve 133 and the wheel cylinders 4 and 5. This absolute-pressure relief valve 172 is opened in a case where the brake-fluid pressure of the second conduit part A2 has become a predetermined value (i.e., an absolute pressure) or more. The absolute-pressure relief valve 172 allows brake fluid to escape from a high-pressure side to a low-pressure side (the master reservoir 3a side: atmospheric pressure).

Consequently, in this embodiment, there exists an advantage that the brake-fluid pressure of the second conduit part A2 can reliably be prevented from rising to the conduit's breakdown pressure, similarly to a case where the absolute-pressure relief valve of the above-described embodiments was utilized.

A fourteenth embodiment will be described next with reference to FIG. 29.

Firstly, basic structure of the brake control apparatus will be described with reference to the model diagram indicated in FIG. 29.

Figure 29:
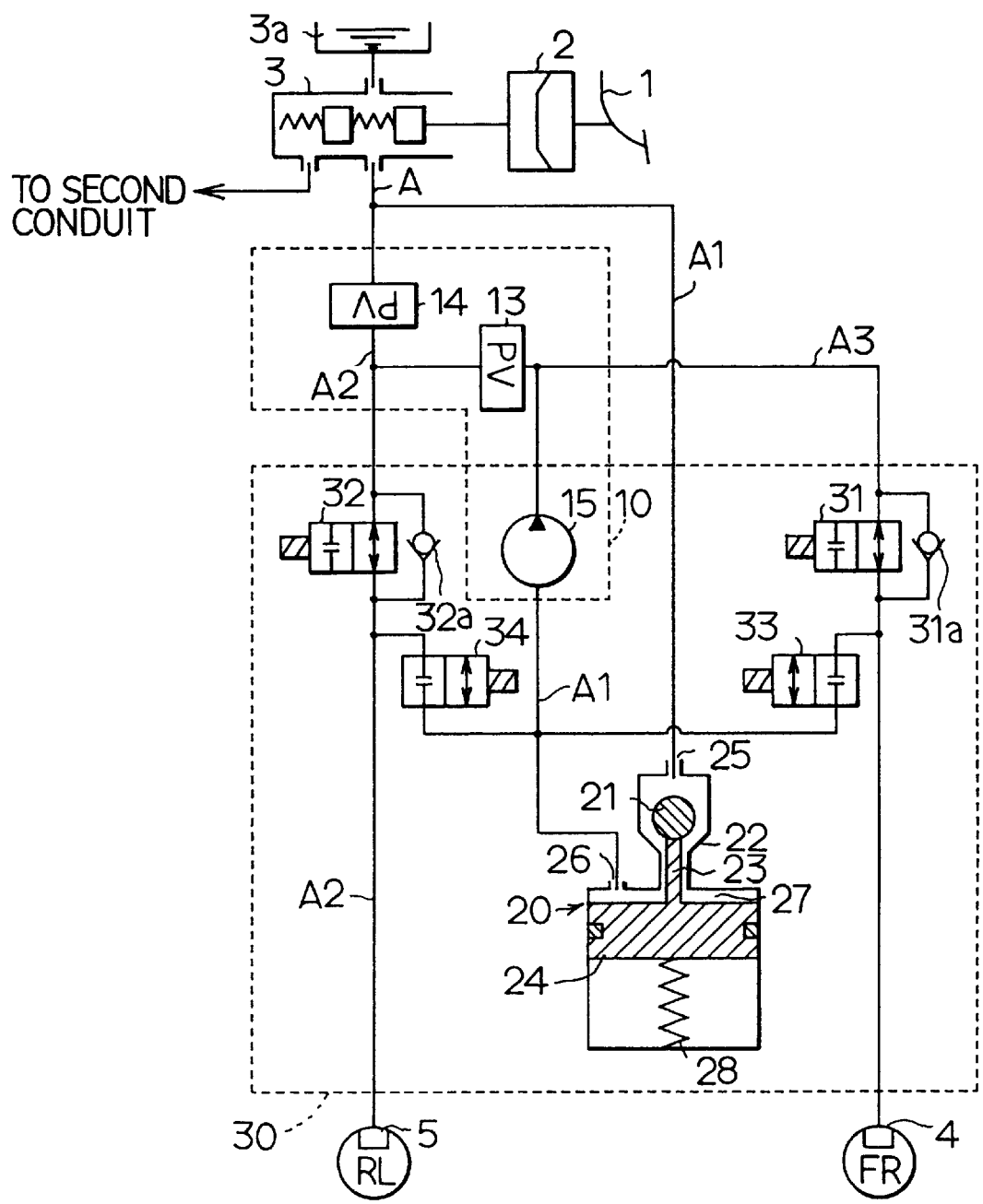
FIG. 29 is a structural view indicating the fourteenth embodiment of the present invention.

As shown in FIG. 29, a first conduit A is made up of three parts separated by a first proportioning control valve (PV) 14, a second proportioning control valve 13, and a pump 15 disposed in the first conduit A.

That is to say, the first conduit A has a first conduit part A1 to receive master-cylinder pressure Pu in the interval from a master cylinder 3 to the first proportioning control valve 14 and the intake side of the pump 15 (via a reservoir 20), a second conduit part A2 in the interval from the first proportioning control valve 14 to the second proportioning control valve 13 and a second wheel cylinder 5, and a third conduit part A3 in the interval from the discharge side of the pump 15 to the second proportioning control valve 13 and a first wheel cylinder 4.

Additionally, the first proportioning control valve 14 is disposed in a reverse direction within a conduit between the master cylinder 3 and the second conduit part A2, and the second proportioning control valve 13 is disposed in a reverse direction within a conduit between the second conduit part A2 and the third conduit part A3. The pump 15 is disposed in a conduit between the reservoir 20 and the third conduit part A3, and is structured to take in brake fluid from the first conduit part A1 and discharge brake fluid to the third conduit part A3 during generation of the master-cylinder pressure PU.

According to this embodiment, a pressure-amplifying device 10 is structured by the first and second proportioning control valves 14 and 13 and the pump 15.

Consequently, when the pump 15 is driven at a time when the brake pedal 1 is depressed and the master-cylinder pressure PU is being generated within the first conduit part A1, brake fluid in the first conduit part A1 is moved to the third conduit part A3. Therefore, the brake-fluid pressure of the third conduit part A3 is increased and held at an increased third brake-fluid pressure BP3 by the second proportioning control valve 13. At this time, a second brake-fluid pressure BP2 of the second conduit part A2 is established to be lower than the third brake-fluid pressure BP3 by pressure in accordance with a predetermined attenuating ratio due to the action of this second proportioning control valve 13. Accordingly, the relationship of the first through third conduit parts A1 to A3 becomes: master-cylinder pressure PU (first brake-fluid pressure BP1) <second brake-fluid pressure BP2<third brake-fluid pressure BP3.

For this reason, the second brake-fluid pressure BP2 which has been caused to be higher than the master-cylinder pressure PU is applied to the second wheel cylinder 5. Thus, pressure that is to a certain extent high is applied to the rear-wheel side (i.e., to the rear-left wheel RL) so as to ensure braking force. Furthermore, the third brake-fluid pressure BP3 which has been caused to be higher than the second brake-fluid pressure BP2 is applied to the first wheel cylinder 4. Accordingly, pressure higher than for the rear-wheel side is applied to the front-wheel side (i.e., to the front-right wheel FR) and higher braking force is ensured.

In this way, according to this embodiment, the first proportioning control valve 14 is disposed in the reverse direction within the conduit between the master cylinder 3 and the second conduit part A2, the second proportioning control valve 13 is also disposed in the reverse direction by the conduit between the second conduit part A2 and the third conduit part A3, and the pump 15 is disposed in the conduit between the reservoir 20 and the third conduit part A3 and is structured to take in brake fluid from the first conduit part A1 and discharge brake fluid to the third conduit part A3.

Consequently, when the pump 15 is driven at a time when the brake pedal 1 is depressed and the master-cylinder pressure PU is being generated within the first conduit part A1, the master-cylinder pressure PU (first brake-fluid pressure BP1) of the first conduit part A1 becomes less than the second brake-fluid pressure BP2 of the second conduit part A2, which in turn becomes less than the third brake-fluid pressure BP3 of the third conduit part A3.

Therefore, the third brake-fluid pressure BP3 having the highest pressure is applied to the first wheel cylinder 4, and so high pressure is imparted to the front-wheel side (i.e., to the front-right wheel FR) and high braking force can be demonstrated. Meanwhile, the second brake-fluid pressure BP2 which is lower than the third brake-fluid pressure BP3 is applied to the second wheel cylinder 5, and so the rear-wheel side (i.e., to the rear-left wheel RL) becomes less susceptible to locking than the front-wheel side.

Due to the structure as described above, ideal braking-force distribution at the front and rear wheels is obtained. That is, the brake-fluid pressure applied to the wheel cylinder 4 on the front-wheel side is caused to be greater than the brake-fluid pressure applied to the wheel cylinder 5 on the rear-wheel side and brake-fluid pressure can be established at a high value overall, and so braking force for the vehicle overall can be enhanced while demonstrating an effect of lessening depression force.

Additionally, the respective proportioning control valves 13 and 14 may be caused not merely to differ in split-point pressure, but, for example, also may be caused to differ in pressure-receiving surface-area ratios, as was described in detail in FIG. 11. Due to the difference in the pressure-receiving surface-area ratios, when the pressure-increasing gradient of the proportioning control valve 13 is established so as to be greater than the pressure-increasing gradient of the proportioning control valve 14, ideal brake fluid-force distribution can be approached yet more closely. That is to say, the attenuation ratio of the proportioning control valve 13 may be established so as to be greater than the attenuation ratio of the proportioning control valve 14.

A fifteenth embodiment will be described next; description of portions similar to the above-described fourteenth embodiment will be simplified.

This embodiment provides the basic structure of a brake control apparatus and an antiskid control system, similarly to the above-described fourteenth embodiment, but a state wherein pressure is applied is oppositely to the foregoing fourteenth embodiment with respect to the front-wheel side and the rear-wheel side.

Figure 30:
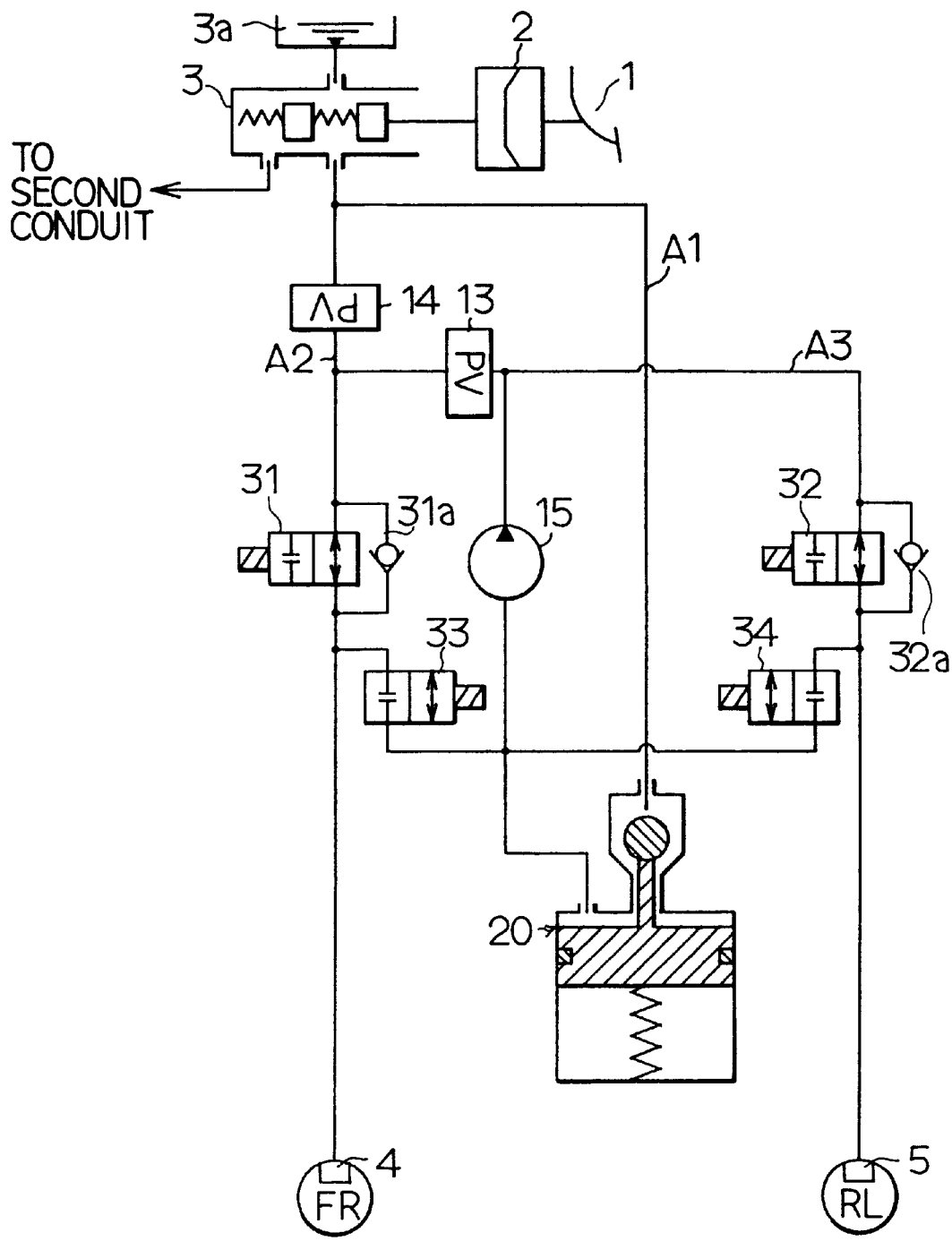
FIG. 30 is a structural view indicating the fifteenth embodiment of the present invention.

As shown in FIG. 30, according to this embodiment, structure of first and second proportioning control valves 14 and 13, a pump 15, first through third conduit parts A1 to A3, a reservoir 20, and so on is similar to the above-described fourteenth embodiment. However, this embodiment differs from the foregoing fourteenth embodiment in that a first wheel cylinder 4 performing braking of the front-right wheel FR is connected to the second conduit part A2, and a second wheel cylinder 5 performing braking of the rear-left wheel RL is connected to the third conduit part A3.

Consequently, brake-fluid pressure which is small (but which is larger than master-cylinder pressure PU) is applied to a first wheel cylinder 4 of the front-right wheel FR, and brake-fluid pressure larger than the first wheel cylinder 4 is applied to a second wheel cylinder 5 of the rear-left wheel RL.

Due to structure such as this, the brake-fluid pressure applied to the second wheel cylinder 5 on the rear-wheel side is caused to be greater than the brake-fluid pressure applied to the first wheel cylinder 4 on the front-wheel side. Brake-fluid pressure can be established at a high value overall, and so braking force for the vehicle overall can be enhanced while demonstrating an effect of lessening depression force.

Particularly in a case of, for example, a large amount of cargo, Load movement of the vehicle is small and large load weight is placed on the rear-wheel side during braking. According to this embodiment, the brake-fluid pressure of the second wheel cylinder 5 on the rear-wheel side is heightened and the braking force on the rear-wheel side can be increased, and so there exists the advantage that braking performance can be enhanced in a case of a large amount of cargo.

Moreover, the braking force on the front-wheel side is actually established to be greater than the braking force on the rear-wheel side due to the structure of the brake pads and the like, even in a case where the brake-fluid pressure applied to the second wheel cylinder 5 on the rear-wheel side has been caused to be larger than the brake-fluid pressure applied to the first wheel cylinder 4 on the front-wheel side, as in this embodiment. Because of this, the rear-wheel side can be prevented from falling prior to the front-wheel side into a locking state in a case where load movement or the like has occurred during vehicle braking.

Furthermore, a similar mode of operation and effects can be expected even when one or both of the first and second proportioning control valves 14 and 13 is replaced with a two-way valve or an aperture.

A sixteenth embodiment will be described next. Description of portions similar to the embodiments described hereinabove will be simplified.

Firstly, basic structure of the brake control apparatus will be described with reference to the model diagram indicated in FIG. 31.

Figure 31:
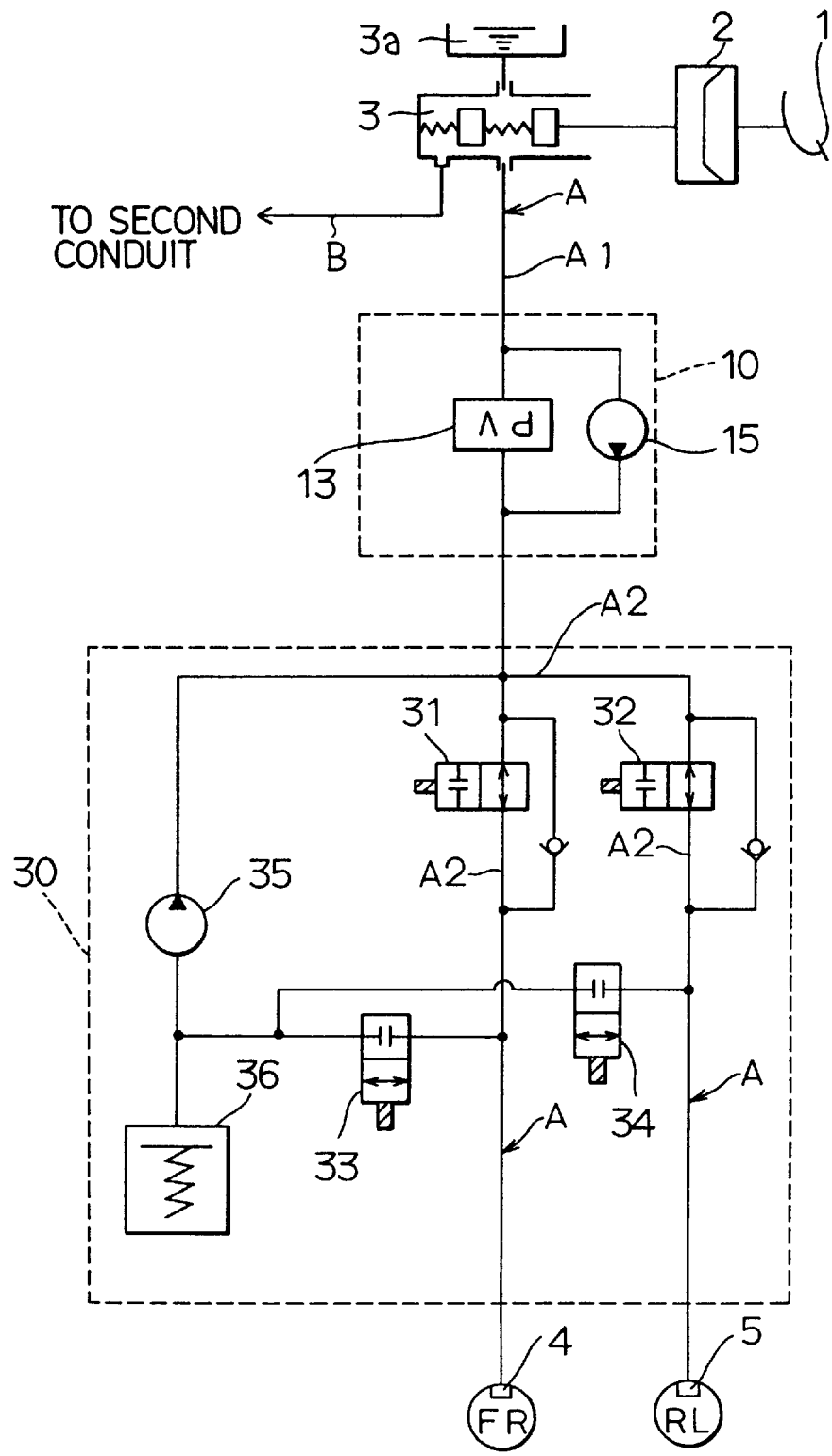
FIG. 31 is a structural view indicating the sixteenth embodiment of the present invention.

In FIG. 31, a brake pedal 1 is connected to a booster 2, and a master cylinder 3 is provided with a master reservoir 3a.

Master-cylinder pressure PU is conveyed by brake fluid within a first conduit A extending to first and second wheel cylinders 4 and 5. The master-cylinder pressure PU is similarly conveyed to a second conduit as well, but because structure similar to the first conduit A can be employed, detailed description will be omitted.

The first conduit A is made up of two parts separated by a pressure-amplifying device 10. The first conduit A has a first conduit part A1 to receive the master-cylinder pressure PU in the interval from the master cylinder 3 to the pressure-amplifying device 10, and a second conduit part A2 in the interval from the pressure-amplifying device 10 to the respective wheel cylinders 4 and 5.

The pressure-amplifying device 10 moves brake fluid of the first conduit part A1 to the second conduit part A2 and holds the pressure at the second conduit part A2 at second brake-fluid pressure PL when the brake pedal 1 is depressed and the master-cylinder pressure PU is generated within the first conduit A.

According to this embodiment, this pressure-amplifying device 10 is made up of a proportioning control valve (PV) 13 and a pump 15 as a device for holding pressure.

The pump 15 is connected to the first conduit A in parallel with the proportioning control valve 13, and takes in brake fluid from the first conduit part A1 and discharges brake fluid to the second conduit part A2 during generation of the master-cylinder pressure PU.

The proportioning control valve 13 is disposed in the first conduit A in reverse, similarly to the foregoing first embodiment. In a case where brake fluid from the first conduit part A1 has been moved to the second conduit part A2 by the pump 15 and the brake-fluid pressure of the second conduit part A2 has become the second brake-fluid pressure PL which is greater than the master-cylinder pressure PU, the proportioning control valve 13 acts to maintain this differential pressure (PL–PU).

Additionally, according to this embodiment, an antiskid system 30 is disposed in the second conduit part A2 without causing the pump 15 to be a common device. That is to say, the antiskid system 30 includes an independent ABS pump 35. Moreover, an ABS reservoir 36 is not disposed in the intake passage of the pump 15. That is, the pressure-amplifying device 10 is not coexisted in the structure of the antiskid system 30.

Figure 32:
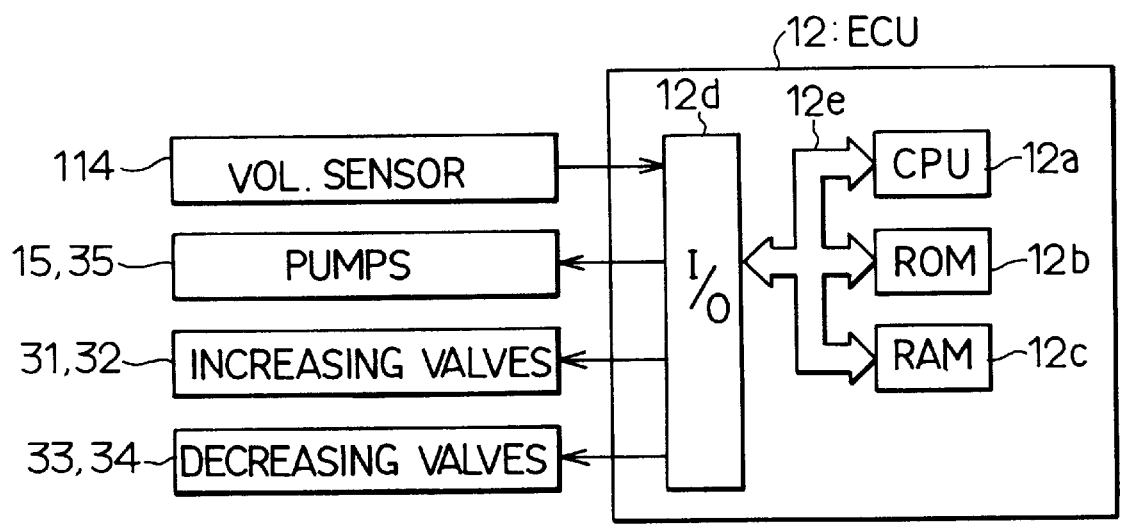
FIG. 32 is a block diagram indicating an electrical control unit of the sixteenth embodiment.

Antiskid control and control which causes brake fluid to be moved from the master cylinder 3 side to the side of the wheel cylinders 4 and 5 to heighten braking force are performed by an electronic control unit (ECU) 12 as shown in FIG. 32.

This ECU 12 is structured as a microcomputer provided with a CPU 12a, a ROM 12b, a RAM 12c, an input/output portion 12d, a bus line 12e, and the like of known art. A voltage sensor 114 to detect abnormality of the foregoing pump 35 for antiskid-control based on an applied voltage thereto is connected to the input/output portion 12d. Further, the pumps 15 and 35, first and second pressure-increasing control valves 31 and 32, first and second pressure-reducing control valves 33 and 34 are connected to the input/output portion 12d as well.

Control processing performed by this ECU 12 will be described hereinafter.

Figure 33:
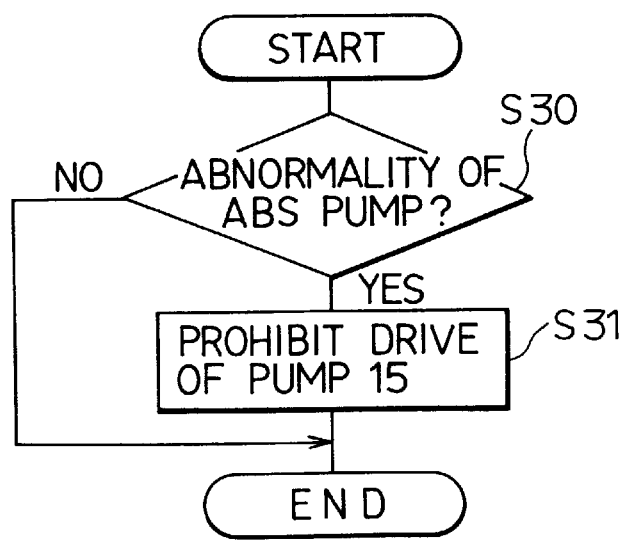
FIG. 33 is a flowchart indicating control processing of the sixteenth embodiment.

As shown in the flowchart in FIG. 33, in step S30, the state of voltage applied to the pump 35 for antiskid-control is detected by the voltage sensor 114, and it is determined on a basis of the signal from this voltage sensor 114 whether an abnormality has occurred in the pump 35. When determined herein that an abnormality has occurred, in step S31 drive of the pump 15 of the pressure-amplifying device 10 is prohibited.

In this way, this embodiment employs a structure wherein an antiskid control system is combined with the basic structure of the above-described brake control apparatus, but unlike the foregoing fifteenth embodiment, the pump 10 of the pressure-amplifying device 10 and the pump 35 for antiskid-control are provided separately.

Additionally, in a case where abnormality of the pump 35 for antiskid-control has been detected by the voltage sensor 114, drive of the pump 15 of the pressure-amplifying device 10 is prohibited.

For this reason, in a case where some abnormality has occurred in the pump 35 for antiskid-control and pressure-reducing control for the wheel-cylinder pressure cannot be performed, pressure-increasing control of the wheel-cylinder pressure to increase braking force by the pump 15 of the pressure-amplifying device 10 is prevented.

That is to say, in a case where antiskid control cannot favorably be performed, increase of the wheel-cylinder pressure by the pump 15 of the pressure-amplifying device 10 is caused to be impossible. Therefore, wheel locking can be prevented, and, accordingly there exists an effect of improvement in braking performance in braking control and further enhancement of safety.

According to this embodiment, abnormality of the pump 35 was detected, but other than this, in a case where safety is to be further heightened, abnormalities of the reservoir 36, the first and second pressure-increasing control valves 31 and 32, the first and second pressure-reducing control valves 33 and 34, may be detected so as to prohibit drive of the pump 15 of the pressure-amplifying device 10 in a case where these abnormalities have been detected.

A case employing a structure wherein the pump 15 is utilized in common for pressure-increasing of the second brake-fluid pressure PL of the second conduit part A2 and for antiskid control in a structure wherein an antiskid-control system is combined with the basic structure of a brake control apparatus, as was indicated in FIG. 6, will be described hereinafter.

In FIG. 6, the pump 15 which moves the brake fluid of the first conduit part A1 the reservoir 20 to the second conduit part A2 and heightens the second brake-fluid pressure PL, and the pump 15 which in antiskid control takes in the brake fluid within the reservoir 20 which has escaped from the respective wheel cylinders 4 and 5 because of reduction of wheel-cylinder pressure, are caused to be a common device.

For this reason, in a case where, hypothetically speaking, some mechanical abnormality or the like should occur in the structure (particularly the pump 15) for antiskid-control, because the same pump 15 is utilized for the pressure-amplifying device 10 as well, performing pressure-increasing control of the wheel-cylinder pressure to increase braking force by the pressure-amplifying device 10 also becomes impossible.

That is to say, in FIG. 6, the pump 15 for antiskid-control and the pump 15 utilized as the pressure-amplifying device 10 are shared. Therefore, even in a case where the pump 15 fails and antiskid control becomes impossible, increase in the wheel-cylinder pressure by the pressure-amplifying device 10 naturally also becomes impossible. Accordingly, there exists an effect wherein safety in braking control is also further enhanced with the embodiment illustrated in FIG. 6.

Additionally, because it is unnecessary to provide two pumps for discrete uses, there exists an advantage that structure is simplified and cost as well can be reduced.

A seventeenth embodiment will be described next with reference to FIG. 34.

Firstly, basic structure of the brake control apparatus will be described with reference to the model diagram indicated in FIG. 34. For structure exhibiting a mode of operation and effects similarly to the embodiments described hereinabove, symbols similar to the foregoing will be attached and description thereof will be omitted.

A switching device 100 which is a characteristic of this embodiment will be described hereinafter.

This switching device 100 switches braking by a pressure-amplifying device 10 (i.e., a power brake), and braking due to a normal brake.

The switching device 100 is made up of a first switching control valve 102 disposed in a conduit between a master cylinder 3 and a first pressure-increasing control valve 31, and a second switching control valve 101 disposed in a conduit between the master cylinder 3 and a proportioning control valve 13. These first and second switching control valves 102 and 101 are solenoids which switch a conduit to either of two states, i.e., open or closed, according to a control signal. A check valve 103 is disposes in parallel with the first switching control valve 102.

Figure 34:
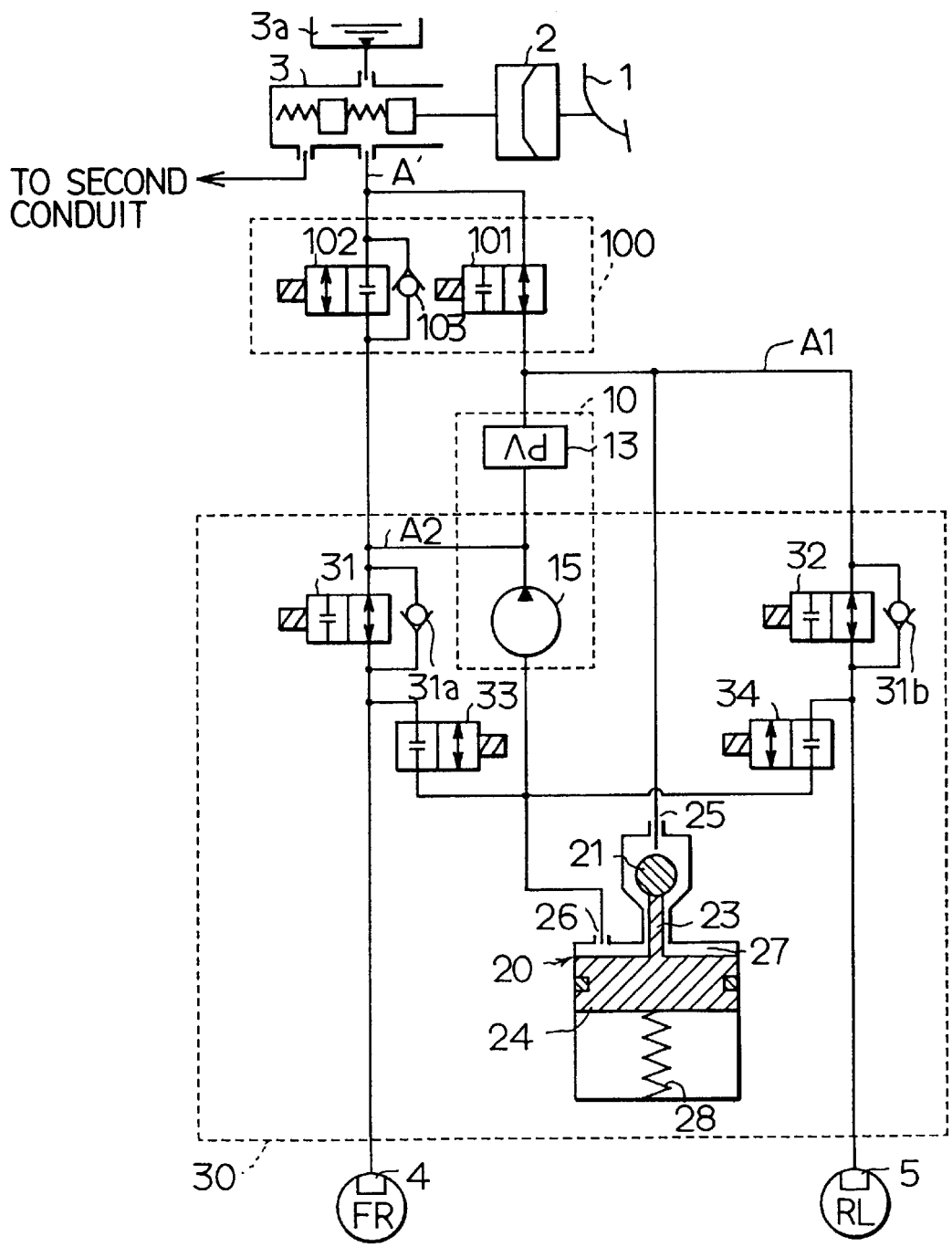
FIG. 34 is a structural view indicating a seventeenth embodiment of the present invention.

Consequently, in a case where brake-fluid pressure is heightened and braking force is heightened utilizing the pressure-amplifying device 10, the first switching control valve 102 is established at the closed position and the second switching control valve 101 is established at the open position, as shown in the FIG. 34. Because a first wheel cylinder 4 on the front-wheel side is connected to a discharge side of the pump 15 via a second conduit part A2, the High-pressure second brake-fluid pressure PL is applied to the first wheel cylinder 4. In contrary, master-cylinder pressure PU lower than the second brake-fluid pressure PL is applied to a second wheel cylinder 5 on the rear-wheel side.

Figure 35:
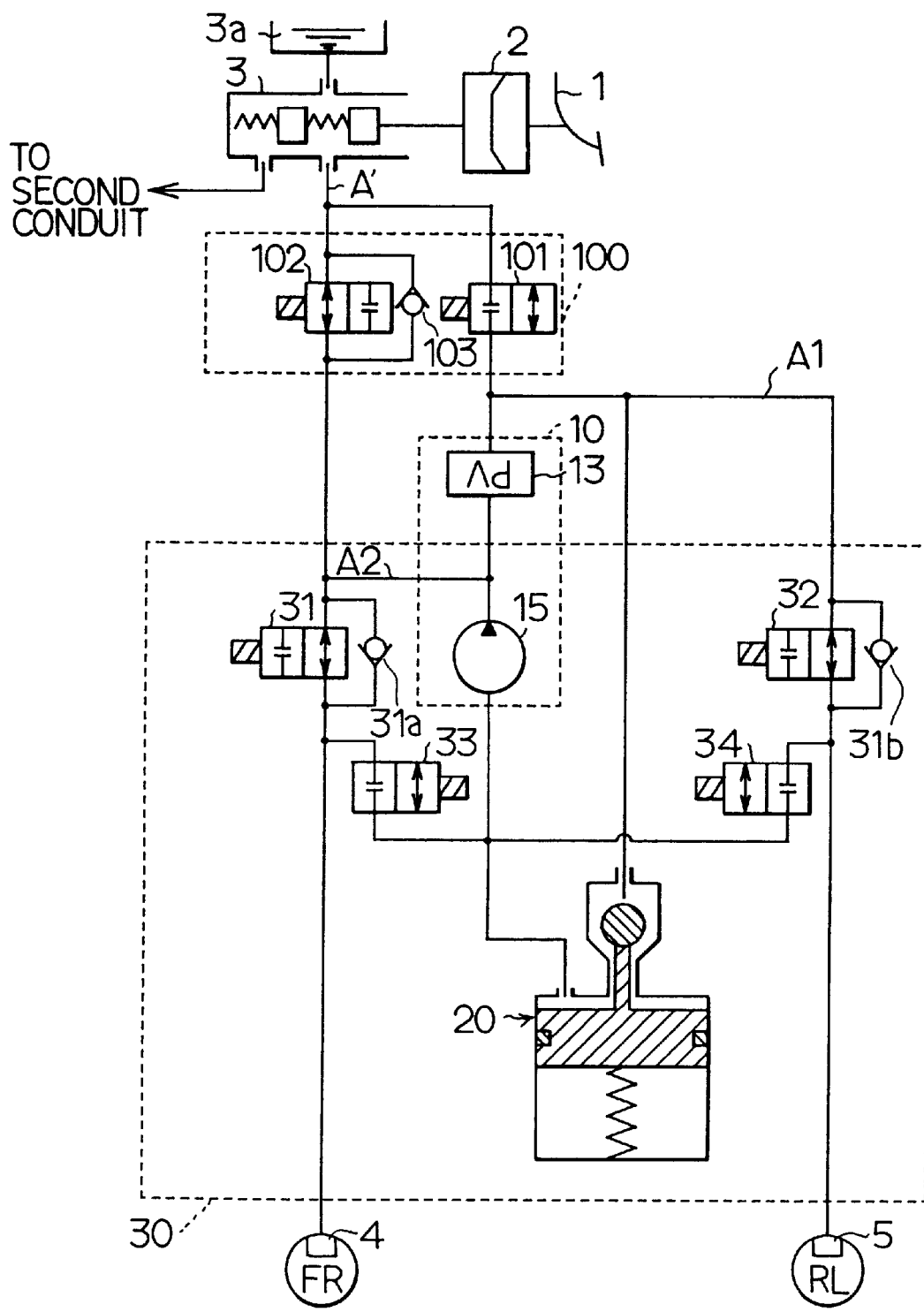
FIG. 35 is a structural view indicating operation of an brake control apparatus according to the seventeenth embodiment.

Meanwhile, in a case of performing operation by normal braking, the pump 15 of the pressure-amplifying device 10 is not driven. The first switching control valve 102 is established at the open position and the second switching control valve 101 is established at the closed position (this is the state when electrification of the two switching control valves 102 and 101 has been switched off), as shown in FIG. 35. Due to this, a normal brake is obtained wherein the master-cylinder pressure PU is applied via the first switching control valve 102 in a communicated state to the first wheel cylinder 4 on the front-wheel side, and brake-fluid pressure which has been caused by the proportioning control valve 13 to be lower than the master-cylinder pressure PU is applied to the second wheel cylinder 5 on the rear-wheel side.

Figure 36:
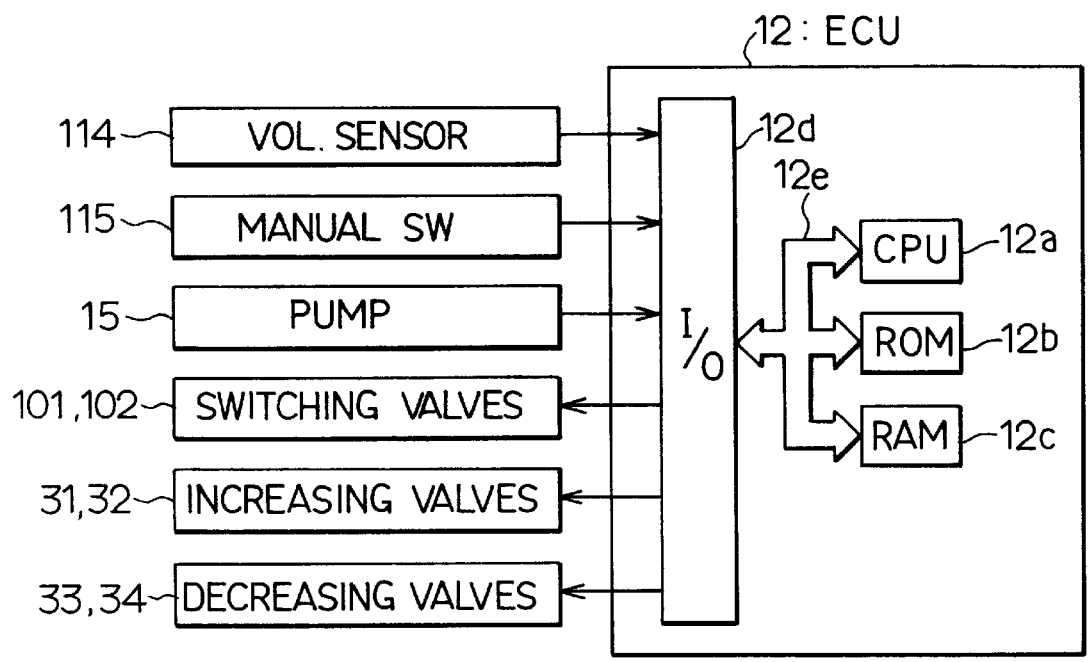
FIG. 36 is a block diagram indicating an electrical control unit of the seventeenth embodiment.

The above-described control by the switching device 100 and control which moves brake fluid from the master cylinder 3 side to the side of the wheel cylinders 4 and 5 and thereby heightens braking force are performed by an electronic control unit (ECU) 12 shown in FIG. 36.

This ECU 12 is structured as a microcomputer provided with a CPU 12a, a ROM 12b, a RAM 12c, an input/output portion 12d, a bus line 12e, and the like of known art. A manual selector switch 115 to switch between a power-braking state and a normal-braking state and a voltage sensor 114 as a device for detecting abnormality of the pump 15 based on voltage applied thereto are connected to the input/output portion 12d. The first and second switching control valves 102 and 101, along with first and second pressure-increasing control valves 31 and 32, first and second pressure-reducing control valves 33 and 34, also are connected to the input/output portion 12d.

Drive control of the switching device 100 performed by this ECU 12 will be described next with reference to the flowchart in FIG. 37.

Figure 37:
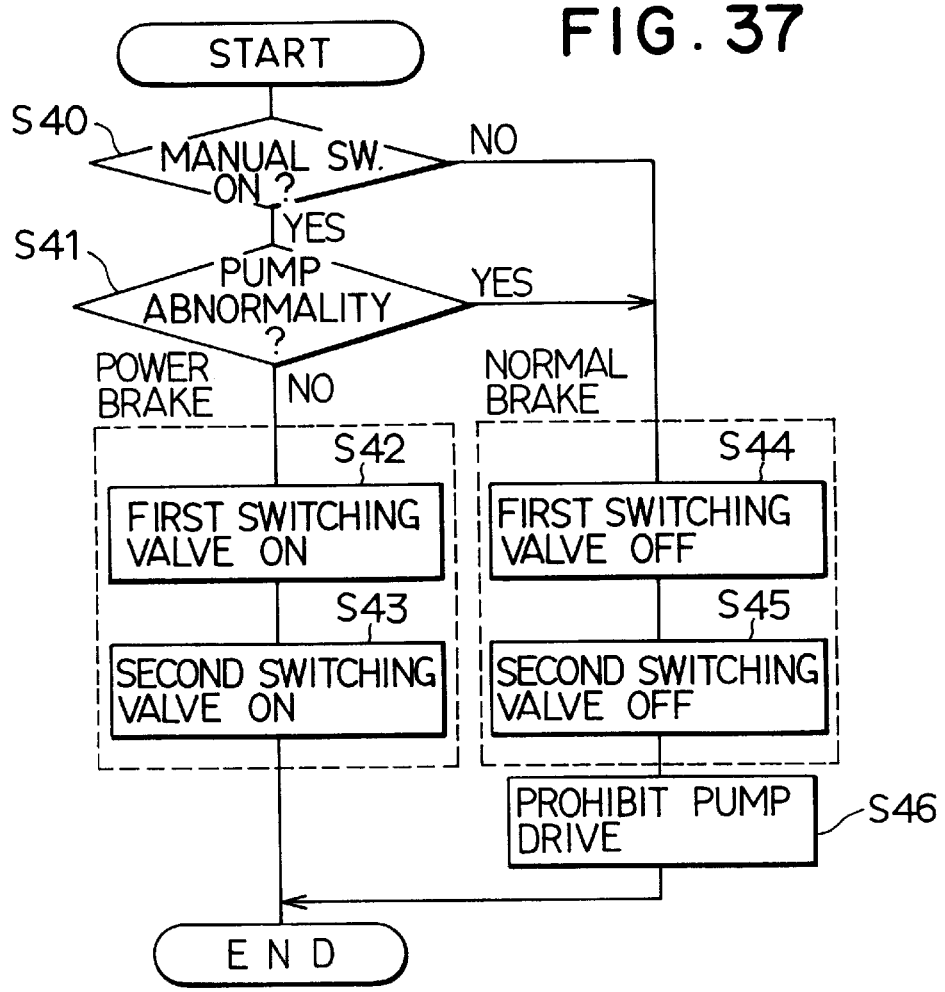
FIG. 37 is a flowchart indicating control processing of the seventeenth embodiment.

Firstly, in step S40 in FIG. 37, it is determined whether the manual selector switch 115 is on or off. That is to say, it is determined whether the power-braking state (switch 115 is on) has been established or the normal-braking state (switch 115 is off) has been established. In a case where the manual selector switch 115 is herein on, the processing advances to step S41; in a case where the switch 115 is off, the processing advances to step S44.

In step S41, it is determined on a basis of a signal from the voltage sensor 114 whether an abnormality has occurred in the pump 15. When determined herein that an abnormality has occurred, the processing advances to step S44; when determined that no abnormality has occurred, the processing advances to step S42.

In step S42, the state is such that power braking has been permitted, and so firstly the first switching control valve 102 is switched on to obtain an interrupted state, and subsequently in step S43, the second switching control valve 101 is switched off to obtain a communicated state. Thereafter, the processing is terminated. In short, a state wherein power braking can be utilized is obtained by this, as shown in FIG. 34.

Meanwhile, in step S44, the state is such that power braking is not permitted, and so firstly the first switching control valve 102 is switched off to obtain a communicated state, and subsequently in step S45, the second switching control valve 101 is switched off to obtain an interrupted state. Subsequently in step S46, actuation of the pump 15 for power braking is prohibited, and the processing is terminated. In short, a state wherein normal braking can be utilized is obtained by this, as shown in FIG. 35.

In this way, according to this embodiment, a state where power braking is utilized and a state where normal braking is utilized can be switched by controlling the first and second switching control valves 102 and 101 on a basis of signals from the manual selector switch 115 and the voltage detector 114.

Consequently, in a case where, for example, a state in which power braking cannot be normally used has occurred due to an abnormality in the pump 15, the brake-fluid pressures of the front-wheel side and the rear-wheel side may become equal, and the rear-wheel side may become susceptible to locking prior than the front-wheel side. As a result, braking may become unstable. However, according to this embodiment, when such an abnormality in the pump 15 is detected by the voltage detector 114, the state can be switched to normal braking. That is to say, in a case where an abnormality in the pump 15 has occurred, the switching device 100 switches to a normal braking state wherein the ordinary proportioning control valve 13 is connected in the normal direction. Accordingly, ideal braking-force distribution at the front and rear wheels can be obtained, and so an effect is demonstrated wherein stabilized braking can be performed.

Additionally, because the power-braking state and the normal-braking state can be suitably switched through manipulation of the manual selector switch 115 by the driver, even in a case of no abnormality in the pump 15, favorable multiple-mode operation becomes possible.

An eighteenth embodiment will be described next with reference to FIG. 38. Description of portions similar to the embodiments described hereinabove will be simplified.

Firstly, basic structure of the brake control apparatus will be described with reference to the model diagram indicated in FIG. 38.

Figure 38:
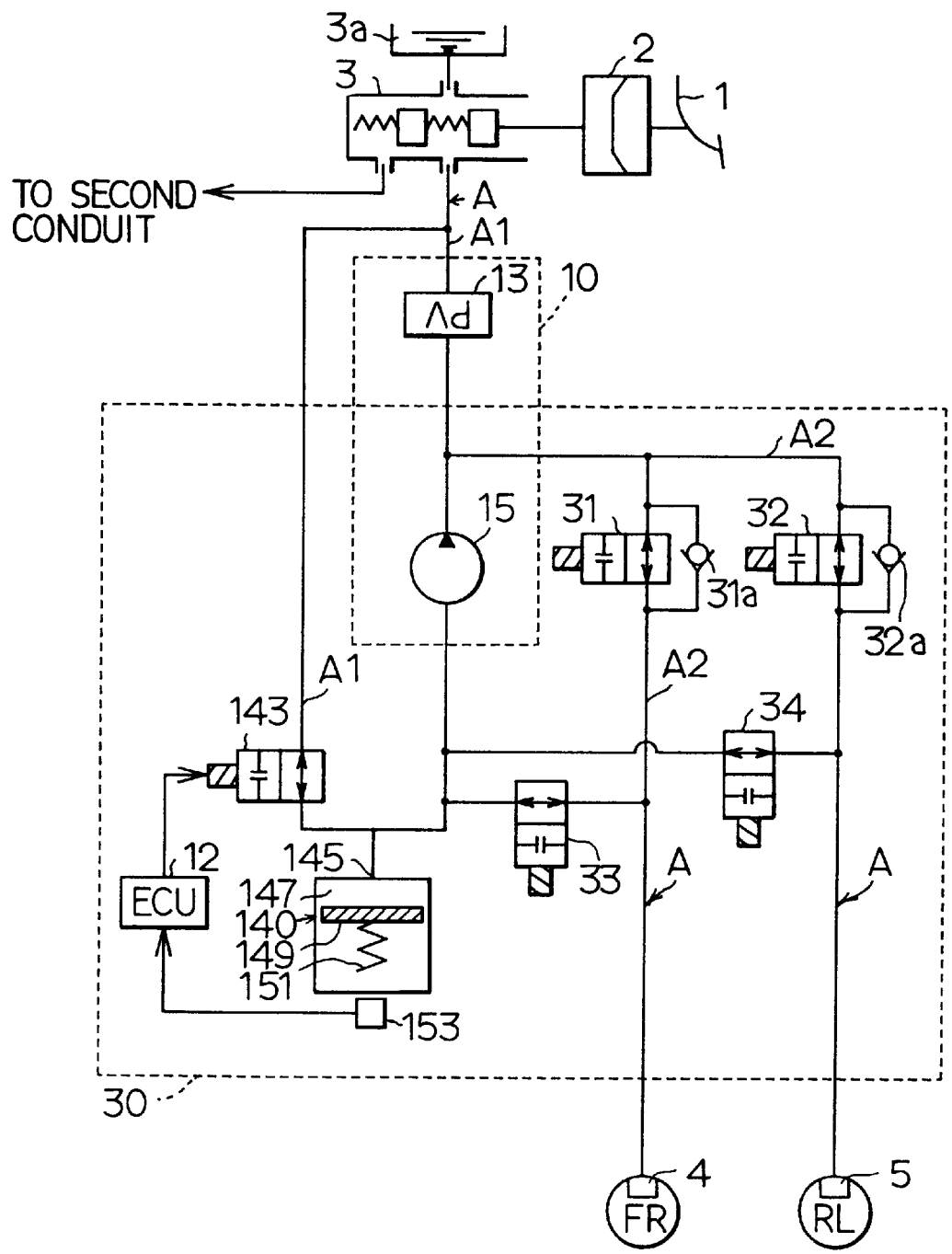
FIG. 38 is a structural view indicating an eighteenth embodiment of the present invention.

In FIG. 38, a reservoir 140 is disposed in a first conduit part A1 between the master cylinder 3 and a brake-fluid intake side of a pump 15. A solenoid 143 is disposed in the first conduit part A1 between the master cylinder 3 side and the reservoir 140.

This reservoir 140 is for accumulating brake fluid discharged from wheel cylinders 4 and 5, and is provide with a reservoir hole 145 connected to the first conduit part A1, a reservoir chamber 147 to store brake fluid, a piston 149 which causes the capacity of the reservoir chamber 147 to be variable, and a spring 151 to compress the piston 149 toward the reservoir chamber 147 and apply force to expel brake fluid. Additionally, a stroke sensor 153 to measure the amount of movement of the piston 149 is installed on this reservoir 140 to detect the brake-fluid quantity within the reservoir chamber 147 based on the amount of movement of the piston 149.

Meanwhile, the solenoid 143 is controlled at two positions, i.e., open and closed, to switch a communicated state and an interrupted state of the first conduit part A1 between the master cylinder 3 side and the reservoir 140.

Accordingly, signals from the stroke sensor 153 are received by an ECU 12, and control signals are sent from the ECU 12 to the solenoid 143.

Figure 39:
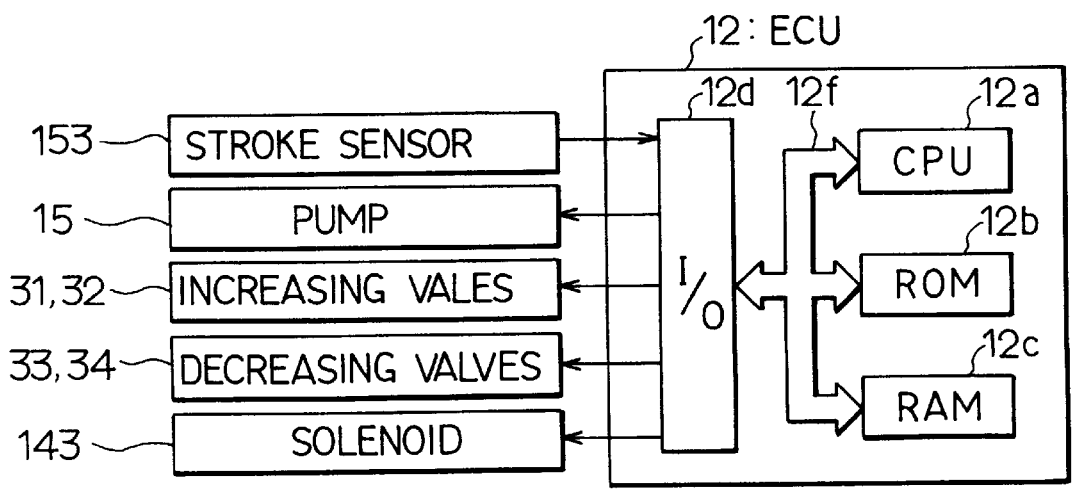
FIG. 39 a block diagram indicating an electrical control unit of the eighteenth embodiment.

This ECU 12 is structured as a microcomputer provided with a CPU 12a, a ROM 12b, a RAM 12c, an input/output portion 12d, a bus line 12f, and the like of known art, as shown in FIG. 39. The stroke sensor 153, the solenoid 143, the pump 15, first and second pressure-increasing control valves 31 and 32 and first and second pressure-reducing control valves 33 and 34 are connected to the input/output portion 12d.

Processing control of this embodiment structured in the above-mentioned manner will be described next.

When a locking state of the wheel has been detected on a basis of signals from a wheel-speed sensor (not illustrated). Brake fluid which has been applied to the wheel cylinders 4 and 5 is being discharged into the reservoir chamber 147. Accordingly, the respective wheel-cylinder pressures can be reduced, by closing the solenoid 143, closing the first and second pressure-increasing control valves 31 and 32 and opening the first and second pressure-reducing control valves 33 and 34. In this way, pressure-reducing control for the wheel-cylinder pressures in antiskid control can be executed.

Additionally, in a case where a locking tendency of the wheels is weakened and increasing the wheel-cylinder pressure is desired, the brake fluid accumulated within the reservoir chamber 147 can be pumped up and the wheel-cylinder pressure is increased by closing the solenoid 143, opening the first and second pressure-increasing control valves 31 and 32, closing the first and second pressure-reducing control valves 33 and 34, and driving the pump 15.

Furthermore, when the brake fluid within the reservoir 140 has been consumed by the intake of the pump 15 during pressure increase in antiskid control, brake fluid can be taken in from the first conduit part A1 and increase in wheel-cylinder pressure can be performed (while preventing generation of reaction force due to the master-cylinder pressure) by opening the solenoid 143 and driving the pump 15.

Moreover, in a case where the reservoir 140 is determined to be full due to signals from the stroke sensor 153, the brake fluid accumulated in the reservoir chamber 147 can be pumped up and reservoir capacity ensured by closing the solenoid 143, together with closing the first and second pressure-increasing control valves 31 and 32, closing the first and second pressure-reducing control valves 33 and 129, and driving the pump 15. As a result, pressure-reducing control utilizing the reservoir chamber 147 can be reliably performed during the subsequent antiskid control.

In this way, according to this embodiment, opening and closing of the passage extending from the master cylinder 3 to the reservoir 140, i.e., the passage between the first conduit part A1 and the brake-fluid intake side of the pump 15, is controlled by the solenoid 143 in accordance with the brake-fluid quantity within the reservoir 140. At the same time, the pump 15 is driven as required. Therefore, pressure-reducing control in antiskid control and pressure-increasing control of wheel-cylinder pressure can favorably be performed.

In particular, according to this embodiment, the passage is opened or closed by the solenoid 143, and so there exists an advantage that control of greater accuracy can be performed.

Figure 40:
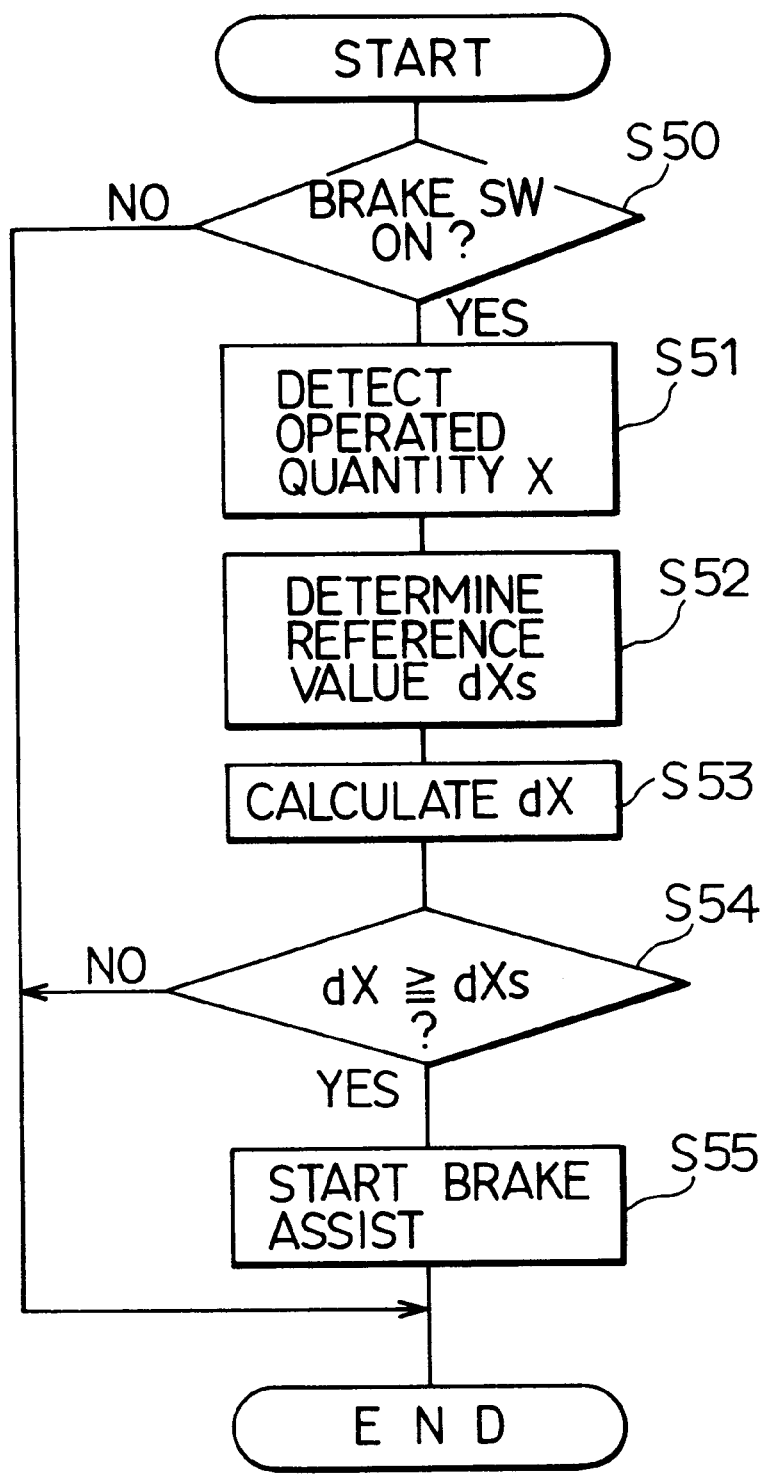
FIG. 40 is a flowchart indicating control processing of a nineteenth embodiment.

A nineteenth embodiment will be described next with reference to the flowchart indicated in FIG. 40. Apparatus described in the embodiments hereinabove can be employed for the structure of the brake control apparatus and the structure of the ECU.

In step S50, it is determined whether a brake pedal 1 has been depressed by determining whether a brake switch 113 is on. When the determination herein is affirmative, the processing advances to step S51; when the determination is negative, the processing is terminated.

In step S51, an operated quantity X of the brake pedal 1 is detected on a basis of a signal from a stroke sensor 111. That is to say, the state of extent to which the brake pedal 1 has been depressed (i.e., the present position thereof) is determined.

Figure 41A:
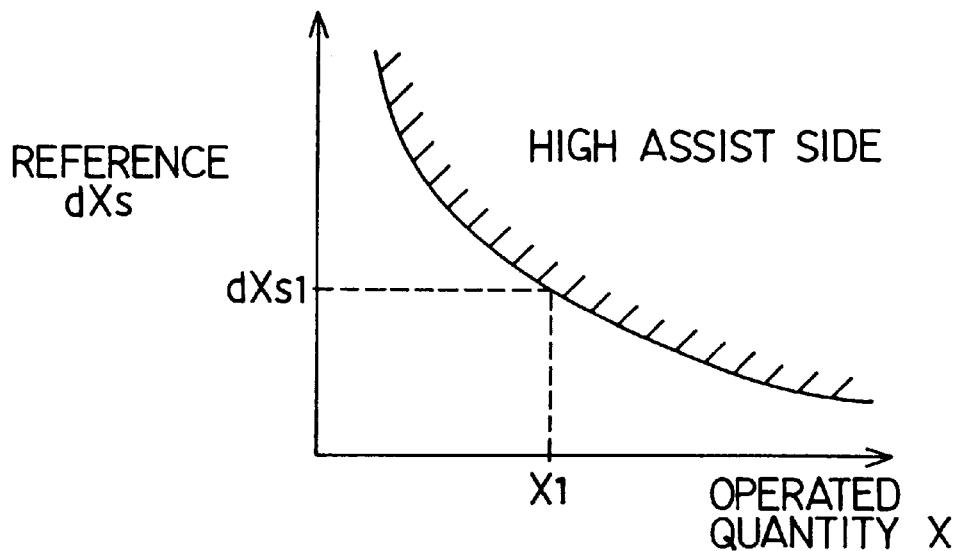
FIGS. 41A and 41B are explanatory diagrams indicating a starting criterion of the nineteenth embodiment.

Next in step S52, a starting reference value dXs for starting brake assist is varied in accordance with the operated quantity X of the brake pedal 1. In more detail, the operation change-quantity threshold value (starting reference value) dXs corresponding to the operated quantity X is determined from a map of the operated quantity X and the operation change-quantity threshold value dXs such as is shown in FIG. 41A. The value is established as the operation change-quantity threshold value dXs.

Next, in step S53, the operated quantity X of the brake pedal 1 is differentiated. An operated-quantity change dX which is the movement speed (i.e., the operated speed) of the brake pedal 1 is calculated.

Next, in step S54, it is determined whether the operated-quantity change dX of the brake pedal 1 is the operation change-quantity threshold value dXs or more. When an affirmative determination is made herein, the processing advances to step S55; when a negative determination is made, the processing is terminated.

In step S55, the timing for starting brake assist is obtained, and so a pump 15 is driven to increase wheel-cylinder pressure. As a result, brake assist is started, and the processing at this time is terminated.

In this way, according to this embodiment, in an apparatus provided with a power brake composed of a pressure-amplifying device 10, the position (operated quantity X) and speed (operated-quantity change dX) of the brake pedal 1 are determined. The operation change-quantity threshold value (starting reference value) dXs for starting brake assist is changed in accordance with this operated quantity X. In a case where the operated-quantity change dX has become the operation change-quantity threshold value dxs or more, brake assist is started.

Therefore, brake assist can reliably be performed no matter what the state of depression of the brake pedal 1 may be, and so there exists a remarkable effect that sufficient braking force can be ensured. That is to say, in a state where braking force larger than the braking force during normal braking is requested, such as panicky sudden braking, large braking force can accurately be ensured.

For example, in a conventional apparatus, when the brake pedal 1 was depressed further from a state of being depressed to a certain extent, the starting reference value dXs for brake assist was not reached because the operated speed of the brake pedal 1 did not increase, and so it may have been to start brake assist. However, according to this embodiment, the starting reference value dXs for brake assist is varied (i.e., is reduced) in accordance with a state wherein the brake pedal 1 has been depressed to a certain extent, and so in a case of further depression, the pump 15 is promptly driven (i.e., drive of the pump 15 is started or the driving speed of the pump 15 is increased), and brake assist can be started.

Figure 41B:
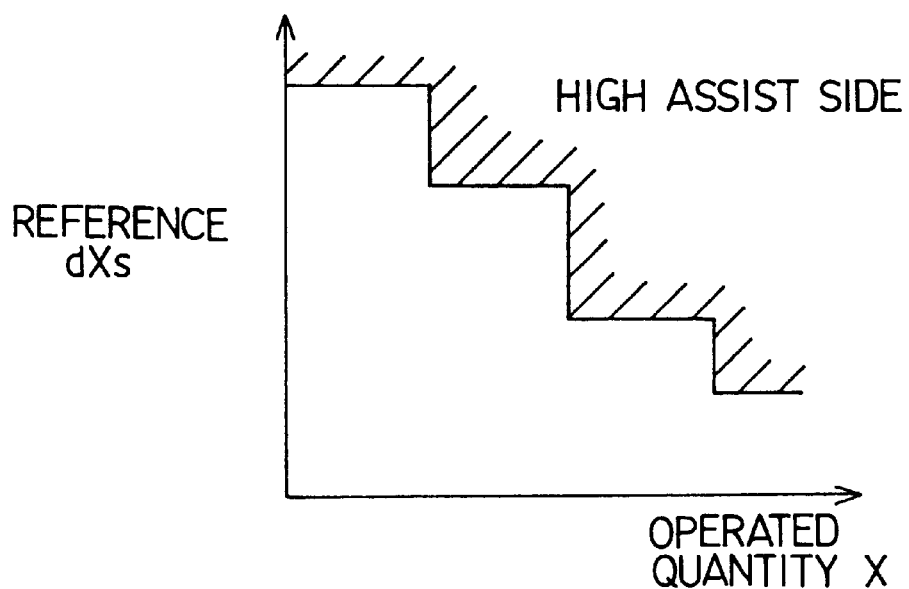

A stepped map, for example, as shown in FIG. 41B can be utilized as the map for changing this starting reference value dXs. In this case, there exists an advantage that the a small memory region in the ROM 12b is sufficient.

The assisting force of the brake assist having been started may be uniform, or alternatively the assisting force may be changed (for example, gradually increased) in accordance with the operated quantity X of the brake pedal 1 (for example, in a case where the operated quantity X has surpassed a predetermined value). In this case, there exists the advantage that favorable braking performance can be obtained even with respect to sudden brake operation during gentle braking.

Experimental Examples

An experimental example carried out to confirm the effects of this embodiment will be described next.

Figure 42A:
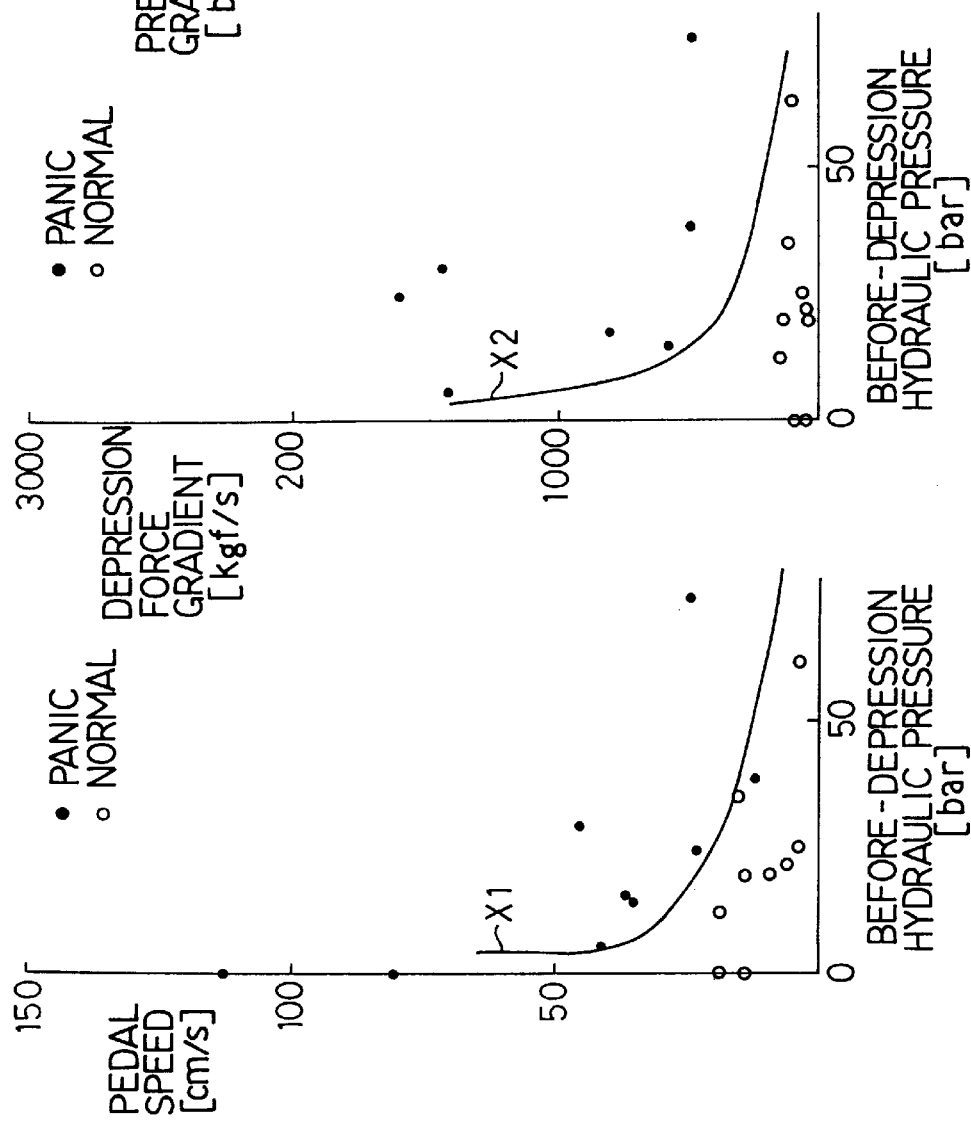
FIGS. 42A to 42C are graphs indicating an experimental result according to the nineteenth embodiment.
Figure 42B:
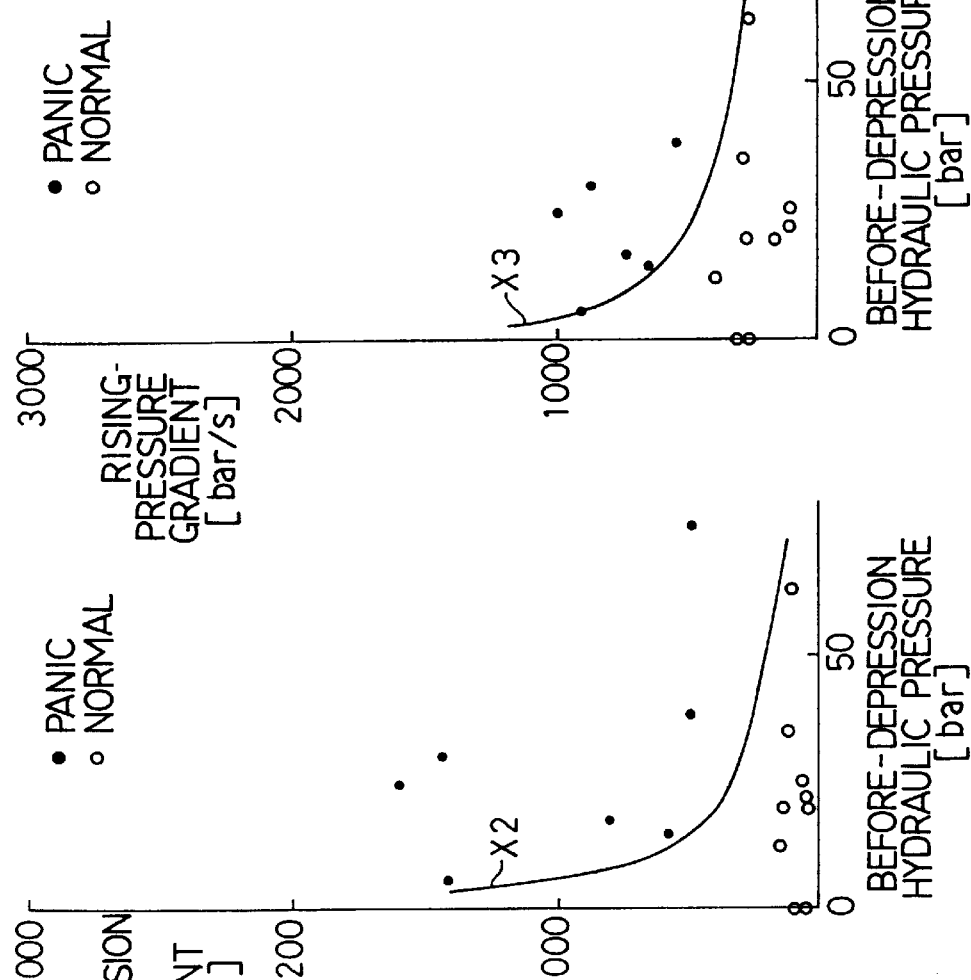
Figure 42C:
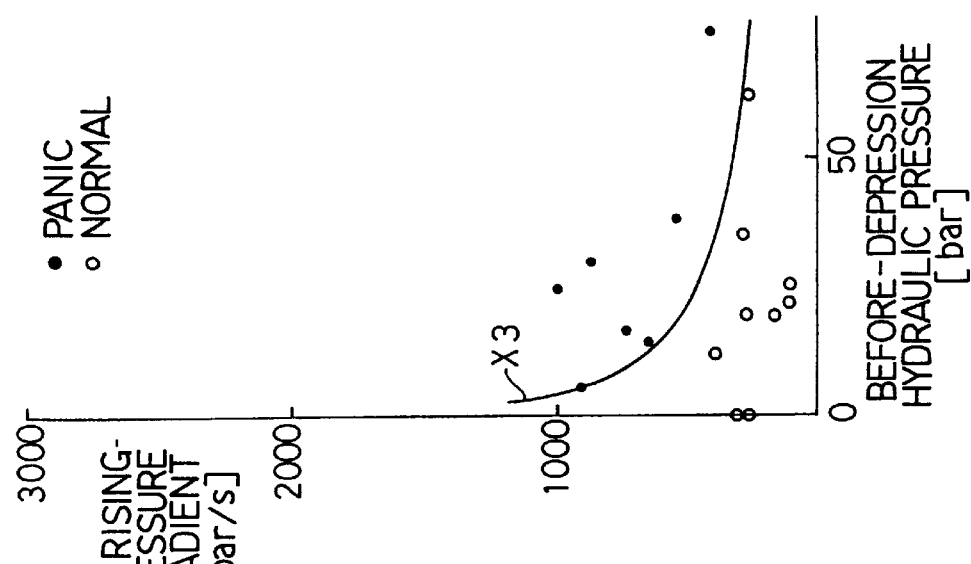

In This experimentation, the several relationships of pedal speed, depression-force gradient, and rising-pressure gradient with respect to before-depression hydraulic pressure of the master cylinder before the brake pedal is further depressed are respectively determined, in a case where the driver has calmly depressed the brake, as during normal operation, and in a case where, hypothesizing a time of panic, the brake is pressed forcefully. The results thereof are indicated in FIGS. 42A to 42C. The relationships are indicated by lines X1, X2, and X3 (boundary lines between a time of panic and a normal time) in FIGS. 42A to 42C exists between the pedal speed and the like and the before-depression hydraulic pressure of the master cylinder.

As is obvious from this FIGS. 42A, in a case where before-depression hydraulic pressure of the master cylinder is low, i.e., in a case where the brake pedal 1 has not been greatly depressed, large pedal speed appears when the pedal 1 is further depressed. Accordingly, brake assist can be started at suitable timing even in a case where the starting reference value dXs for brake assist is fixed.

However, in a case where the before-depression hydraulic pressure is high, i.e., in a case where the brake pedal 1 has been to a certain extent depressed, large pedal speed does not appear even when the pedal 1 is further depressed. Therefore, brake assist cannot be started at suitable timing when the starting reference value dxs for brake assist is fixed.

In contrast thereto, according to this embodiment, the starting reference value dxs for brake assist is varied in accordance with the operated quantity X of the brake pedal 1. In more detail, the starting reference value dxs is varied so as to hasten starting timing of brake assist in a case where the operated quantity X of the brake pedal 1 is large. Consequently, brake assist can be started at suitable timing. Accordingly, large braking force can be ensured even in a case where, for example, the brake pedal 1 is depressed from a half-depressed state due to a panicky situation.

A twentieth embodiment will be described next. With this embodiment as well, devices described in the embodiments hereinabove can be employed for the structure of the brake apparatus and the structure of the ECU.

Figure 43:
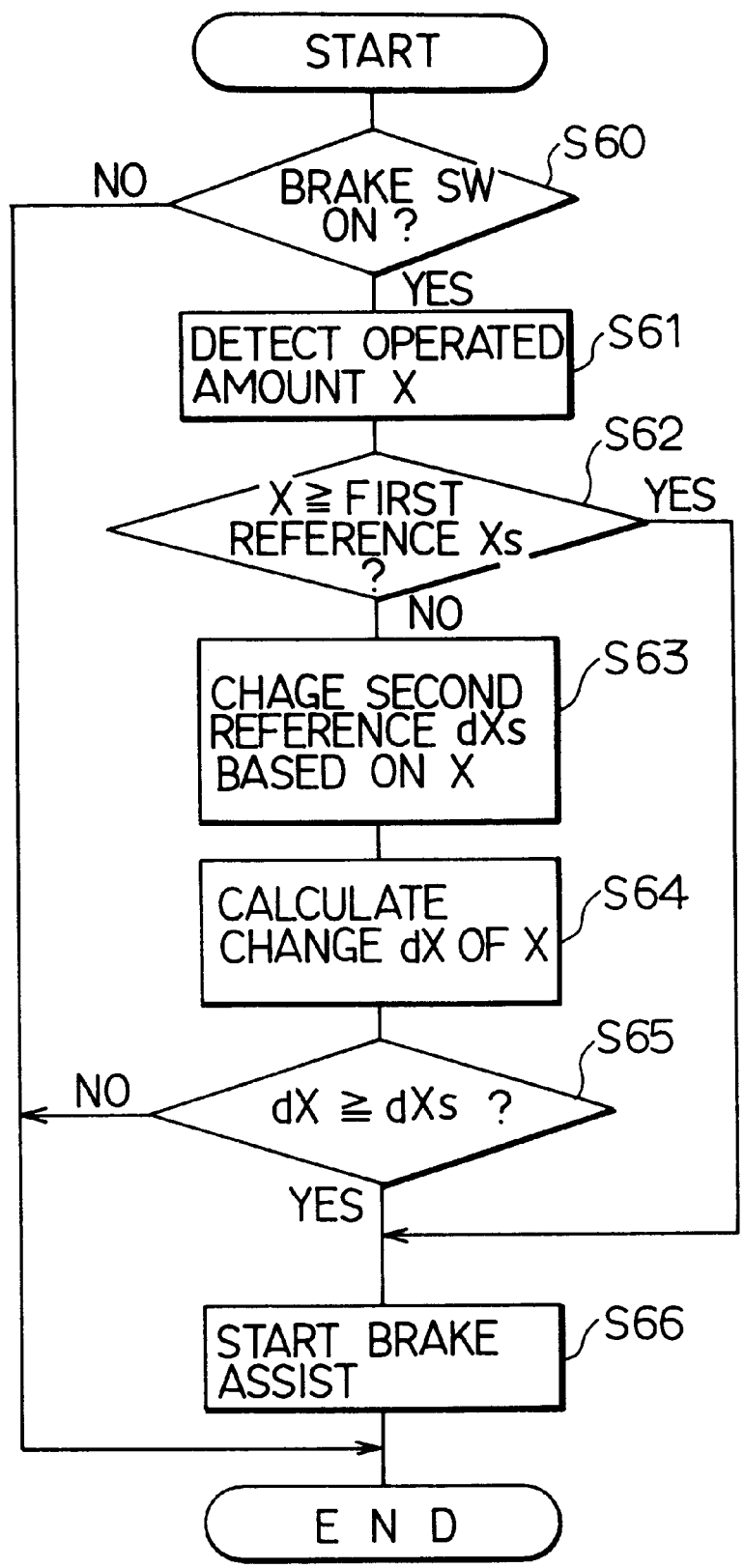
FIG. 43 is a flowchart indicating control processing of a twentieth embodiment.

As indicated in the flowchart in FIG. 43, according to this embodiment, firstly, in step S60, it is determined whether a brake switch 113 is on. When the determination herein is affirmative, the processing advances to step S61; when the determination is negative, the processing is terminated. In step S61, an operated quantity X of the brake pedal 1 is detected.

Figure 44:
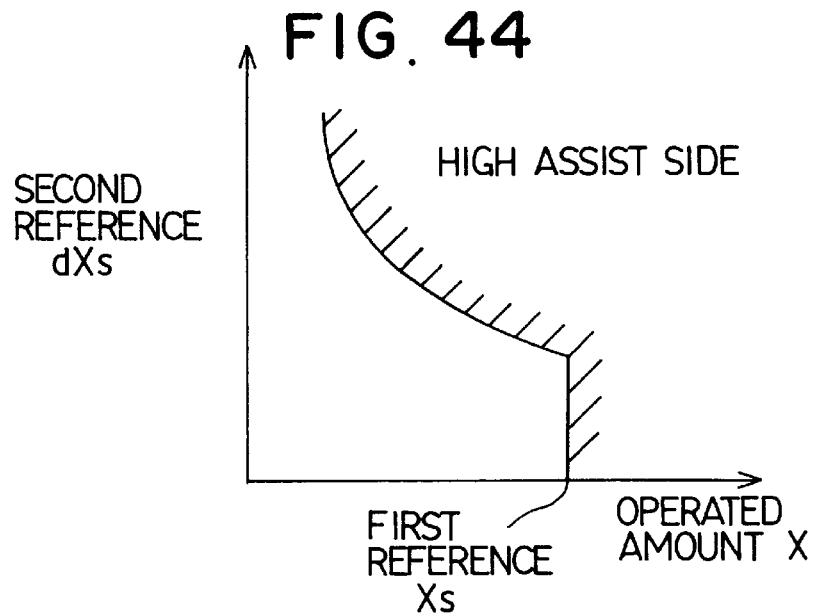
FIG. 44 is an explanatory diagram indicating a starting criterion of the twentieth embodiment.

In step S62, it is determined whether an operated quantity X of the brake pedal 1 is at or above a predetermined operated-quantity threshold value (first starting reference value) Xs. In more detail, as shown in FIG. 44, it is determined whether an operated quantity X has reached operated-quantity threshold value (first starting reference value) Xs. When an affirmative determination is made herein, the processing advances to step S63; when a negative determination is made, the processing advances to step S66.

In step S63, a second starting reference value dXs for starting brake assist is varied in accordance with the operated quantity X of the brake pedal 1. In more detail, an operation change-quantity threshold value (second starting reference value) dXs is determined in accordance with the operated quantity X from a map of the operation change-quantity threshold value (second starting criterion) dXs and the operated quantity X as shown in the FIG. 44. This second starting reference value dXs is established as the operation change-quantity threshold value dXs for starting brake assist.

Next, in step S64, the operated quantity X of the brake pedal 1 is differentiated, and operated-quantity change dX which is the operated speed of the brake pedal 1 is calculated.

Next, in step S65, it is determined whether the operated-quantity change dx of the brake pedal 1 is the operation change-quantity threshold value dXs or more. When an affirmative determination is made herein, the processing advances to step S66; when a negative determination is made, the processing is terminated.

In step S66, the timing for starting brake assist is obtained, and so a pump 15 is driven to increase wheel-cylinder pressure. As a result, brake assist is started, and the processing is terminated.

In this way, according to this embodiment, in an apparatus provided with a power brake composed of a pressure-amplifying device 10, brake assist is started in a case where the operated quantity X (the position of the brake pedal 1) is at or above the operated-quantity threshold value (first starting criterion) Xs for starting brake assist. In addition, the operated speed (operated-quantity change dX) of the brake pedal 1 are determined, the operation change-quantity threshold value (starting reference value) dXs for starting brake assist is changed in accordance with the operated quantity X. In a case where the operated-quantity change dX has become this operation change-quantity threshold value dXs or more, brake assist is started.

Therefore, brake assist can reliably be performed no matter what the state of depression of the brake pedal 1 may be, and so there exists a remarkable effect that sufficient braking force can be ensured, similarly to the foregoing nineteenth embodiment. Further, power assist is performed in a case where the brake pedal 1 has been depressed by a predetermined quantity or more, and so there exists an advantage that computational processing is reduced.

A twenty-first embodiment will be described next.

According to this embodiment in particular, a G sensor is utilized to detect deceleration of the vehicle body, and a starting reference value for execution ("on") or stopping ("off") of power assist is varied in accordance with output therefrom.

Figure 45:
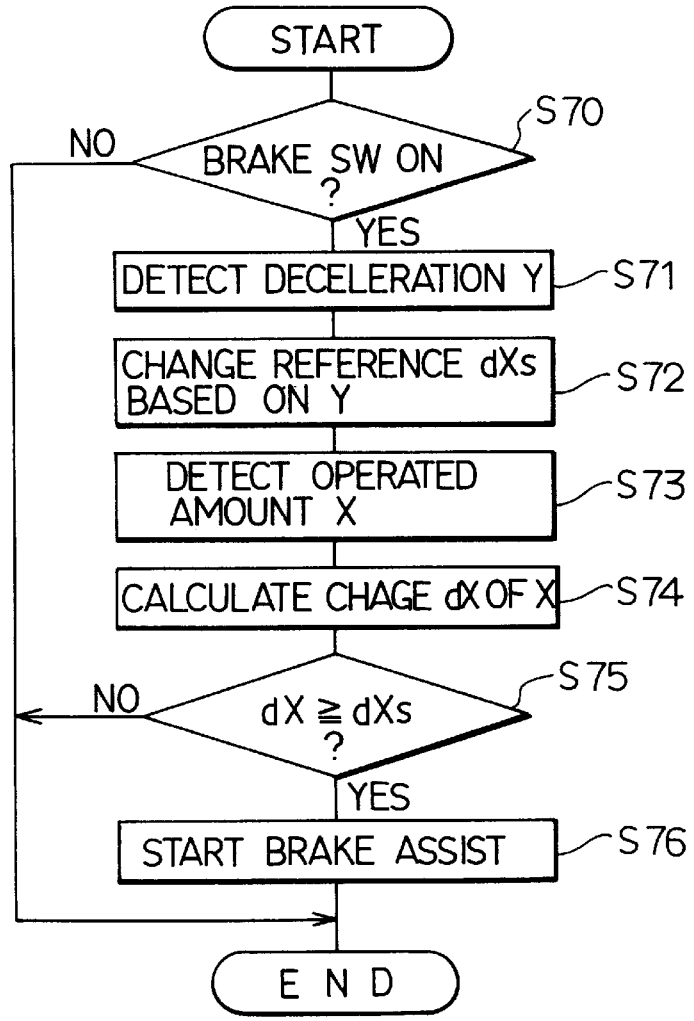
FIG. 45 is a flowchart indicating control processing of a twenty-first embodiment.

As indicated in the flowchart in FIG. 45, according to this embodiment, firstly, in step S70, it is determined whether a brake switch 113 is on. When the determination herein is affirmative, the processing advances to step S71; when the determination is negative, the processing is terminated.

In step S71, body deceleration Y is detected on a basis of a signal from the G sensor.

Next, in step S72, starting reference value (operation change-quantity threshold value) dXs for starting brake assist is varied in accordance with the body deceleration.

In step S73, operated quantity X of the brake pedal 1 is detected, and in the subsequent step S74, the operated quantity X of the brake pedal 1 is differentiated. That is, operated-quantity change dX which is the movement speed (i.e., the operated speed) of the brake pedal 1 is calculated.

Next, in step S75, it is determined whether the operated-quantity change dX of the brake pedal 1 is the foregoing operation change-quantity threshold value dXs or more. When an affirmative determination is made herein, the processing advances to step S76; when a negative determination is made, the processing is terminated.

In step S76, the timing for starting brake assist is obtained, and so a pump 15 is driven to increase wheel-cylinder pressure. As a result, brake assist is started, and the processing is terminated.

In this way, according to this embodiment, in an apparatus provided with a power brake composed of a pressure-amplifying device 10, the body deceleration Y is determined and the operation change-quantity threshold value dXs for starting brake assist is changed in accordance with this body deceleration Y. In a case where the operated-quantity change dX of the brake pedal 1 has become this operation change-quantity threshold value dxs or more, brake assist is started.

Consequently, brake assist can reliably be performed in a case where deceleration G of a predetermined value or more has occurred (such as when the brake has suddenly been depressed during panic), and so sufficient braking force can be ensured.

Further, according to this embodiment, the body deceleration Y was determined by a G sensor, but estimated body speed and estimated body deceleration may be determined according to a known method from wheel speed determined by, for example, a wheel-speed sensor.

A twenty-second embodiment will be described next with reference to the flowchart in FIG. 46.

Devices described in the embodiments hereinabove can be employed for the structure of the brake apparatus or the structure of the ECU. Additionally, a booster 2 is utilized as a first amplifying device, and a pressure-amplifying device 10 is employed as a second amplifying device.

Figure 46:
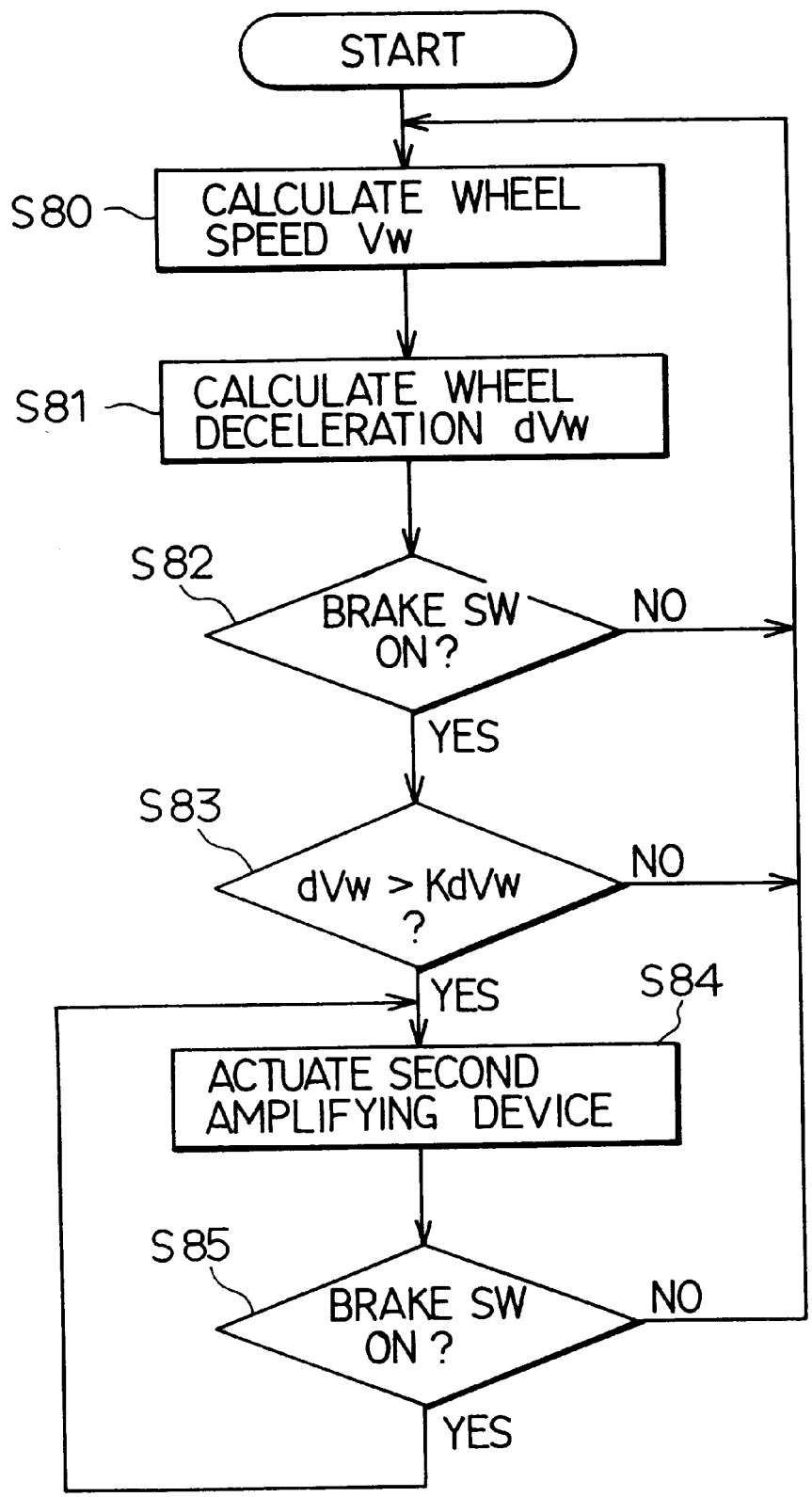
FIG. 46 is a flowchart indicating control processing of a twenty-second embodiment.

The flowchart indicated in FIG. 46 is executed by an electronic control unit 12 in accompaniment to operation to switch on an ignition switch or the like by a driver. In step S80, wheel speed VW of several wheels is calculated on a basis of output from wheel-speed sensor (not illustrated). Next, in step S81, wheel deceleration dVW is calculated on a basis of the wheel speed VW.

In step S82, it is determined whether a brake switch 113 is in an "on" state, i.e., whether a brake pedal 1 has been depressed by a predetermined amount or more and the vehicle is in a braking state. The processing advances to step S83 in a case where the brake switch 113 is on. In contrast, the processing is repeated from the step S80 in a case where the brake switch 113 is determined not to be on.

In step S83, it is determined whether the wheel deceleration dVW calculated in step S81 is greater than a predetermined deceleration KdVW. This predetermined deceleration KdVW may be established based on wheel deceleration occurring at the several wheels when sudden braking is performed on a traveling surface having a an intermediate friction coefficient (an intermediate $\mu$) or more, such as an asphalt road in rainy weather. When an affirmative determination is made in step S83, the above-mentioned second amplifying device is executed in the subsequent step S84. This case represents sudden braking of the vehicle on a traveling surface of a predetermined traveling-surface μ. Comparison of the predetermined deceleration KdVW with the wheel deceleration dVw may be performed for solely one wheel, or all wheels may be the subject of comparison. In this case, when the wheel deceleration dvW of at least one wheel is greater than the predetermined deceleration KdVW, and the second amplifying device may be executed for a predetermined time.

When the second amplifying device has been executed for the predetermined time in step S84, the processing advances to the subsequent step S85, and it is determined whether the brake switch 113 is in an "on" state. When the brake switch 113 is herein in an "off" state, the braking state of the vehicle is considered to have ended, the second amplifying device is terminated, and the processing returns to step S80. When the brake switch 113 is in an "on" state, the processing returns to step S84 and the second amplifying device continues to be executed.

The relationship of operating force with respect to the brake pedal 1 and wheel-cylinder pressure PL when such processing has been executed, will be described hereinafter with reference to FIGS. 47A and 47B.

Line S1 in FIG. 47A indicates wheel-cylinder pressure PL applied to respective wheel cylinders 4 and 5 in a case where boosting action by a brake booster 2 and amplifying action by the second amplifying device are not performed when the driver operates the brake pedal 1. The brake control apparatus for vehicle having the brake booster 2 has a characteristic of a line S2 above at least line S1 due to the boosting action of the brake booster 2. In a case where the second amplifying device is not executed, the wheel-cylinder pressure PL and the master-cylinder pressure PU are shifted as shown by the double-dotted broken line BB due to the boosting action of the brake booster 2. However, in FIG. 47A, a proportioning valve 6 disposed with respect to the wheel cylinder 5 of the rear-wheel side is eliminated, and wheel-cylinder pressure PL is considered to be the brake-fluid pressure applied to both the wheel cylinders 4 and 5.

Next, observation of change in wheel-cylinder pressure PL over time reveals that a characteristic indicated by line S2 due to the boosting action of the brake booster 2 is obtained prior to the wheel deceleration dvw becoming greater than the predetermined deceleration KdVw at time t1 from time 0 at which the brake pedal 1 is depressed. Additionally, when the second pressure-amplifying device is executed when the wheel deceleration dVW has become the predetermined deceleration KdVw in time t1, a pump 15 taken in brake fluid from a first conduit part A1 and discharges the brake fluid to a second conduit part A2. That is to say, brake fluid having the master-cylinder pressure PU in the first conduit part A1 is moved to the second conduit part A2, and the brake-fluid pressure at the second conduit part A2 is increased to the second brake-fluid pressure. Because the brake-fluid quantity at the first conduit part A1 is reduced at this time, reaction force conveyed to the driver from the brake pedal 1 when the driver has depressed the brake pedal 1 is lessened. That is to say, the load on the driver is lessened when maintaining the depression stroke of the brake pedal 1. Additionally, because brake fluid is discharged to the second conduit part A2 by the pump 15, the brake-fluid pressure within the second conduit part A2 is heightened to the second brake-fluid pressure, and wheel-cylinder pressure PL is increased as indicated by line S3 in FIG. 47A. That is to say, the slope of the wheel-cylinder pressure PL with respect to the operating force F with which the driver operates the brake pedal 1 is increased at line S3 from time t1. The slope indicated by this line S3 is established by the attenuation ratio of the proportioning control valve 13, i.e., by the attenuation ratio of brake-fluid pressure during the flow of brake fluid from the second conduit part A2 to the first conduit part A1. In this way, the amplifying action of operating force of the brake pedal 1 due to the booster 2 corresponding to the first amplifying device is performed within a low braking-force region of wheel braking force, and the amplifying action due to the pressure-amplifying device 10 corresponding to the second amplifying device is performed within a high braking-force region.

In this way, according to this embodiment, greater wheel braking force can be obtained by determining, for example, from wheel deceleration a circumstance wherein greater braking force is required and activating the second pressure-amplifying device in addition to the booster 2 which executes normal boosting action during vehicle braking. That is to say, when a booster 2 not having an extremely large boosting action is employed and normal braking is ensured by this booster 2, this normal braking can be caused to be smooth in accordance with the feeling of the driver. The pressure-amplifying device 10 can be activated as the second amplifying device in a state such as when the vehicle has been suddenly braked, establishing also sudden braking. Additionally, because amplification of brake-fluid pressure is executed by the pressure-amplifying device 10, it is possible also to employ in the brake apparatus a brake booster 2 wherein a first chamber and a second chamber are small and do not provide an extremely large boosting action (i.e., boosting-force ratio).

Because the proportioning control valve 13 connected in reverse is employed as a holding device to maintain the differential pressure between the first conduit part A1 and the second conduit part A2 in the pressure-amplifying device 10, according to this embodiment, the pressure-amplifying device 10 can be activated at a suitable timing, without adding any type of sensor other than the wheel-speed sensor already employed in ABS and so on. Brake-fluid pressure does not remain in the wheel cylinders 4 and 5 and no brake pull-up occurs due to mechanical action of the proportioning control valve 13 when the depression of the brake pedal has been released and the master-cylinder pressure has declined. Additionally, when a split-point pressure and an attenuation ratio have been mechanically established in the proportioning control valve 13, wheel braking force is increased in accordance with these settings when the pump 15 is uniformly driven and the pressure-amplifying device 10 works.

Figure 49:
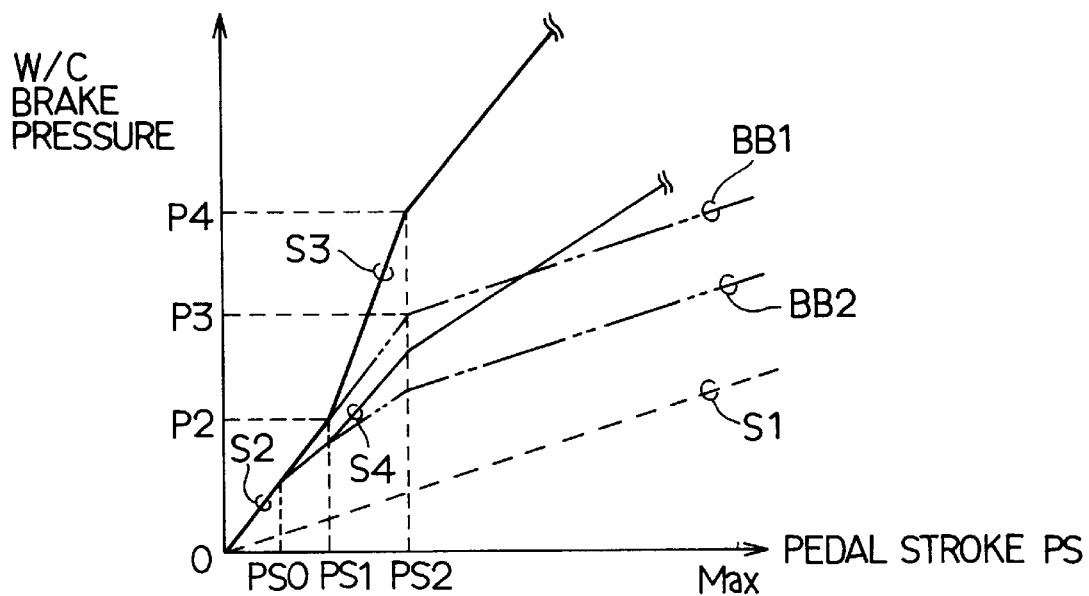
FIG. 49 is a characteristic diagram indicating a mode of operation of the twenty-third embodiment.

A twenty-third embodiment will be described next with reference to FIG. 48 and FIG. 49.

In control according to the embodiment described hereinabove, the second amplifying device was executed on a basis of wheel deceleration dVW corresponding to wheel behavior depending on a road-surface state. According to the twenty-third embodiment, however, the second amplifying device, i.e., a pressure-amplifying device 10, is executed on a basis of pedal stroke PS of a brake pedal 1 when operated by a driver.

In flowchart started in accompaniment to operation of an ignition switch to an "on" position or the like, as shown in FIG. 48, in step S90, pedal stroke PS is detected on a basis of a signal from a stroke sensor 111. Next, in step S91, this pedal stroke PS and a predetermined value KPS are compared. This predetermined value KPS may be established in light of pedal stoke, for example, when the driver depresses the brake pedal 1 to stop the vehicle suddenly during vehicle travel at a body speed of a predetermined value or more. Herein, the processing advances to step S92 in a case where the pedal stroke PS has been determined to be larger than the predetermined value KPS, and is returned to step S90 when a negative determination has been made. Because the pedal stroke PS is not more than the predetermined value KPS during nondepression of the brake pedal 1, the processing is returned to step S90.

In step S92, because the amount of pedal depression by the driver, i.e., the pedal stroke PS, is greater than the predetermined value KPS, a situation wherein rapid stopping of the vehicle is desired is presumed to exist. Therefore, the second amplifying device is activated.

Effects will be described next with reference to FIG. 49. When the brake pedal 1 is increasingly depressed from a time when the pedal stroke PS is 0, the master-cylinder pressure PU becomes P2 due to the action of the brake booster 2 which is the first amplifying device until the pedal stroke PS becomes PS1. The brake-fluid pressure applied to the wheel cylinder 4 on the front-wheel side also becomes a pressure similar to the master-cylinder pressure PU and is maintained as indicated by line S2. The brake-fluid pressure applied to the wheel cylinder 5 on the rear-wheel side is reduced by a predetermined attenuation ratio to a pressure lower than the master-cylinder pressure PU due to a known action of a proportioning control valve 6 connected in the normal direction within the conduit. The brake-fluid pressure of the wheel cylinder 5 on the rear-wheel side becomes a pressure that has been reduced compared with line S2 in correspondence with the pedal stroke PS at which master-cylinder pressure PU not less than the split-point pressure of the proportioning control valve 6 is generated.

When the pedal stroke becomes larger than PS1 (equal to KPS), due to the pressure-amplifying device 10, the brake-fluid pressure applied to the wheel cylinder 4 on the front-wheel side is amplified largely as indicated by line S3 in comparison with line BB1 indicating the brake-fluid pressure applied to the wheel cylinder 4 on the front-wheel side due to the boosting action of the booster 2. The brake-fluid pressure applied to the wheel cylinder 4 can reach pressure P4 larger than pressure P3 which is the limit of wheel-cylinder pressure which can be generated with pedal stroke PS2 by the boosting action by the booster 2. Additionally, the brake-fluid pressure applied to the wheel cylinder 5 on the rear-wheel side also is amplified largely as indicated by line S4 in comparison with line BB2 indicating the brake fluid applied to the wheel cylinder 5 amplified only by the boosting action of the booster 2. In this way, when the pressure-amplifying device 10 is activated, a pressure-increasing gradient larger than the pressure-increasing gradient of the wheel-cylinder pressure due to the booster 2 is produced. As a result, vehicle braking force can be gained in a case where the pedal stroke PS has become greater than a predetermined value. Mode of operation and effects due to the pressure-amplifying device 10 similar to those of the embodiments described hereinabove are demonstrated.

Even when the brake booster 2 having a boosting rate which is so small that the boosting effect is substantially eliminated at the pedal stroke PS2 is employed, the brake-fluid pressure applied to the wheel cylinders 4 and 5 can be gradually increased due to the second amplifying device. Furthermore, because the second amplifying device is executed by movement of brake fluid by the pump 15 and by the proportioning control valve 13 connected in reverse, the brake-fluid pressure applied to the wheel cylinders 4 and 5 can be gradually increased due to a mechanical aperture effect in the proportioning control valve 13, even when the pedal stroke has substantially been stopped at PS1 or PS2.

Figure 50:
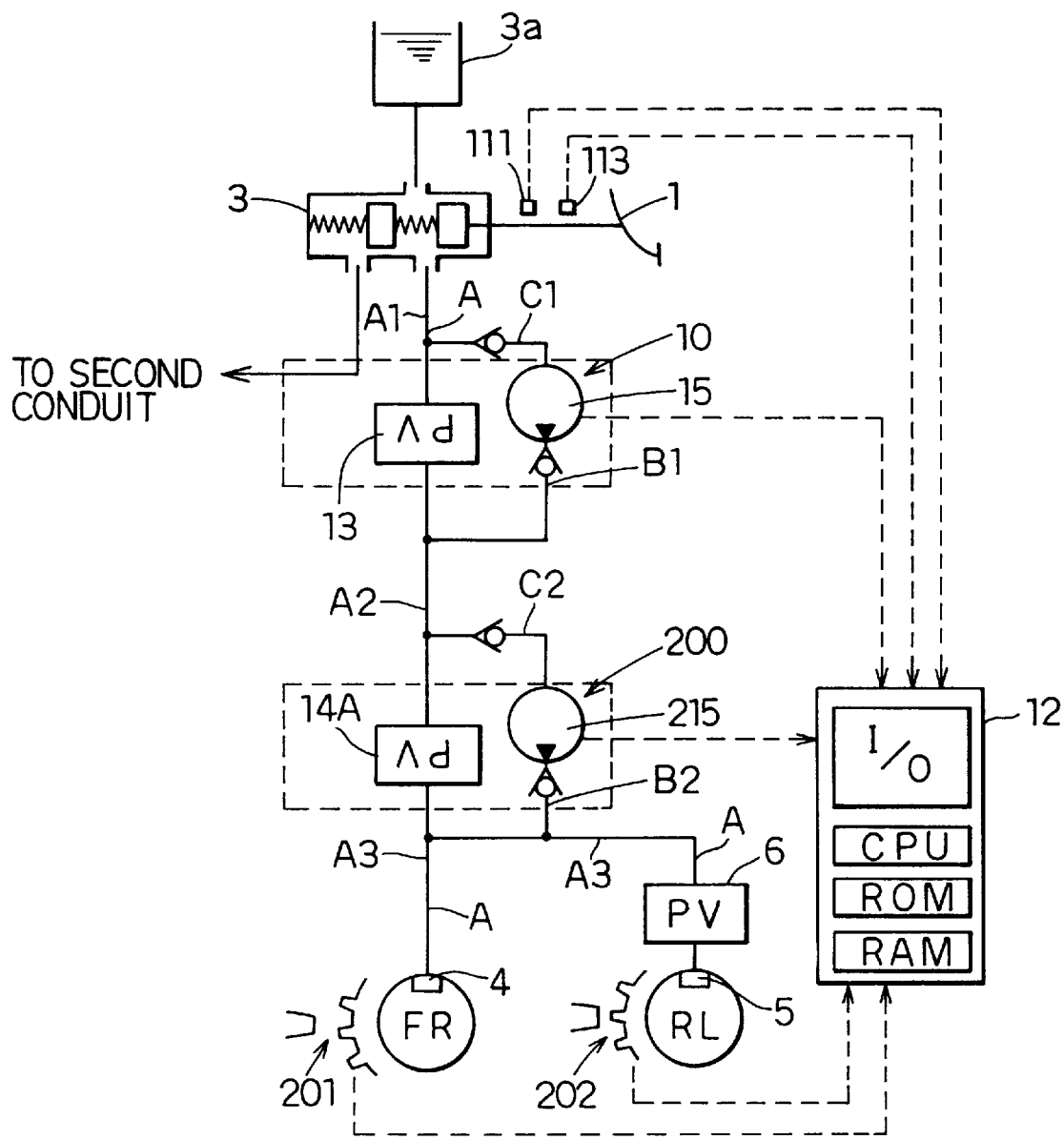
FIG. 50 is a structural view indicating a structure of a brake control apparatus according to a twenty-fourth embodiment.

A twenty-third embodiment of this invention will be described next with reference to FIG. 50. Detailed description regarding structure exhibiting a mode of operation similarly to the structure of an embodiment described hereinabove will be omitted. In this twenty-fourth embodiment, the booster 2 which made up the first amplifying device in the above-described embodiments is eliminated and structure of a pressure-amplifying device 10 corresponding to the second amplifying device in the foregoing embodiment is disposed in series in a first conduit A.

The first conduit A extending from a master cylinder 3 is connected respectively to a wheel cylinder 4 of a front-right wheel FR and a wheel cylinder 5 of a rear-left wheel RL. Accordingly, a first proportioning control valve 13 connected in a reverse direction and a first pump 15 connected in parallel to the first proportioning control valve 13 are disposed as a first amplifying device 10 in this first conduit A. A second amplifying device 200 is disposed in the first conduit A between the first pressure-amplifying device 10 and a branch to the respective wheel cylinders 4 and 5. This second amplifying device 200 also is made up of a reverse-connected second proportioning control valve 14A and a second pump 215, similarly to the first amplifying device 10.

The first conduit A is separated into a first conduit part A1, a second conduit part A2, and a third conduit part A3 by the first and second amplifying devices 10 and 200. That is to say, the first conduit A is separated into the first conduit part A1 in an interval from the master cylinder 3 to the first amplifying device 10, the second conduit part A2 in an interval from the first amplifying device 10 to the second amplifying device 200, and the third conduit part A3 in an interval from the second amplifying device 200 to the respective wheel cylinders 4 and 5. An intake port of the first pump 15 is connected to a first intake conduit C1 connected to the first conduit part A1, and a discharge port of the first pump 15 is connected to a first discharge conduit B1 connected to the second conduit part A2. Similarly, an intake port of the second pump 215 is connected to a second intake conduit C2 connected to the second conduit part A2, and a discharge port of the second pump 215 is connected to a second discharge conduit B2 connected to the third conduit part A3.

In the brake control apparatus structured in this way, in a case where the brake pedal 1 is depressed and the first amplifying device 10 and the second amplifying device 200 are not actuated, brake fluid having master-cylinder pressure PU generated in accordance with depression force applied to the brake pedal 1 passes through the first and second proportioning control valves 13 and 14A with no attenuation of pressure. Accordingly, the master-cylinder pressure PU is conveyed to the wheel cylinders 4 and 5.

A mode of operation according to this twenty-fourth embodiment will be described hereinafter with reference to FIG. 51.

In flowchart started in accompaniment to operation of an ignition switch or the like to "on," in step S100, wheel speed VW is calculated on a basis of output signals from wheel-speed sensors 201 and 202. Subsequently, in step S110, body speed VB is computed. In this case, the body speed VB may be computed on a basis of the wheel speed VW of a driven wheel, or alternatively an integrated value of an output value of a body-acceleration sensor (not illustrated) may be employed. In step S120, wheel acceleration dVW of the wheel is computed. Wheel speed VW and the like may be calculated with respect to each of the several wheels per the processing of the flowchart.

In step S130, pedal stroke PS is detected and computed on a basis of output from a stroke sensor 111. In step S140, the change dPS in pedal stroke per unit of time is computed.

In step S150, to detect whether the wheels are in a braking state, it is detected whether a brake switch 113 is in an "on" state. In a case where determined herein that the brake switch 113 is not in an "on" state and the wheels are not in a braking state, the processing is returned to step S100. In a case where determined that the brake switch 113 is in an "on" state, the processing advances to step S160.

In step S160, the first amplifying device 10 is actuated. That is to say, brake fluid is moved by driving first pump 15, taking in brake fluid from the first conduit part A1, and discharging the brake fluid to the second conduit part A2. In accordance therewith, the brake-fluid pressure of the second conduit part A2 and the third conduit part A3 is increased, and the pressure applied to the wheel cylinders 4 and 5 is increased in comparison with the master-cylinder pressure PU and becomes a second brake-fluid pressure. When the reverse-connected first proportioning control valve 13 causes brake fluid to flow from the side of the second and third conduit parts A2 and A3 to the first conduit part A1 side, the brake-fluid pressure is reduced by a predetermined attenuation ratio set to the first proportioning control valve 13 and flow of the brake fluid occurs. Accordingly, the brake-fluid pressure of the second and third conduit parts A2 and A3 is maintained unless the master cylinder pressure is greatly reduced. When the brake pedal 1 is being gradually depressed, the flow of brake fluid from the second conduit part A2 side to the first conduit part A1 side is substantially nil. Brake-fluid pressure of the second and third conduit parts A2 and A3 is amplified at a predetermined pressure ratio accompanying the increase in the brake-fluid pressure of the first conduit part A1 and the movement of brake fluid from the first conduit part A1 to the second conduit part A2 due to the pump 15.

In step S170, the wheel speed VW and a predetermined value KVW are compared, and the processing advances to step S180 in a case where the wheel speed VW is greater than the predetermined value KVW, or is returned to step S150 in a case of negative determination. In step S180, the body speed VB and a predetermined value KVB are compared, and the processing advances to step S190 in a case where the body speed VB has been determined to be greater than the predetermined value KVB, or is returned to step S150 when a negative determination has been made. Herein, the predetermined value KVW and the predetermined value KVB are established at values whereat it can be determined that there exists vehicle braking from a state of vehicle travel at a certain degree of high speed. For example, the predetermined value KVB may be established at a speed of approximately 80 km/h, and the predetermined value KVW may be established at a speed of approximately 85 km/h in consideration for wheel slippage and the like during vehicle travel. In step S190, it is determined whether the wheel acceleration dVW is smaller than the predetermined value KdVW, or in other words, whether wheel deceleration is larger than a predetermined value. This predetermined value KdVW is established with an aim toward a value generated as wheel behavior when, for example, the rider has requested a certain degree of sudden braking. When an affirmative determination is made in step S190, this is presumed to be a state of a certain degree of sudden vehicle stoppage from a predetermined vehicle speed or more, and the processing advances to step 220, and the second amplifying device 200 is actuated. That is to say, the second pump 215 is driven, and brake fluid in the second conduit part A2 having brake-fluid pressure amplified by the first amplifying device 10 is taken in and discharged to the third conduit part A3 by the second pump 215. The brake-fluid pressure of the third conduit part A3 is increased with respect to the brake fluid of the second conduit part A2 which is higher than the master-cylinder pressure PU. Accordingly, this heightened third brake-fluid pressure is maintained by the reverse-connected second proportioning control valve 14A, similarly to the mode of operation of the first proportioning control valve 13. Accordingly, the third brake-fluid pressure amplified in two stages by the first and second amplifying devices 10 and 200 is applied to the wheel cylinder 4. Similarly, brake-fluid pressure based on the third brake-fluid pressure (i.e., pressure attenuated by a proportioning valve 6) amplified in two stages by the first and second amplifying devices 10 and 200 is applied to the wheel cylinder 5. Accordingly, the respective wheels FR and RL demonstrate high wheel braking force in accordance with the brake-fluid pressure amplified in two stages in comparison with the master-cylinder pressure PU.

In a case of a negative determination in step S190, the processing advances to step S200. In step S200, it is determined whether pedal stroke PS is greater than a predetermined value KPS. In a case where a negative determination is made herein, the processing is returned to step S150; in a case where an affirmative determination is made, the processing advances to step S210. In step S210, it is determined whether the change dPS in pedal stroke per unit time is greater than a predetermined value KdPS. In a case where a negative determination is made herein, the processing returns to step S150, and vehicle braking is continued with solely actuation of the first amplifying device 10 until the vehicle is stopped.

When an affirmative determination has been made in step S210, it is determined from wheel behavior that the braking state is not so sudden, but it can be determined to be a sudden-braking state from the state of depression of the pedal 1 by the driver, and in step S220 the second amplifying device 200 is actuated.

When a predetermined time has elapsed during actuation of the second amplifying device 200, the processing advances to step S230 and it is determined whether the brake switch 113 is in an "on" state. That is to say, because the second amplifying device 200 is actuated in addition to the first amplifying device 10 until the vehicle is stopped or the vehicle braking state is released, large vehicle braking force can be generated, and distance until stopped can be shortened.

Additionally, because the first amplifying device 10 and the second amplifying device 200 have been disposed in series in the conduit extending from the master cylinder 3 to the wheel cylinders 4 and 5, the pressure-amplifying action in the first amplifying device 10 can be established to be small, and there is no need to employ a pump having very high capacity in the first pump 15. Furthermore, because first-stage pressure amplification is performed by the first amplifying device 10, there similarly is not need to employ a pump of very high capacity for the second pump 215 in the second amplifying device 200 which causes the second brake-fluid pressure to be further increased.

Figure 53:
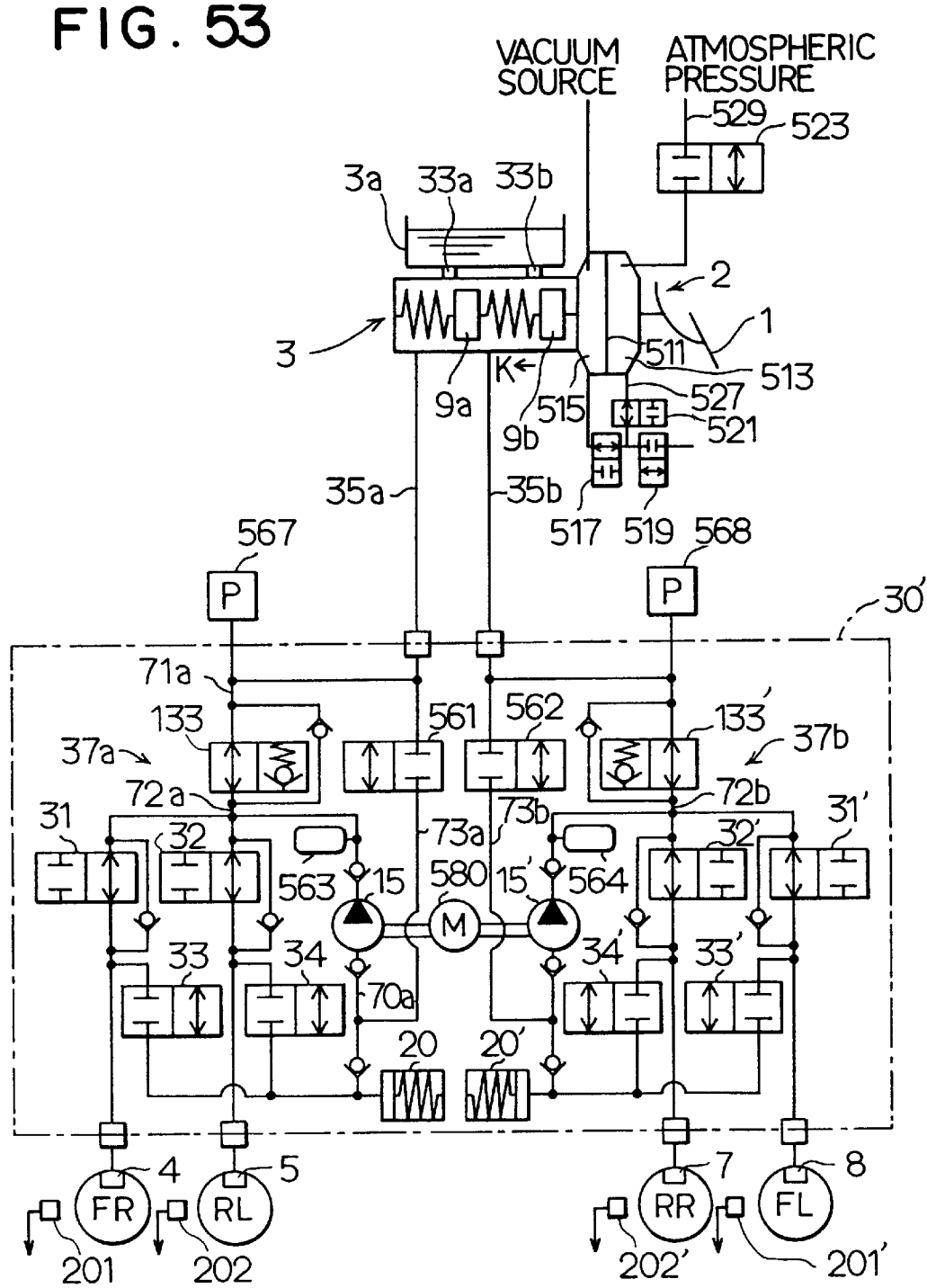
FIG. 53 is a structural view indicating a brake control apparatus of the twenty-fifth embodiment and a peripheral structure thereof.

FIG. 53 indicates a twenty-fifth embodiment, and is a schematic structural view indicating a brake control apparatus for a vehicle capable of performing traction control (i.e., TRC control) to impart braking force to wheels to suppress slippage of the wheel as braking control not due to brake operation by a driver (hereinafter termed "braking control during nonbraking"). For devices having a mode of operation similarly to the embodiments described hereinabove, symbols similar to the foregoing will be attached.

As shown in FIG. 53, in the brake-controlling apparatus according to this embodiment, a vacuum booster (brake booster) 2 is interconnected with a master cylinder 3 of tandem type. A hydraulic control circuit 30', which performs traction control and the like and is made up of two hydraulic systems of diagonal conduit, is connected to the master cylinder 3. The several structures thereof will be described hereinafter.

The vacuum booster 2 exhibits a boosting action, utilizing a pressure differential of intake-manifold vacuum (i.e., intake vacuum) generated by an engine and atmospheric pressure. Further, the vacuum booster 2 regulates the pressure differential in accompaniment with depression of a brake pedal 1 so as to increase the pressure applied to pistons 9a and 9b of the master cylinder 3.

This vacuum booster 2 is provided with a pressure-converting chamber (second chamber) 513 wherein atmospheric pressure is introduced in a case where boosting action is exhibited, and a vacuum chamber (first chamber) 515 wherein intake vacuum is constantly introduced. The two chambers 513 and 515 are partitioned by a diaphragm 511. The vacuum booster 2 is provided with a first mechanical valve 517, second mechanical valve 519, a first communication control valve 521 and second communication control valve 523 to regulate the pressure of the two chambers 513 and 515.

Among these, the first and second mechanical valves 517 and 519 are mechanically actuated to an open or closed position in accompaniment with operation of the brake pedal 1. When the brake pedal 1 is depressed, the first mechanical valve 517 is closed and the second mechanical valve 519 is opened. Atmospheric pressure is introduced solely into the pressure-converting chamber 513.

Figure 54:
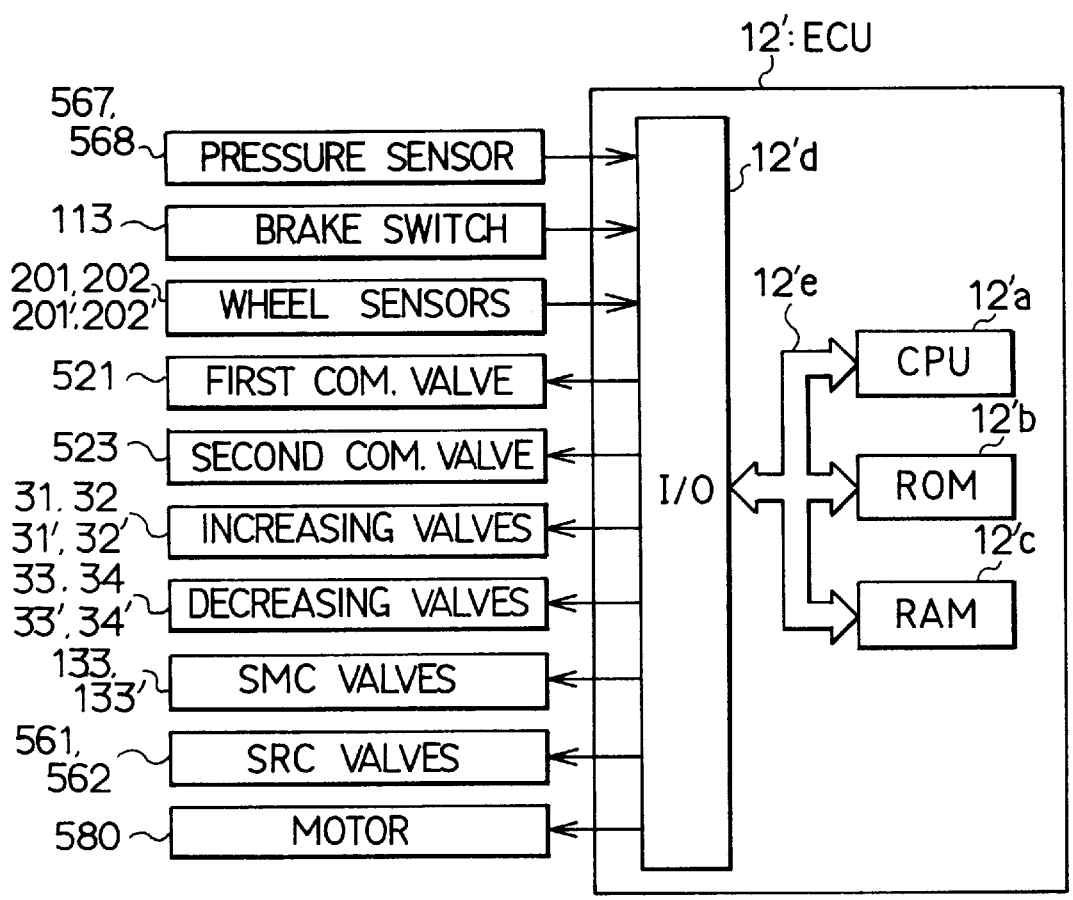
FIG. 54 is a block diagram indicating a structure of an electronic control unit of the twenty-fifth embodiment.

Additionally, the first and second communication control valves 521 and 523 are solenoid driven, for example, during traction control to one of two positions, i.e., open or closed, according to a signal from an electronic control unit (ECU 12; see FIG. 54). This first communication control valve 521 is disposed in a first communicating passage 527 causing the pressure-converting chamber 513 and the foregoing first and second mechanical valves 517 and 519 to be communicated, and is constantly switched off to open the first communicating passage 527. Meanwhile, the second communication control valve 523 is disposed in a second communicating passage 529 causing the pressure-converting chamber 515 to be communicated with an atmospheric-pressure side, and is constantly switched off to close the second communicating passage 529.

The master cylinder 3 is directly connected to a master reservoir 3a via passages 33a and 33b. An open portion (not illustrated) of these passages 33a and 33b on the master cylinder 3 side is provided so as to be closed by the pistons 9a and 9b themselves in a case where the vacuum booster 2 has been actuated and the pistons 9a and 9b have been shifted in the direction of arrow K.

Additionally, the master cylinder 3 is connected via two brake fluid paths 35a and 35b respectively to first hydraulic conduit 37a and second hydraulic conduit 37b making up the hydraulic circuit 30'.

In the hydraulic control circuit 30', a wheel cylinder 4 of a front-right (FR) wheel and a wheel cylinder 5 of a rear-left (RL) wheel are communicated through the first hydraulic conduit 37a. Additionally, a wheel cylinder 7 of a rear-right (RR) wheel and a wheel cylinder 8 of a front-left (FL) wheel are communicated through the second hydraulic conduit 37b.

Accordingly, a pressure-increasing control valve 31 and a pressure-reducing control valve 33 for controlling the pressure of the wheel cylinder 4 of the FR wheel and a pressure-increasing control valve 32 and a pressure-reducing control valve 34 for controlling the pressure of the wheel cylinder 5 of the RL wheel are disposed in the first hydraulic conduit 37a, and a pressure-increasing control valve 31' and a pressure-reducing control valve 33' for controlling the pressure of the wheel cylinder 7 of the RR wheel and a pressure-increasing control valve 32' and a pressure-reducing control valve 34' for controlling the pressure of the wheel cylinder 8 of the RL wheel are disposed in the second hydraulic conduit 37b.

The structure of the first hydraulic conduit 37a will be described hereinafter.

A master-cylinder cutoff valve (SMC valve) 133 to cause a hydraulic path 71a to be communicated or interrupted is provided in the first hydraulic conduit 37a between the master cylinder 3 side and the respective pressure-increasing control valves 31 and 32. This SMC valve 133 is structured to open a passage 71a when hydraulic pressure on the side of the wheel cylinders 4 and 5 becomes a predetermined value or more.

A reservoir 20 to temporarily accumulate brake fluid discharged from the respective pressure-reducing control valves 33 and 34 is provided on a downstream side of the respective pressure-reducing control valves 33 and 34. A hydraulic pump 15 is provided in a hydraulic path 70a extending from this reservoir 20 to the interval between the SMC valve 133 and the pressure-increasing control valves 31 and 32 to take in brake fluid from the reservoir 20 or the master cylinder 3 side and to send brake fluid to a hydraulic path 72a between the SMC valve 133 and the pressure-increasing control valves 31 and 32. An accumulator 563 to suppress pulsation in internal hydraulic pressure is disposed in a discharge path for brake fluid from the hydraulic pump 15.

Furthermore, a hydraulic path 73a to supply brake fluid from the master cylinder 3 directly to the hydraulic pump 15 during execution of the traction control which will be described later is provided in the first hydraulic conduit 37a. Further, a reservoir cutoff valve (SRC valve) 561 to cause the hydraulic path 73a to be communicated or interrupted is disposed in the hydraulic path 73a.

According to this embodiment in particular, a pressure sensor 567 to detect pressure on the intake side of the hydraulic pump 15 is provided in the hydraulic path 71a between the SMC valve 133 and the master cylinder 3.

Meanwhile, similarly to the foregoing first hydraulic conduit 37a, the pressure-increasing control valves 31' and 32', the pressure-reducing control valves 33' and 34', an SMC valve 133', a reservoir 20', a hydraulic pump 15' an accumulator 564, an SRC valve 562, and a pressure sensor 568 are disposed at similar locations in the second hydraulic conduit 37b.

Additionally, as shown in FIG. 54, an ECU 12' to control the brake control apparatus according to this embodiment is made up primarily of a microcomputer provided with a CPU 12'a, a ROM 12'b, a RAM 12'c, an input/output portion 12'd, a bus line 12'e, and the like of known art. Signals from wheel-speed sensors 201, 202, 201' and 202'b disposed at the several wheels, a brake switch 113, the pressure sensors 567 and 568, and so on are input to the ECU 12'.

A motor 580 to drive the hydraulic pumps 15 and 15', the first and second communication control valves 521 and 523, the pressure-increasing control valves 31, 32, 31', and 32', the pressure-reducing control valves 33, 34, 33', and 34', the SMC valves 133 and 133', the SRC valves 561 and 562 are driven and controlled on a basis of input signals from the several wheel-speed sensors 201, 202, 201' and 202' and the pressure sensors 567 and 568, performing traction control and the like.

Action of the vacuum booster 2 in braking operation during nonbraking will be described in brief hereinafter.

Figure 55A:
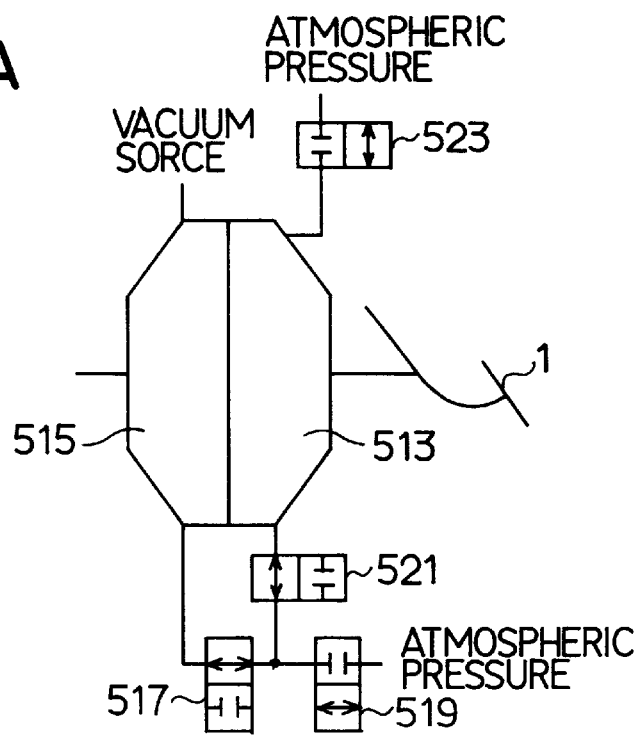
FIGS. 55A and 55B are explanatory diagrams indicating actuation of valves in a vacuum booster shown in FIG. 54.

(1) A case where boosting action is not caused to be exhibited (i.e., the state in FIG. 55A)

Because this is a time of nonbraking wherein brake operation by a driver is not performed, the brake pedal 1 is not depressed, and accordingly, the first mechanical valve 517 remains open and the second mechanical valve 519 remains closed. At this time, the first communication control valve 521 is off and in an open state and the second communication control valve 523 is off and in a closed state. Therefore, atmospheric pressure is not inducted into the pressure-converting chamber 513. The vacuum chamber 515 and the pressure-converting chamber 513 are in a communicated state and vacuum from a vacuum source is inducted therewithin.

For this reason, no pressure differential is produced in the two chambers 513 and 515, and so boosting action is not exhibited.

Figure 55B:
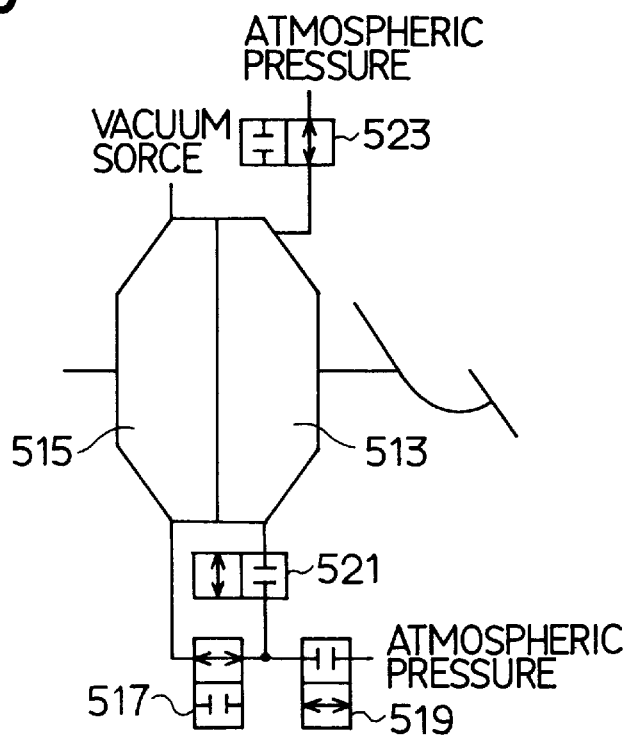

(2) A case where boosting action is caused to be exhibited (i.e., the state in FIG. 55B)

Because this is a time of nonbraking wherein brake operation by a driver is not performed, the brake pedal 1 is not depressed, and accordingly, the first mechanical valve 517 remains open and the second mechanical valve remains closed. At this time, in a case where traction control or the like is performed, the first communication control valve 521 is switched on and is closed and the second communication control valve 523 is switched on and is opened. Because of this, communication between the pressure-converting chamber 513 and the vacuum chamber 515 is in an interrupted state. Atmospheric pressure is inducted solely into the pressure-converting chamber 513.

For this reason, a pressure differential of, for example, several bars is produced in the two chambers 513 and 515, and so boosting action is exhibited.

Action of the brake-controlling apparatus according to this embodiment will be described next with reference to the flowchart in FIG. 56 and the time chart in FIGS. 57A to 57H.

Figure 56:
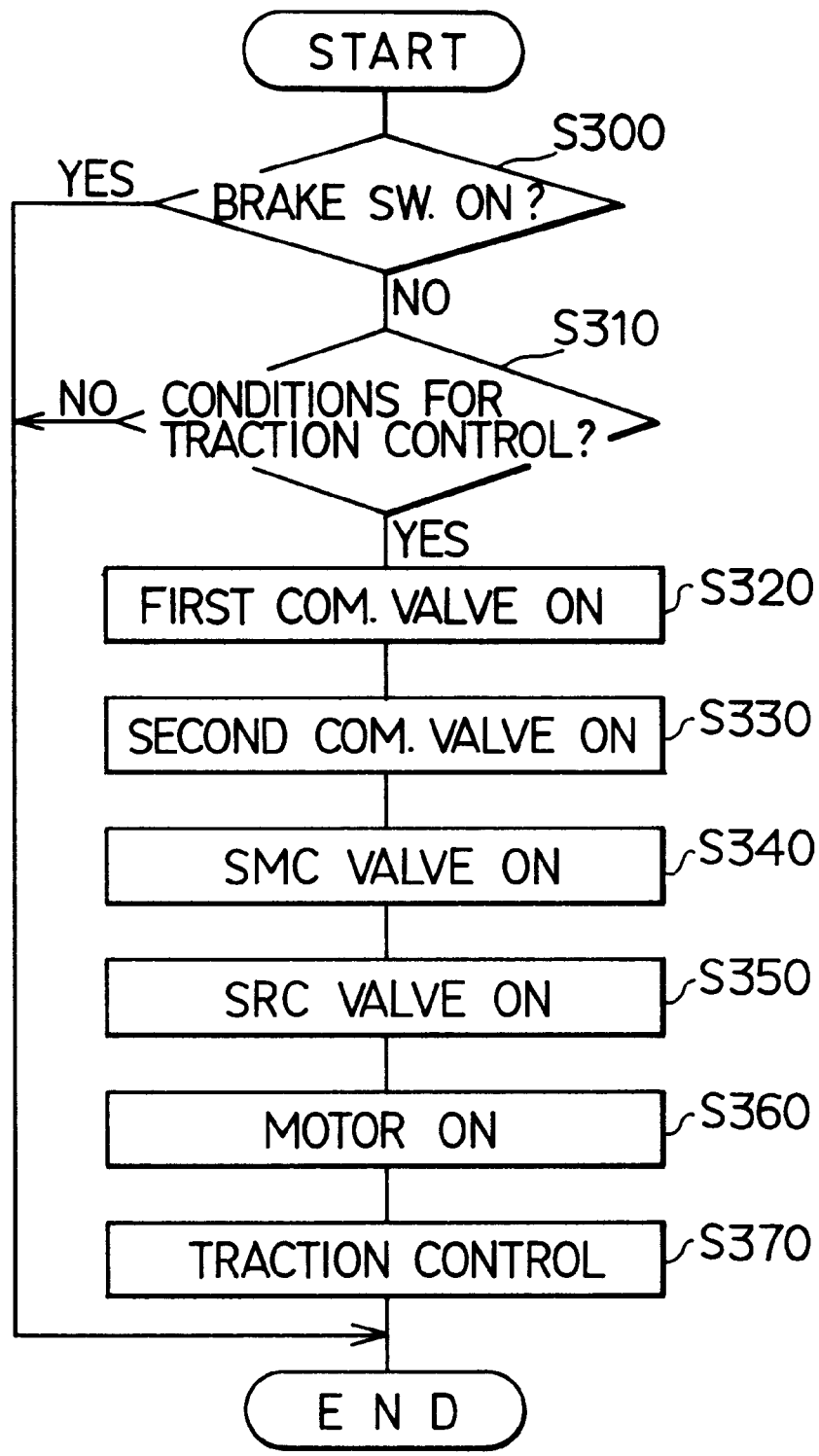
FIG. 56 is a flowchart indicating control processing of the control unit of the twenty-fifth embodiment.

In step S300 in FIG. 56, it is determined whether the brake pedal 1 has been depressed by determining whether the brake switch 113 is on. When an affirmative determination is made herein that the brake pedal 1 has been depressed, because the state is not nonbraking, the processing is terminated; when a negative determination is made, the processing advances to step S310.

In step S310, it is determined whether a condition for starting, for example, traction control has been fulfilled by determining, for example, whether a wheel slip ratio is a predetermined value or more. When an affirmative determination is made herein, the processing advances to step S320; when a negative determination is made, the processing is terminated.

In step S320, to exhibit boosting action by the vacuum booster 2, as shown in FIG. 55B, the first communication control valve 521 is switched on, interrupting communication between the pressure-converting chamber 513 and the vacuum chamber 515. In step S330, the second communication control valve 523 is switched on, introducing atmospheric pressure into the pressure-converting chamber 513.

At this time, vacuum is introduced into the vacuum chamber 515, and so the vacuum booster 2 is actuated by the differential pressure of this vacuum and atmospheric pressure, and a low pressure of several bars is imparted to the master cylinder 3. That is to say, the intake side of the hydraulic pumps 15 and 15' are preloaded via SRC valves 561 and 562 due to this pressure being imparted, and so the hydraulic pumps 15 and 15' assume a state wherein rapid discharge of brake fluid immediately subsequently to actuation is possible.

Additionally, due to this pressure being imparted, the brake pedal 1 along with the pistons 9a and 9b are shifted in the direction of arrow K in FIG. 53, and the passages 33a and 33b to the master reservoir 3a are interrupted.

Next, in step S340, as shown in FIG. 57, the SMC valves 133 and 133' are switched on to close the hydraulic paths thereof, and in the subsequent step S350, the SRC valves 561 and 562 are switched on to open the hydraulic paths thereof.

Next, in step S360, the motor 580 is switched on and the hydraulic pumps 15 and 15' are actuated. As a result, brake fluid is taken in respectively by the hydraulic pumps 15 and 15' not from the master reservoir 3a but rather from the master cylinder 3, via the SRC valves 561 and 562 and the hydraulic paths 73a and 73b, and is discharged to the hydraulic paths 72a and 72b leading to the several wheel cylinders 4, 5, 7, and 8.

Next, in step S370, the pressure-increasing control valves 31, 32, 31', and 32, and the pressure-reducing control valves 33, 34, 33', and 34' are controlled and normal traction control is performed in accordance with the slippage state of the wheel, as shown in FIGS. 57G and 57H. After that, the processing is terminated.

In this way, according to this embodiment, in a case where traction control or the like which is braking control during nonbraking is performed, action to impart braking force to the wheels in normal traction control, wherein the motor 580 is switched on, the SMC valves 133 and 133' are switched on, the SRC valves 561 and 562 are switched on, and pressure-increasing control valves 31, 32, 31', and 32, and the pressure-reducing control valves 33, 34, 33', and 34' are controlled. In addition, the first communication control valve 521 and the second communication control valve 523 are switched on so that booster action by the vacuum booster 2 is generated. As a result, preloading which slightly increases the pressure of the intake side of the hydraulic pumps 15 and 15' is performed by applying a predetermined low pressure to the master cylinder 3.

Figure 52:
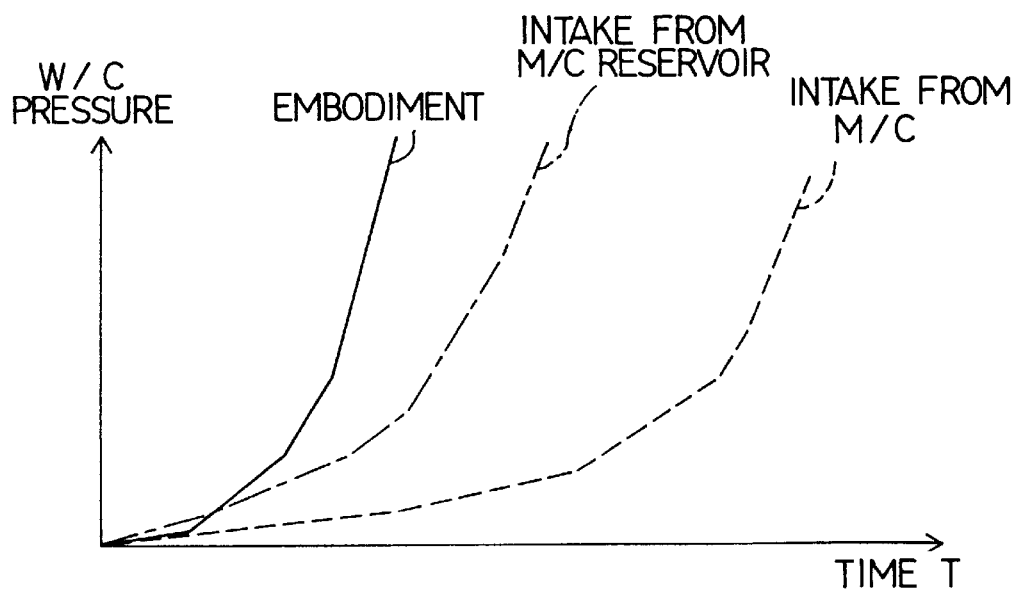
FIG. 52 is an explanatory diagram indicating an effect of a twenty-fifth embodiment.

For this reason, when the hydraulic pumps 15 and 15' are actuated in a state where this preloading has been performed, wheel-cylinder pressure can be rapidly risen as shown in FIG. 52. Accordingly, an effect is exhibited wherein response in traction control is enhanced.

In particular, because this embodiment can employ not a structure which takes in brake fluid from the master reservoir 3a, but rather a structure which takes in brake fluid from the master cylinder 3, the structure thereof can be simplified, and owing thereto, a notable effect wherein high response and low cost can both be realized is demonstrated.

Furthermore, according to this embodiment, when pressure is imparted by the vacuum booster 2, the passages 33a and 33b from the master reservoir 3a to the master cylinder 3 are interrupted so that brake fluid from other than the master cylinder 1 is not introduced into the hydraulic control circuit 30'. Therefore, the amount of fluid consumed by the master cylinder 3 matches the amount of fluid consumed by the wheel cylinders 4, 5, 7, and 8. For this reason, deceleration G corresponding to the depressed position of the brake pedal 1 is obtained, and so there exists an advantage in that diving feel is enhanced.

Moreover, an example of controlling the brake-fluid pressure in both systems of the first and second hydraulic conduits 37a and 37b was given in the description of control according to this embodiment to clarify the several valves and the like utilized in control, but of course it is acceptable to control the brake-fluid pressure of solely one or the other hydraulic conduit.

Additionally, when controlling the hydraulic conduit of solely one system among the first and second hydraulic conduit 37a and 37b while in braking control during nonbraking, pressure due to pressurization by the vacuum booster 2 is also generated in the other system, but because this is low pressure it does not particularly become a problem. To the contrary, this is efficacious in the sense of filling a gap (play of stroke) between the wheel cylinders 4, 5, 7, and 8 and the pads within the relevant cylinders. In, for example, VSC control (i.e., control which can prevent lateral slippage of the vehicle and avoid obstacles in a case where the steering wheel has been suddenly turned during travel) or the like, even when spin has been prevented by control of one system, the other system is substantially invariably controlled to prevent rock-back of the vehicle thereafter. Therefore, prior eliminating the play of stroke of the other system presents an advantage of improving hydraulic response.

A twenty-sixth embodiment will be described next.

Because a brake-controlling apparatus according to this embodiment differs from the foregoing twenty-fifth embodiment solely in the vacuum booster 2, structure otherwise is similar to the above-described twenty-fifth embodiment, and so description relating solely to the vacuum booster 2 will be given hereinafter.

Figure 58A:
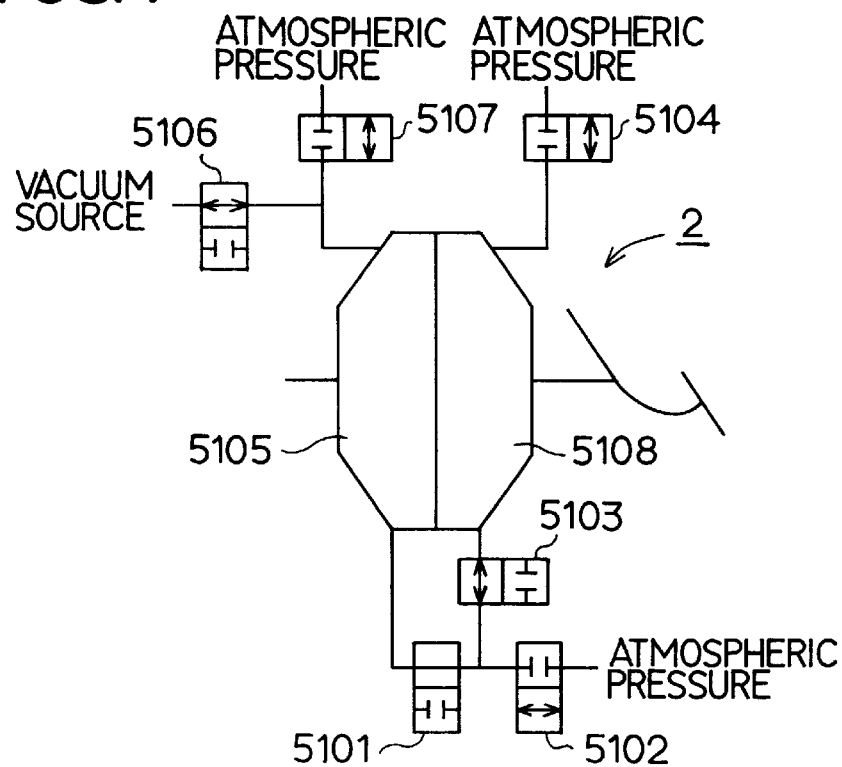
FIGS. 58A and 58B are schematic structural views indicating a vacuum booster of a twenty-sixth embodiment.

As shown in FIG. 58A, in addition to a first mechanical valve 5101, a second mechanical valve 5102, a first communication control valve 5103, and a second communication control valve 5104 similar to the foregoing twenty-fifth embodiment, a vacuum booster 2 utilized in this embodiment, provides a third communication control valve 5106 in a communicating passage communicating a vacuum chamber 5105 and a vacuum source, together with providing a fourth communication control valve 5107 in a communication passage communicating the vacuum chamber 5105 with an atmospheric-pressure side.

Accordingly, in a case where braking control during nonbraking is started, the first communication control valve 5103 is switched on (closed) and the second communication control valve 5104 is switched on (open), and along with this, the third communication control valve 5106 is caused to remain off (open) and the fourth communication control valve 5107 is caused to remain off (closed). As a result, the vacuum chamber 5105 is in a state where vacuum is introduced therewithin, and solely a pressure-converting chamber 5108 is caused to be in a state where atmospheric pressure is introduced therewithin. Accordingly, a pressure differential is produced between the two chambers 5105 and 5108, and boosting action of the vacuum booster 2 is exhibited.

Herein, in a case of attempting to instantly stop the boosting action of the vacuum booster 2, the third communication control valve 5106 is switched off (closed) and the introduction of vacuum into the vacuum chamber 5105 is interrupted, and along with this, the fourth communication control valve 5107 is switched on (open) and introduction of the atmosphere into the vacuum chamber 5105 is performed. As a result, both chambers 5105 and 5108 become atmospheric pressure and the pressure differential disappears, and so the boosting action is stopped.

Figure 58B:
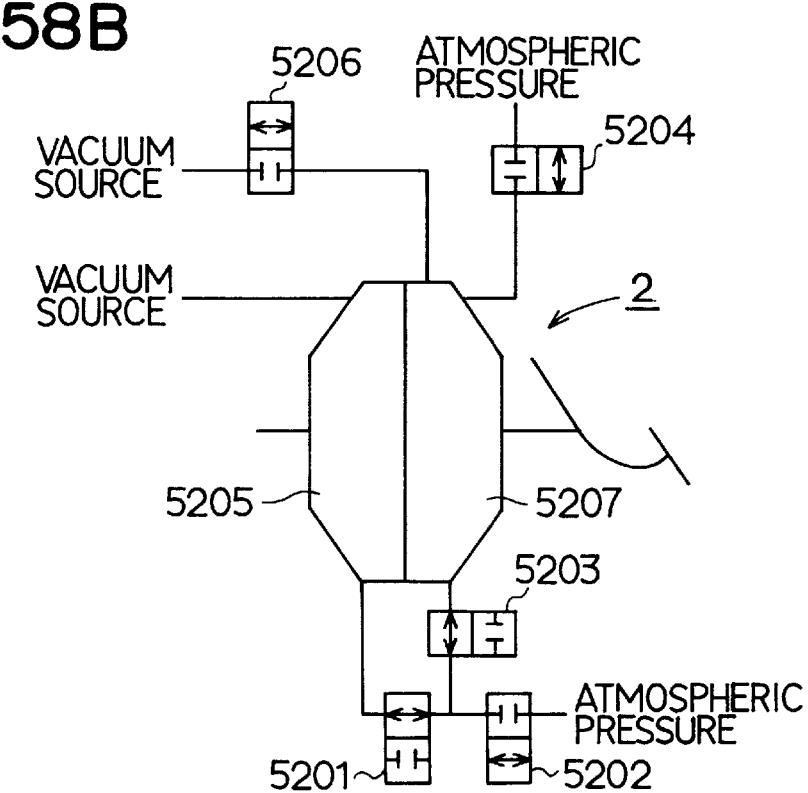

Additionally, as shown in FIG. 58B, in addition to the first mechanical valve 5201, the second mechanical valve 5202, the first communication control valve 5203, and the second communication control valve 5204 similar to the foregoing twenty-fifth embodiment, the vacuum booster 2 utilized in this embodiment may be provided with a fifth communication control valve 5206 in a communication passage communicating the pressure-converting chamber 5207 with the vacuum source.

Accordingly, in a case where braking control during nonbraking is started, the first communication control valve 5203 is switched on (closed) and the second communication control valve 5204 is switched on (open), and along with this, the fifth communication control valve 5206 is caused to remain off (closed). As a result, a pressure differential is produced between the vacuum chamber 5205 and the pressure-converting chamber 5207 and boosting action is exhibited.

Herein, in a case of attempting to instantly stop the boosting action, the second communication control valve 5204 is switched off (closed) and the introduction of atmospheric pressure into the pressure-converting chamber 5207 is interrupted, and along with this, the fifth communication control valve 5206 is switched on (open) and introduction of vacuum into the pressure-converting chamber 5207 is performed. As a result, both chambers 5205 and 5207 come to be filled with vacuum and the pressure differential disappears, and so the boosting action is stopped.

Modifications of the twenty-fifth and twenty-sixth embodiments are indicated hereinafter.

(1) Various types of hydraulic control circuit other than the hydraulic control circuit of the foregoing embodiments can be employed.

(2) An example of a device employing engine vacuum and atmospheric pressure as the vacuum booster was given in the foregoing embodiments, but a device utilizing another pressure source can be employed as the vacuum booster.

That is to say, because it is sufficient to introduce higher pressure to the pressure-converting chamber than to the vacuum-chamber side to cause boosting action of the vacuum booster 2 to be exhibited, various types of structure causing such a pressure differential to be generated can be employed.

(3) Various types of structure introducing the same pressure into the vacuum chamber and the pressure-converting chamber of the vacuum booster, causing the boosting action to be stopped, can be employed other than the method of stopping boosting action indicated in the foregoing embodiments.

(4) Additionally, a hydro booster may be utilized other than the vacuum booster.

(5) In the foregoing embodiments, the extent of boosting action of the vacuum booster may be controlled and back pressure of a hydraulic pump controlled at a target hydraulic pressure on a basis of hydraulic pressure (back pressure) at an intake side of the hydraulic pump detected by a pressure sensor.

For example, in a case where back pressure of the hydraulic pump is excessively large, a first communication control valve provided in a communicating passage communicating, for example, a vacuum chamber and a pressure-converting chamber may be duty-controlled so as to cause a pressure differential of the vacuum chamber and the pressure-converting chamber to become smaller. As a result, the differential pressure of the two chambers is reduced, and so boosting action also is reduced. Accordingly, the back pressure of the hydraulic pump also is reduced.

(6) Traction control was given as an example in the foregoing embodiments, but this invention naturally can be applied in various types of braking control in a case where a brake pedal is not depressed, for example in VSC control, and control of an automatic brake to prevent collision, and so on.

Next, a twenty-seventh embodiment will be described next.

Figure 60A:
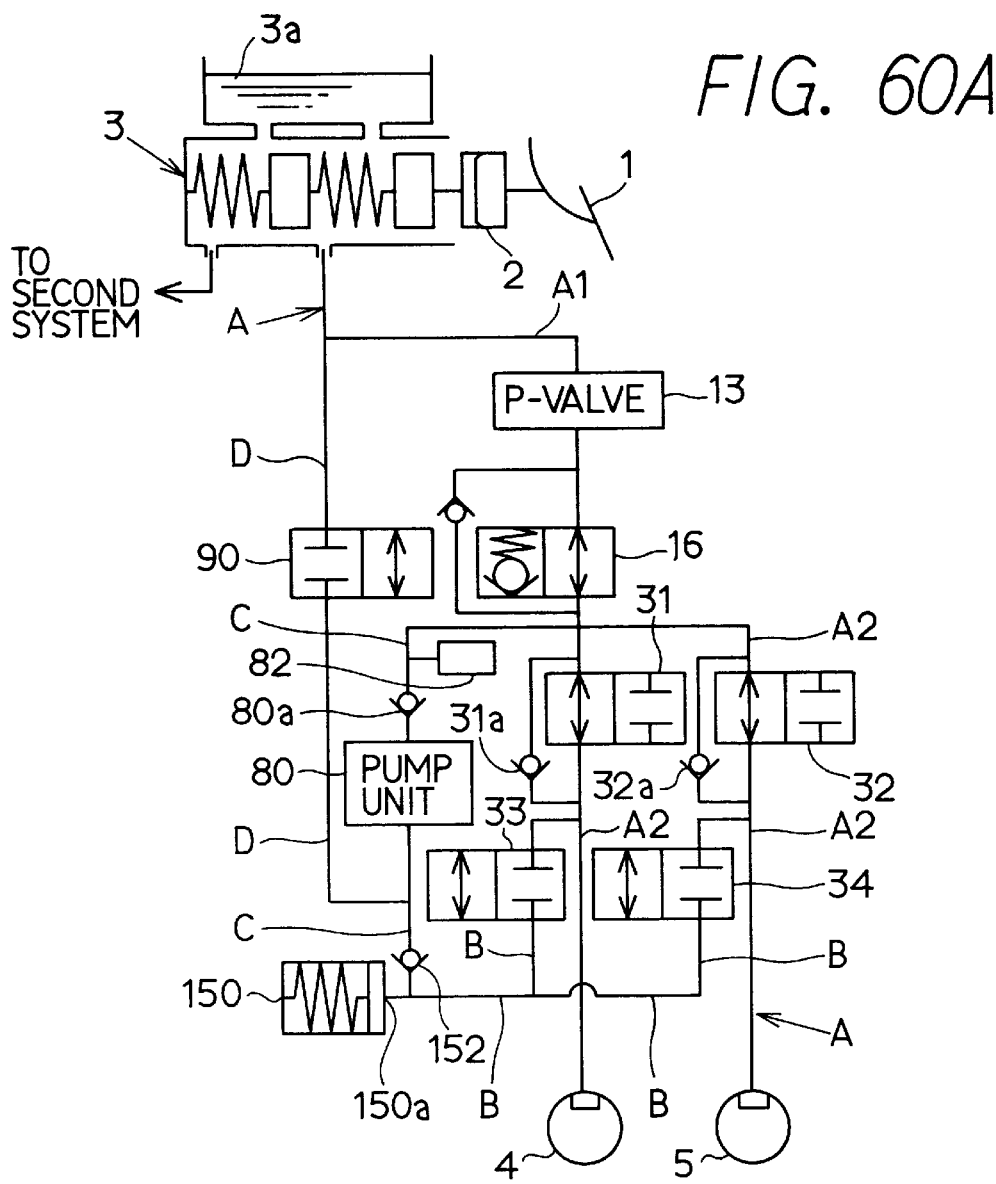
FIG. 60A is a model diagram indicating a brake system including a rotary type pump according to a twenty-seventh embodiment of the present invention.
Figure 60B:
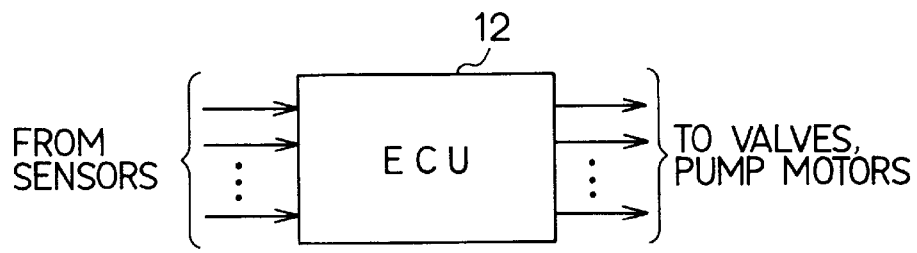
FIG. 60B is a diagram indicating an electronic control unit for ABS control.

FIGS. 60A and 60B are a model diagram indicating a brake system including an inner-contact rotary type pump (trochoid pump) and a diagram indicating an electronic control unit 6, respectively. In the twenty-seventh embodiment, the brake control apparatus is applied in a vehicle of a diagonal brake-fluid conduit system provided with respective brake-fluid conduits of connecting front-right wheel cylinder with rear-left wheel cylinder and connecting front-left wheel cylinder with rear-right wheel cylinder in a front-wheel drive four-wheeled vehicle.

As shown in FIG. 60A, a brake pedal 1 depressed by a driver when applying braking force to the vehicle is connected to a booster 2 so that depression force applied to the pedal 1 is boosted by the booster 2. The booster 2 has a push rod or the like to convey the boosted depression force to a master cylinder 3. Master-cylinder pressure is generated when the push rod compresses a master piston disposed in the master cylinder 3. The brake fluid pressure producing device is composed of the brake pedal 1, the booster 2 and the master cylinder 3. The master cylinder 3 is provided with a master reservoir 3a to supply brake fluid into the master cylinder 3 or to accumulate excess brake fluid from the master cylinder 3.

The master-cylinder pressure is conveyed to a wheel cylinder 4 disposed in the front-right wheel FR to impart braking force to this wheel as the wheel braking force generating device, and a second wheel cylinder 5 disposed in the rear-left wheel RL to impart braking force to this wheel, through an anti-skid brake system (hereinafter referred to as "ABS") comprising valves, a pump unit 80, a reservoir 150 and so on. The master-cylinder pressure is similarly conveyed also to respective wheel cylinders disposed in the front-left wheel and the rear-right wheel. However, because structure similar to that for the front-right and rear-left wheels FR, RL can be employed, detailed description thereof will be omitted.

The brake system has a conduit (main conduit) A connected to the master cylinder 3. A proportioning control valve 13 is reversely disposed in the main conduit A. The proportioning control valve 13 divides the main conduit A into a first conduit A1 which receives the master-cylinder pressure PU in the interval from the master cylinder 3 to the proportioning control valve 13 and a second conduit part A2 in the interval from the proportioning control valve 13 to the several wheel cylinders 4 and 5. The proportioning control valve 13 has a function of transmitting brake fluid pressure of an upstream side thereof to a downstream side thereof while attenuating the brake fluid pressure with a predetermined attenuating rate when brake fluid flow through the proportioning control valve 13 in a direction from the upstream side to the downstream side. Because the proportioning control valve 13 is reversely connected, the upstream side thereof is the second conduit A2.

A differential pressure control valve 16 which is switched between a flow-through position and a differential pressure producing position is provided in the main conduit A on a side of the wheel cylinders 4, 5 rather than the proportioning control valve 13. The differential pressure control valve 16 is normally controlled to assume the flowthrough position. When the differential pressure control valve 16 is switched to the differential pressure producing position, the brake fluid pressure on a wheel cylinder side thereof can be maintained to be higher by a predetermined differential pressure than the brake fluid pressure on a master cylinder side thereof.

The second conduit A2 branches out into two conduits, a pressure-increasing control valve 31, which controls pressure-increase of the brake fluid pressure applied to the wheel cylinder 4, is disposed in one of branched conduits and a pressure-increasing control valve 32, which controls pressure-increase of the brake fluid pressure applied to the wheel cylinder 5, is disposed in the other of the branched conduits. These pressure-increasing control valves 31, 32 are two-position valves switchable between the flow-through position and the cut-off position by an electric control unit for ABS 12 (hereinafter, referred to as "ECU"). When the two-position valves 31, 32 are in the flow-through position, brake fluid pressure generated by the master cylinder or the like can be imparted to the wheel cylinders 4, 5. When ABS control is not carried out, i.e., during a normal braking operation, these pressure-increasing control valves 31, 32 are controlled to always assume the flow-through position. Safety valves 31a, 32a are provided in parallel to the respective pressure-increasing control valves 31, 32. The safety valves 31a, 32a enable brake fluid to escape from the wheel cylinders 4, 5 when the brake pedal 1 is released during ABS control.

Pressure-reducing control valves 33, 34 switchable between the flow-through position and the cut-off position by the ECU 12 are respectively disposed in the conduits B which connect the second conduits A2 between the wheel cylinders 4, 5 and the pressure-increasing control valves 31, 32 to a reservoir port 150a of a reservoir 150. These pressure-reducing control valves 33, 34 are controlled to always assume the cut-off position during the normal braking operation (non-performance time of ABS control).

A pump unit 80 is disposed along with a safety valve 80a in a conduit C which connects the conduit A between the proportioning control valve 13 and the pressure-increasing control valves 31, 32 and the reservoir port 150a of the reservoir 150. The conduit C is divided into an upstream side conduit C1 and a downstream side conduit C2 by the pump unit 80. The detailed description of the pump unit 80 will be given later. An accumulator 82 is provided in the downstream side conduit C2 to relax pulsations of brake fluid discharged from the pump unit 80.

A conduit D which connects the master cylinder 3 and the upstream side conduit C1 interposed between the pump unit 80 and the reservoir 150 is further provided. The pump unit 80 takes in brake fluid within the conduit A through the conduit D and discharges it into the second conduit A2 to increase brake fluid pressure of the wheel cylinders 4, 5. A control valve 90 is provided in the conduit D. During the normal braking operation, the control valve 90 is controlled to assume the cut-off position. A check valve 152 is disposed in the conduit C between the connection part of the conduit D to the conduit C and the reservoir 150 so that brake fluid do not reversely flow from the conduit C into the reservoir 150 when brake fluid is drawn to the pump unit 80 through the conduit D.

Figure 61:
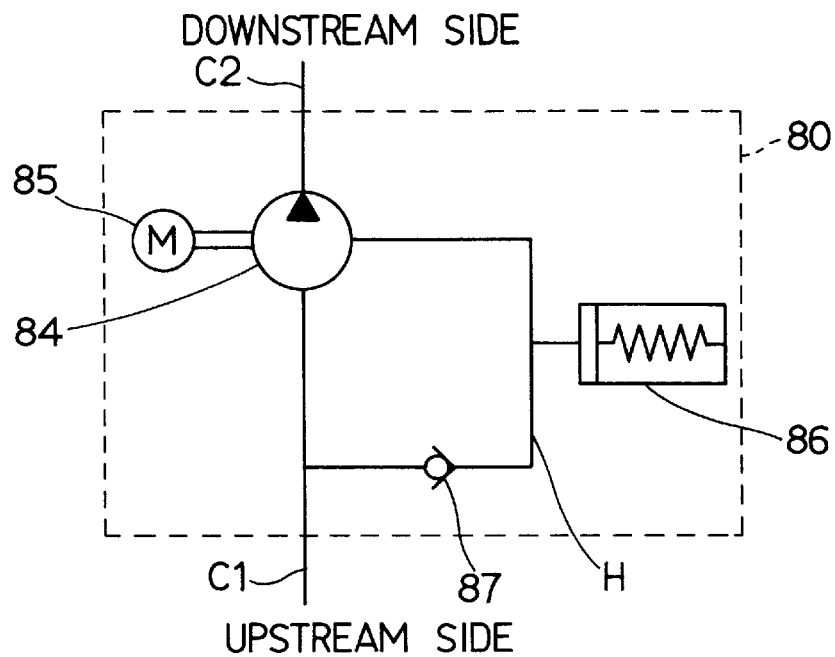
FIG. 61 is a drawing indicating detailed structure of a pump unit 10 in the twenty-seventh embodiment.

FIG. 61 shows a detailed structure of the pump unit 80. As shown in FIG. 2, the pump unit 80 has a rotary type pump 84, a motor 85 for rotating the rotary type pump 84, a low pressure reservoir 86 and a check valve 87. The low pressure reservoir 86 temporarily stores brake fluid leaking into a clearance of the rotary type pump 84 and sends out toward the upstream side conduit C1 of the pump unit 80 through a return conduit H. A check valve 87 is provided in the return conduit H to prevent reverse-flow of brake fluid advancing from the upstream side conduit C1 to the low pressure reservoir 87.

When the control valve 90 is switched to the flow-through position and the rotary type pump 84 is driven (rotated), the rotary type pump 84 draws brake fluid from the master cylinder side and discharges it to the wheel cylinder side. At this time, the differential pressure between the wheel cylinder pressure and the master cylinder pressure is maintained by the proportioning control valve 13. As a result, brake assist control which apply brake fluid pressure greater than the master cylinder pressure to the wheel cylinders 4, 5 can be carried out. Brake assist control is started when the ECU 12 detects at least one condition of a pedal stroke speed more than a predetermined level, a pedal stroke acceleration more than a predetermined level, a vehicle body deceleration more than a predetermined level, on the basis of the output signals of the several sensors. That is, brake assist control is carried out when the driver jams on the brakes, or during a panic braking state in which the brake pedal is strongly depressed. Further, brake assist control may be carried out when the ECU 12 detects the failure of the booster 2. In this brake assist control, if the master cylinder pressure is lower than a bending-point pressure of the proportioning control valve 13, the proportioning control valve 13 can not exhibit the differential pressure maintaining function. In this case, the differential pressure control valve 16 produces the differential pressure between the wheel cylinder pressure and the master cylinder pressure.

FIGS. 62A and 62B are sectional views of the rotary type pump 84. It is to be noted that FIG. 62B is a sectional view taken on line 62B—62B in FIG. 62A.

As shown in FIGS. 62A and 62B, an outer rotor 351 and an inner rotor 352 are assembled in a rotor chamber of a casing 350 of the rotary type pump 84. The center of the inner rotor 352 is offset from the center of the outer rotor 351. An inner teeth portion 351a is formed on an inner periphery of the outer rotor 351 and an outer teeth portion 352a is formed on an outer periphery of the inner rotor 352. The inner teeth portion 351a and the outer teeth portion 352a are engaged at an engaging point S while forming a gap 353 therebetween. A center hole (opening portion) 350a which communicates with the rotor chamber is formed at a center of the casing 350 and a driving shaft 354 to be connected to the inner rotor 352 is inserted into the center hole 350a. The outer rotor 351 is rotatably disposed in the rotor chamber of the casing 350.

To rotate the inner and outer rotors 351, 352 smoothly, a predetermined clearance 400 is provided between the casing 350 and the outer rotor 351, inner rotor 352, or driving shaft 354. An inlet port 360 and an outlet port 361 are formed in the rotor chamber of the casing 350 interposing the central axis of the driving shaft 354 therebetween.

The center hole 350a is sealed by an oil seal 410 to maintain the clearance 400 in fluid tight. Further, a hydraulic path J is formed in the casing 350 to lead the brake fluid (hereinafter, termed as leaking fluid) leaking into the clearance 400 to the outside of the casing 350. The low pressure reservoir 86 shown in FIG. 61 is connected to the conduit J. The check valve 87 as described above prevents the brake fluid flowing from the master cylinder side from entering the clearance 400 through the hydraulic path J.

Next, the operations of the brake apparatus and the rotary type pump 84 thus constructed will be described. It is to be noted that only the operation of the brake apparatus when high pressure is applied to the rotary type pump 84 will be described among the operations of the brake apparatus.

The control valve 90 is controlled to the flow-through position when large braking force is required, that is, when the stroke of the brake pedal 1 is large or when braking force corresponding to the depressing force of the driver to the brake pedal 1 is not being obtained. In this case, high master cylinder pressure produced by the brake pedal depression is applied to the rotary type pump 84. In the rotary type pump 84, the inner rotor 352 rotates with the driving shaft 354 when the motor 85 is driven. Along with the rotation of the inner rotor 352, the outer rotor 351 also rotates because of the, engagement of the inner teeth portion 351a and the outer teeth portion 352a. The volume of the gap 353 decreases and then increases to its original while the inner and outer rotors 351 and 352 make one rotation. As a result, brake fluid is drawn in the gap 353 from the inlet port 360 and discharged into the outlet port 361. During the rotations of the inner and outer rotors 351, 352, brake fluid leaks in the clearance 400 and is stored in the low pressure reservoir 86 via the hydraulic path J and the conduit H.

When the brake fluid pressure in the upstream side conduit C1 becomes low (for example, when the driver releases the brake pedal 1), brake fluid stored in the low pressure reservoir 86 is returned into the upstream side conduit C1. This means that the leaking fluid is returned from the low pressure reservoir 86 into a hydraulic circuit of the brake apparatus.

In this way, it can be prevented that brake fluid pressure within the clearance 400 becomes too high to exceed the allowable pressure of the oil seal 410 by storing the leaking fluid in the low pressure reservoir 86.

When the control valve 90 is duty-controlled so that the control valve 90 is alternately and repeatedly driven to the flow-through position and the cut-off position, the brake fluid pressure within the upstream side conduit C1 can be made low even when the master cylinder pressure is generated. As a result, the brake fluid in the low pressure reservoir 86 can be returned into the upstream side conduit C1. Consequently, the volume of the low pressure reservoir 86 can be made small. That is, the miniaturization of the low pressure reservoir 86 can be achieved compared to the case in which no control valve 90 is provided in the conduit C.

A twenty-eighth embodiment will be described.

The hydraulic circuit of the brake apparatus of the twenty-eighth embodiment is the same as that of the twenty-seventh embodiment. Therefore, only the pump unit 80A, which is different from that of the first embodiment will be described.

Figure 63:
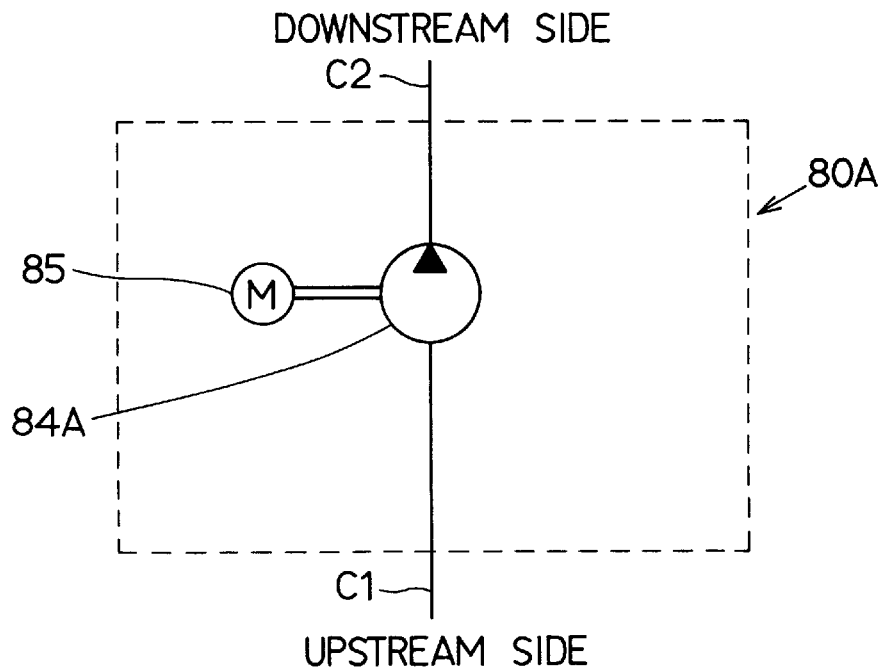
FIG. 63 is a drawing indicating detailed structure of a pump unit 10 in a twenty-eighth embodiment.

FIG. 63 shows a detailed structure of the pump unit 80A according to the second embodiment. As shown in FIG. 63, the pump unit 80A comprises the rotary type pump 84A and a motor 85 for driving the rotary type pump 84A. FIG. 64A is a sectional view of the rotary type pump 84A and FIG. 64B is a sectional view taken on line 64B—64B in FIG. 64A. It is to be noted that the description of the same parts as those of the first embodiment in the inside structure of the rotary type pump 84A will be omitted.

As shown in FIG. 64A, an outlet port 361 is formed in the casing 350 of the rotary type pump 84A on one side of the center axis of the driving shaft 354 (on a right side in the drawing) and two inlet ports 360, 362 are formed on the other side thereof (on a left side in the drawing). That is, the inlet port 360 is for the rotors 351, 352 taking in the brake fluid sent from the master cylinder 3 and the inlet port 362 is for the rotors 351, 352 taking in the brake fluid coming from the clearance 400. The inlet port 362 is shown by a dotted line in FIG. 64B. As shown in FIG. 64B, the inlet port 362 is formed as a path connecting the rotor chamber and the clearance 400. The inlet port 360 and the inlet port 362 are formed in the casing 350 to communicate gaps 353 different from each other. As a result, brake fluid having high pressure taken in from the inlet port 360 does not flow into the inlet port 362.

In this way, because the inlet port 360 for taking in brake fluid from the master cylinder 3 and the inlet port 362 for taking in the leaking fluid are separated, the rotary type pump 84A can reliably take in the leaking fluid even though the brake fluid sent from the master cylinder 3 is high in pressure. Therefore, it can be prevented that brake fluid leaks to the outside of the casing 350. Because the leaking fluid is successively taken in the gaps 353 of the rotary type pump 84A, it is needless to provide the reservoir for temporarily storing leaking fluid.

A twenty-ninth embodiment will be described.

The hydraulic circuit of the brake apparatus of the twenty-ninth embodiment is the same as that of the twenty-seventh embodiment. Therefore, only the pump unit 80B, which is different from that of the first embodiment will be described.

Figure 65:
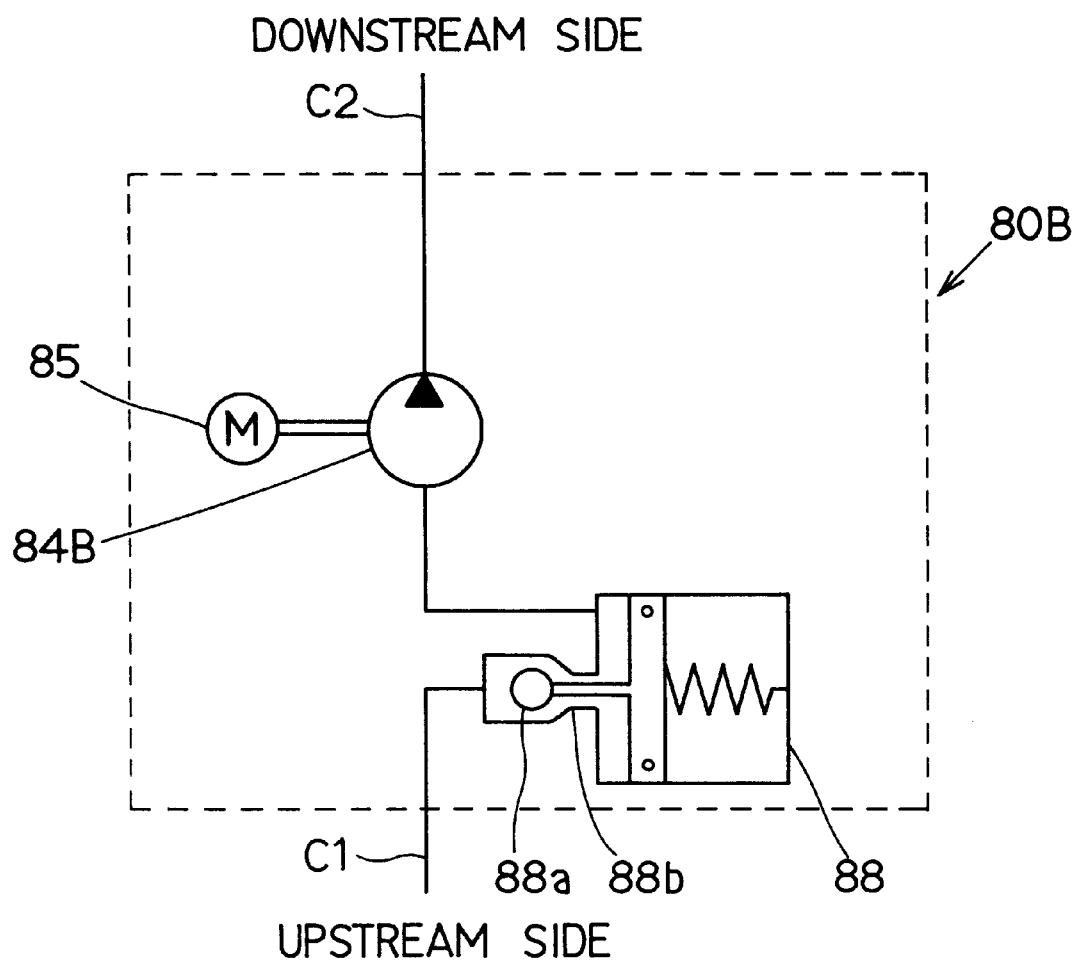
FIG. 65 is a drawing indicating detailed structure of a pump unit 10 in a twenty-ninth embodiment.

FIG. 65 shows a detailed structure of the pump unit 80B according to the third embodiment. As shown in FIG. 6, the pump unit 80B comprises the rotary type pump 84B, a motor 85 for driving the rotary type pump 84B, and a pressure-regulating valve (pressure-regulating reservoir) 88. It is to be noted that, as the rotary type pump 84B, the conventional rotary type pump shown in FIGS. 67A and 67B can be employed. As shown in FIGS. 67A and 67B, the clearance 400 and the inlet port 360 are communicated by way of a hydraulic path G in the casing 350.

The pressure-regulating reservoir 88 is provided with a valve member 88*a* and a valve seat 88*b*. The valve member 88*a* moves in accordance with the amount of brake fluid stored in the pressure-regulating reservoir 88. When brake fluid amount greater than a predetermined value is stored in the pressure-regulating reservoir 88, the valve member 88*a* makes contact with the valve seat 88*b*, thereby preventing brake fluid from getting in the reservoir 88 from the master cylinder 3 side.

The operations of the brake apparatus and the pump unit 80B thus constructed will be described. The control valve 90 is controlled to the flow-through position when large braking force is required. In this case, brake fluid sent from the master cylinder 3 is stored in the pressure-regulating reservoir 88 through the conduits C1 and D, in the first place. The brake fluid stored in the pressure-regulating reservoir 88 is drawn by the rotary type pump 84B. When the amount of the brake fluid stored in the reservoir 88 decreases, the valve member 88*a* separates from the valve seat 88*b* and brake fluid is introduced into the reservoir 88 from the master cylinder side. In this state, applied to the rotary type pump 84B is brake fluid having a low pressure generated by a return spring disposed in the reservoir 88.

In this way, because brake fluid is supplied to the rotary type pump 84B through the pressure-regulating reservoir 88, the pressure of brake fluid introduced from the inlet port 360 is maintained at low pressure. This effect can be obtained even when the brake fluid pressure within the reservoir 150 for ABS use becomes high due to, for example, fluid discharge through the pressure-reducing control valves 33, 34. Therefore, it can be prevented that brake fluid leaks to the outside of the casing 350.

A thirtieth embodiment will be described.

Figure 66A:
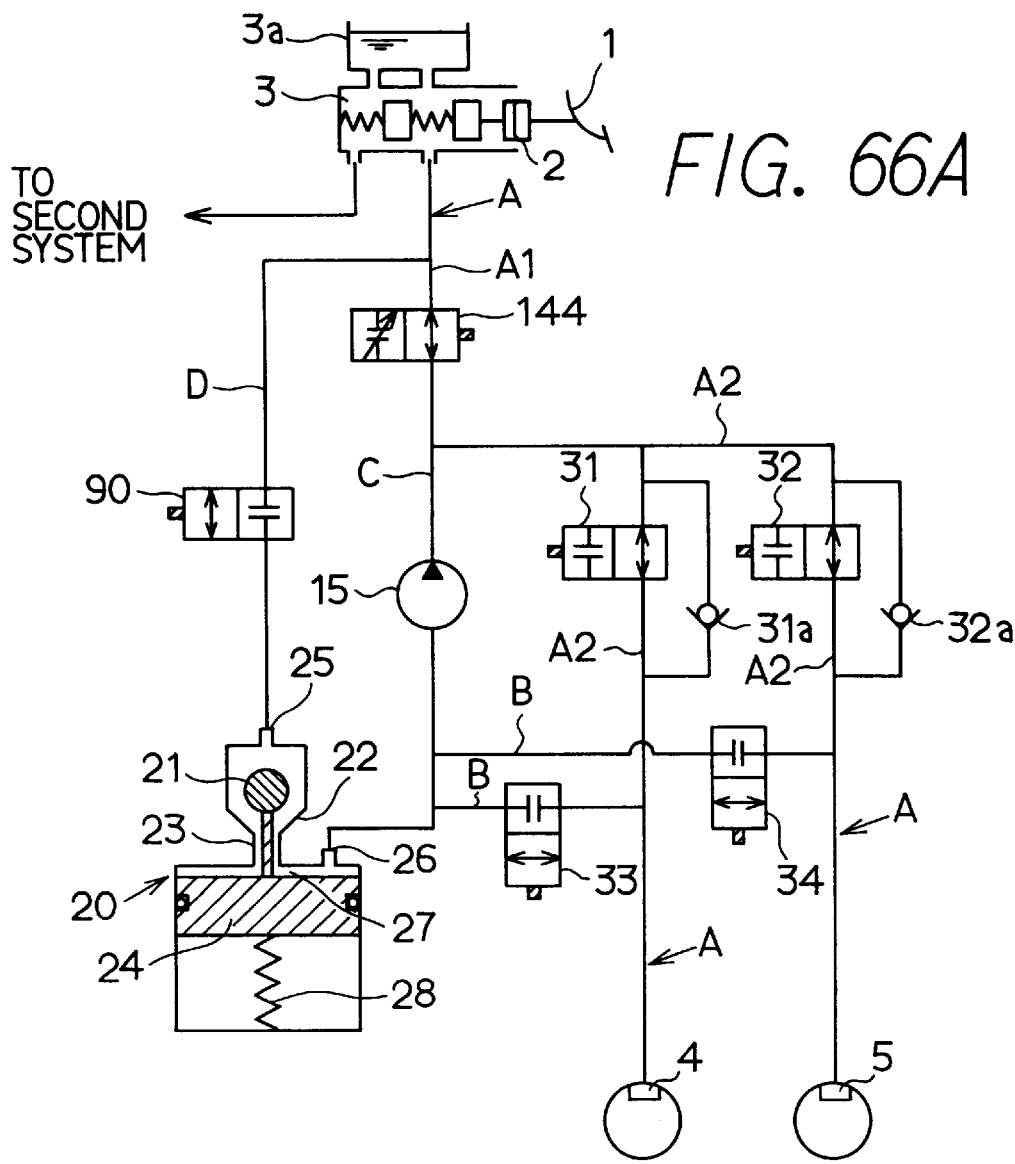
FIG. 66A is a model diagram indicating a brake system including a rotary type pump according to a thirtieth embodiment of the present invention.
Figure 66B:
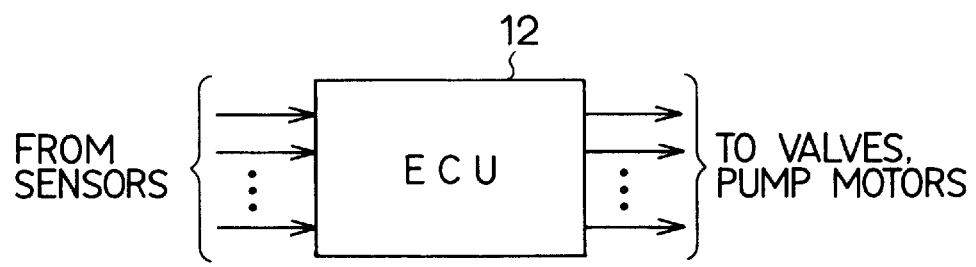
FIG. 66B is a diagram indicating an electronic control unit for ABS control and brake assist control.

FIGS. 66A and 66B are a model diagram indicating a brake apparatus and a diagram indicating an electronic control unit 12, respectively. As shown in FIG. 66A, the brake apparatus has an ABS device comprising valves 31, 32, 33, 34, a pump 15, a reservoir 20 and so on. Because the brake apparatus of the thirtieth embodiment is similar to that of the twenty-seventh embodiment, the same parts as those of the first embodiment are attached with the same reference signs as the first embodiment and only the parts different from the first embodiment will be described.

As shown in FIG. 66A, a linear differential pressure valve 144 is provided in the main conduit A on a upstream side (a master cylinder 3 side) of the pressure-increasing control valve 31, 32. The linear differential pressure valve 144 has two positions of a flow-through position on which the master cylinder 3 and the wheel cylinders 4, 5 are communicated through the main conduit A and a differential pressure position which can produce a predetermined differential pressure between the master cylinder pressure and the wheel cylinder pressure. The main conduit A is divided into the first conduit A1 and the second conduit A2 by the linear differential pressure valve 144. It is to be noted that the linear differential pressure valve 144 can linearly adjust the differential pressure established between the master cylinder pressure and the wheel cylinder pressure. For example, the lift length of a valve member (a length between the valve member and a valve seat when the valve member is away from the valve seat) can be linearly varied in accordance with the current value applied to a solenoid coil of the linear differential pressure valve. As a result, when the wheel cylinder pressure is higher than the master cylinder pressure, a degree of the throttling for the brake fluid flowing from the wheel cylinder side to the master cylinder side can be linearly changed. As a result, the differential pressure set between the wheel cylinder pressure and the master cylinder pressure can be linearly adjusted.

A reservoir 20 for ABS control use is provided at a connection point of the conduit B and the conduit D. This reservoir 20 has a pressure-regulating function which lowers the master cylinder pressure transmitted from the master cylinder 3 to the intake side of the pump 15 through the control valve 90. The detailed structure of the reservoir 20 will be described later.

A rotary type pump 15 is provided in the conduit C. The rotary type pump 15 takes in the brake fluid from the reservoir 20 and discharges pressurized brake fluid into the second conduit A2 when ABS control or brake assist control is carried out. In brake assist control, wheel braking force is increased by making the wheel cylinder pressure higher than the master cylinder pressure. It is to be noted that the rotary type pump 84B shown in FIGS. 67A and 67B can be employed as the rotary type pump 15. Further, a rotary gear type trochoid pump or an inner-contact/outer-contact gear type pump can be also employed as the pump 15. In any case, pulsations of brake fluid discharged from the pump and noises caused by the pump can be reduced.

The control valve 90 is disposed in the conduit D which connects the first conduit A1 and a first reservoir port 25 of the reservoir 20. Therefore, when the control valve 90 is in the cut-off position, the master cylinder 3 is cut-off from the intake side of the pump 15.

Next, the structure of the reservoir 20 will be described in detail. The reservoir 20 is connected between the master cylinder 3 and the pump 15. The reservoir 20 has the first reservoir port 25 which receives brake fluid from the conduit D within which the brake fluid pressure is the same as the master cylinder pressure. Further, the reservoir 20 has a second reservoir port 26 which is connected to the conduit B and receives brake fluid expelled from the wheel cylinders 4, 5 through the pressure-reducing control valves 33, 34. A ball valve 21 is disposed further into the interior of the reservoir 20 than this first reservoir port 25. A rod 23 which has a predetermined stroke to move this ball valve 21 up or down is provided on an underside of this ball valve 21. A piston 24 interlocked with the rod 23 is provided within the reservoir chamber 27. A spring 28 is provided in the reservoir chamber 27. The spring 28 biases the piston 24 upward so that the brake fluid is pushed out of the reservoir chamber 27.

This piston 24 slides downward in a case where brake fluid has flowed from the second reservoir port 26, accumulating brake fluid within the reservoir chamber 27. At this time, the rod 23 also moves downward in accompaniment to the downward-movement of the piston 24. Due to the downward-movement of the piston 24, the ball valve 21 contacts the valve seat 22. As a result, the communication between the intake side of the rotary type pump 15 and the first conduit A1 is interrupted by the ball valve 21 and the valve seat 22. In this way, when an amount of brake fluid corresponding to the stroke of the rod 23 has accumulated within the reservoir chamber 27, the flow of brake fluid between the first conduit A1 and the intake side of the rotary type pump 15 is interrupted by the ball valve 21 and the valve seat 22. Therefore, if the brake fluid amount exceeding the drawing capacity of the rotary type pump 15 flows in the reservoir camber 27 during pressure-reduction of the wheel cylinder pressure in ABS control, the flow of the brake fluid from the master cylinder 3 into the reservoir chamber 27 is interrupted by the ball valve 21 and the valve seat 22. In this state, only the brake fluid flowing from the wheel cylinders 4, 5 through the pressure-reducing control valves 33, 34 can enter the reservoir chamber 27 by way of the second reservoir port 26. Therefore, pressure-reduction of the wheel cylinder pressure in ABS control can be always implemented irrespective of the brake fluid amount accumulated in the reservoir chamber 27.

The operation of the brake apparatus having the reservoir 20 thus constructed will be described.

During normal brake (other than ABS control and brake assist control), the linear differential pressure valve 144 is set to the flow-through position and the control valve 90 is set to the cut-off position. As a result, the master cylinder pressure generated by the brake pedal depression of the driver is applied to the wheel cylinders 4, 5 as it is. When brake assist control is carried out, the linear differential pressure valve 144 is set to the differential pressure producing position and the control valve 90 is set to the flow-through position. Brake assist control is performed when it is desired to heighten wheel braking force more than that of the normal brake such as when the vehicle deceleration detected by the acceleration sensor or the like exceeds the predetermined value. Brake fluid pressure greater than pressure corresponding to the brake pedal depression of the driver can be applied to the wheel cylinders 4, 5 and therefore, braking operation of the driver is assisted by brake assist control. When the linear differential pressure valve 144 and the control valve 90 are respectively set to the above-described positions during brake assist control, brake fluid is introduced into the reservoir chamber 27 from the first conduit A1 through the conduit D. The rotary type pump 15 takes in the brake fluid accumulated in the reservoir chamber 27 and discharges high pressure brake fluid into the second conduit A2. As a result, the wheel cylinder pressure is maintained to be higher than the master cylinder pressure by the linear differential pressure valve 144 set to the differential pressure producing position.

As described above, the brake fluid flowing from the master cylinder 3 to the intake side of the rotary type pump 15 is once accumulated in the reservoir chamber 27 held at low pressure. Further, if the drawing capacity of the rotary type pump 15 is insufficient for the brake fluid amount flowing into the reservoir chamber 27 and the brake fluid of a predetermined amount is accumulated in the reservoir chamber 27, the communication between the first conduit A1 and the intake side of the rotary type pump 15 is interrupted by the ball valve 21 and the valve seat 22. In this state, when the pump 15 takes in the brake fluid accumulated in the reservoir chamber 27 and the brake fluid amount in the reservoir chamber 27 is reduced, the ball valve 21 is pushed upward by the rod 23 so that the valve is open. Brake fluid is again supplied from the master cylinder 3 toward the intake side of the pump 15. In this way, high-pressure brake fluid generated by the brake pedal depression of the driver is made low-pressure brake fluid by the reservoir 20. Therefore, it can be avoided that high-pressure brake fluid is applied to the intake side of the rotary type pump 15. In addition, brake fluid leakage of the rotary type pump 15 can be prevented and therefore, it is possible to improve the brake fluid discharging capacity of the rotary type pump 15.

The wheel braking force may be heightened other than when the panic braking operation or the rapid and strong braking operation is detected based on the vehicle deceleration or the like. For example, it is possible to assist the brake pedal operation of the driver whenever the brake pedal 1 is depressed. The depression of the brake pedal 1 can be detected by the ECU 12 based on an output signal of a stop switch which is turned on in response thereto.

Brake assist control may be started when a predetermined time period has elapsed since the stop switch is turned on. When brake assist control is started, the control valve 90 is switched from the cut-off position to the flow-through position. When this switching of the control valve 90 is executed after the brake pedal 1 has been depressed to some extent, it is possible to prevent the brake pedal stroke from being excessively long at an initial stage of the brake pedal depression. That is, if the control valve 90 has been switched to the flow-through position before the brake pedal depression, or if the control valve 90 is not provided in the conduit D, brake fluid flows in the reservoir chamber 27 from the master cylinder 3 by an amount corresponding to the stroke of the rod 23 at the initial stage of the pedal depression. As a result, the stroke of the brake pedal 1 becomes long by the brake fluid amount flowing into the reservoir chamber 27 and the rising of the wheel braking force is slow at the initial stage of the pedal depression. However, when the control valve 90 remains in the cut-off position for a slight time period immediately after the driver starts to d press the brake pedal 1, i.e., the master cylinder pressure begins to be produced, it can be prevented that the stroke of the brake pedal 1 becomes excessively long.

The control valve 90 is maintained to the flow-through position by supplying current to the solenoid coil thereof while brake assist control is being carried out. However, if the current supplying time is too long, there is a possibility that the solenoid coil is fused. For this reason, it is preferable that the current is supplied to the solenoid coil in accordance with a predetermined duty ratio so that the average current value (average electric power) supplied to the solenoid coil is reduced.

ABS control is started when the ECU 12 determines that a slip ratio of a wheel, which is detected based on the output signals of wheel speed sensors, exceeds a predetermined value. In the start of ABS control, the positions of the linear differential pressure valve 144 and the control valve 90 are not changed. That is, when ABS control starts during normal braking operation, the linear differential pressure valve 144 remains in the flow-through position and the control valve 90 remains in the cut-off position. When ABS control starts during brake assist control, the linear differential pressure valve 144 remains in the differential pressure producing position and the control valve 90 remains in the flow-through position. When the wheel cylinder pressure is reduced to make small the tendency for the wheel to be locked in ABS control, the pressure-reducing control valve 33, 34 for the control object wheel is controlled to the flow-through position and the pressure-increasing control valve 31, 32 therefor is controlled to the cut-off position. As a result, the brake fluid in the wheel cylinder 4, 5 escapes into the reservoir 20 through the pressure-reducing control valve 33, 34. The rotary type pump 15 takes in the brake fluid accumulated in the reservoir 20 and discharges to increase the pressure of the wheel cylinder which is not subject to pressure-reduction control.

It is to be noted that, when ABS control starts during to brake assist control, because the control valve 90 is set to the flow-through position and the linear differential pressure valve 144 is set to the differential pressure producing position as described above, the brake fluid pressure of the wheel cylinder to which pressure increase control is executed is increased more than the master cylinder pressure and till pressure-reduction control is started again. Further, it is to be noted that high-pressure brake fluid is not applied to the intake side of the rotary type pump 15 even when the brake fluid is accumulated in the reservoir 20 during ABS control, because the inside of the reservoir 20 is maintained at low pressure.

If the ECU 12 determines that the vehicle is traveling on a road having a low friction coefficient (low $\mu$ road), even when ABS control starts during brake assist control and the control valve 90 has been set to the flow-through position, the control valve 90 is switched to the cut-off position in response to the determination of the ECU 12 that the vehicle is traveling on the low $\mu$ road. Such a determination can be made based on, for example, the restoring state of wheel acceleration when the wheel cylinder pressure is reduced. When the restoring state of wheel acceleration is fast, it can be determined that the vehicle travels on a medium $\mu$ road or a high $\mu$ road. To contrary, when the restoring state of wheel acceleration is slow, it can be determined that the vehicle travels on the low $\mu$ road. Or, when a continuous performance time of ABS control has reached a reference time, the ECU determines that the vehicle is traveling on the low $\mu$ road and switches the control valve 90 to the cut-off position. The reference time can be set to be a little longer than a time T during which ABS control is continued on a medium $\mu$ road such as a dirt road from a state in which the vehicle runs at a reference speed. In this case, by comparing the continuous performance time of ABS control with the reference time, it can be determined whether ABS control is executed on the low $\mu$ road at present. A plurality of reference times with respect to a plurality of reference speeds may be stored as a map and be used to switch the control valve 90.

In this way, if the control valve 90 is switched to the cut-off position when the ECU 106 determines that the vehicle is traveling on the low $\mu$ road, no brake fluid flows in the reservoir 20 from the master cylinder 3 side. Therefore, the pressure in the reservoir 20 is substantially equivalent to air pressure when the rotary type pump 15 draws out the brake fluid from the reservoir 20. As a result, when the wheel cylinder pressure is reduced, a state in which no wheel braking force is generated at wheels can be established by opening the pressure-reducing control valves 33, 34. In other words, a state in which a few fluid pressure remain applied to the wheel cylinders 4, 5 and the wheel braking force does not disappear completely can be avoided. In the present embodiment, because the state in which no wheel braking force is generated can be established, the tendency to be locked can be favorably eliminated even when the tendency to be locked is remarkably large on the low $\mu$ road. It is to be noted that the spring constant of the spring 28 needs to be set to a value close to the air pressure while considering the slide resistance of the piston 24.

As described above, the reservoir 20 can prevent high-pressure brake fluid from being applied to the intake side (inlet port) of the pump 15 during normal braking, ABS control, and the like. Therefore, brake fluid leakage from the rotary type pump 15 can be reliably prevented.

(Other Embodiments)

Although the brake fluid is employed as the fluid in the hydraulic circuits of the twenty-seventh through thirtieth embodiments, the fluid other than that, for example, water can be employed.

Although the inner-contact rotary type pump is adopted as the rotary type pump 84 in the twenty-seventh through thirtieth embodiment, the rotary type pump other than that, for example, a vane pump or a rotary plunger type pump can be adopted. In addition, an outer-contact rotary type pump can be adopted in the twenty-seventh, twenty-ninth and thirtieth embodiments.

The present invention can be applied to a brake-by-wire type brake apparatus in which a brake pedal operating amount or applying force to the brake pedal is electrically detected, the master cylinder pressure corresponding thereto is generated by the secondary brake fluid pressure producing device, and the master cylinder thus generated is transmitted to the wheel cylinders, in addition to the brake apparatus in which the applying force to the brake pedal is transmitted to the master cylinder and the master cylinder pressure is generated.

The twenty-seventh and thirtieth embodiments only show the examples of the brake apparatus to which the present invention is applied. The brake apparatus to which the present invention is applied is not limited to those of the embodiments. For example, in the thirtieth embodiment, the reservoir 150 of the twenty-seventh embodiment can be used in place of the reservoir 20. In this case, a detector for detecting brake fluid amount stored in the reservoir 150 is further provided. When the detector detects that the brake fluid amount in the reservoir 150 has reached a predetermined amount, the ECU 12 switches the control valve 90 to the cut-off position. Due to this structure, it can be prevented that high-pressure brake fluid is applied to the intake side of the rotary type pump 15.

What is claimed is:

1. A brake apparatus for a vehicle comprising:
   a brake fluid pressure producing device for producing brake fluid pressure in response to braking operation of an operator;
   a wheel braking force generating device for generating wheel braking force using said brake fluid pressure;
   a main conduit connecting said wheel braking force generating device to said brake fluid pressure producing device;

a pressure maintaining valve disposed in said main conduit, thereby to divide said main conduit into a first conduit part at a side of said brake fluid pressure producing device and a second conduit part at a side of said wheel braking force generating device;

a pump for moving a part of brake fluid from said first conduit part to said second conduit part to produce fluid pressure in said second conduit part higher than fluid pressure in said first conduit part in cooperation with said pressure maintaining valve;

a brake assist control means for driving said pump to apply said higher fluid pressure in said second conduit part to said wheel braking force generating device when said brake fluid pressure is produced by said brake fluid pressure generating device and brake assist control is required;

wherein said pressure maintaining valve allows attenuating brake fluid flow from said second conduit part to said first conduit part by a predetermined amount when said pump is driven.

2. A brake apparatus for a vehicle according to claim 1, further comprising:

a rotary type pump comprising:
  a rotor which rotates with a driving shaft,
  a casing which holds said rotor and has an opening into which said driving shaft is inserted, and
  a fluid seal for preventing fluid leakage to an outside through said opening,
  wherein said casing further comprises an inlet port through which fluid is introduced to said rotor, an outlet port through which fluid is discharged from said rotor, and a hydraulic path for leading fluid from said opening to an outside of said casing;

an upstream side conduit connected to said inlet port of said casing;

a downstream side conduit connected to said outlet port of the casing;

a reservoir for storing fluid coming through said hydraulic path;

a return conduit disposed between said reservoir and said upstream side conduit in order that fluid stored in said reservoir is returned to said upstream side conduit; and a check valve disposed in the return conduit to prevent reverse flow of fluid from said upstream side conduit to said reservoir.

3. A brake apparatus for a vehicle according to claim 2, further comprising:

a control valve which is switched between a flow-through position and a cut-off position, said control valve being provided in said upstream side conduit on a further upstream side than a connection point of said return conduit to said upstream side conduit.

4. A brake apparatus for a vehicle according to claim 1, further comprising:

a rotary pump comprising:
  a casing which has an opening into which a driving shaft is inserted,
  a rotor which forms a plurality of spaces in said casing, each of said spaces changing its volume when said rotor rotates with said driving shaft, and
  a fluid seal for preventing fluid leakage from said opening to outside,
  wherein said casing further comprises a first inlet port through which fluid is introduced to a first part of said plurality of spaces, an outlet port through which fluid is discharged from said plurality of spaces, and a second inlet port for introducing fluid within said opening into a second part of said plurality of spaces, which is different from said first part of said plurality of spaces;

an upstream side conduit connected to said first inlet port; and a downstream side conduit connected to said outlet port.

5. A brake apparatus for a vehicle according to claim 1, further comprising:

a rotary type pump comprising:
  a rotor rotating with a driving shaft,
  a casing which holds said rotor and has an opening into which said driving shaft is inserted, and
  a fluid seal for preventing fluid leakage from said opening to outside,
  wherein said casing further comprises an inlet port through which fluid is introduced to said rotor, an outlet port through which fluid is discharged from said rotor and a return path connecting said opening to said inlet port;

an upstream side conduit connected to said inlet port;

a downstream side conduit connected to said outlet port; and a pressure-regulating valve disposed in said upstream side conduit for regulating fluid pressure to be introduced into said inlet port so that said fluid pressure is maintained at a predetermined pressure or less.

6. A brake apparatus for a vehicle according to claim 1, wherein said higher fluid pressure in said second conduit part applied to said wheel braking force generating device is produced with a close correlation between the brake fluid amount moved by said pump from said first conduit part to said second conduit part and the attenuating brake fluid flow amount through said pressure maintaining valve from said second conduit part to said first conduit part.

7. A brake apparatus for a vehicle according to claim 1, wherein an operator's brake pedal reaction force is lessened due to the brake fluid movement by said pump, but is partially compensated for by the attenuating brake fluid flow through said pressure maintaining value.

8. A brake apparatus for a vehicle according to claim 1, wherein said pressure maintaining valve is a linear differential pressure valve for controlling a brake fluid pressure difference value between said first and second conduit parts by adjusting a current amount applied thereto.

9. A brake apparatus for a vehicle according to claim 1, further comprising:

anti-skid control means for detecting a slip state of a vehicle wheel and carrying out an anti-skid control based on said slip state, said anti-skid control means having pressure increasing and decreasing control means for allowing brake fluid pressure increase and decrease in said second conduit part according to said slip state, and a reservoir connected to said pressure increasing and decreasing control means for accumulating an excess brake fluid in said second conduit part for said anti-skid control, wherein said reservoir has a reservoir port connected to said pump to be driven for increasing brake fluid pressure in said second conduit part for both said brake assist control and said anti-skid control.

10. A brake apparatus for a vehicle according to claim 1, wherein said pump is a rotary type pump.

11. A brake apparatus for a vehicle according to claim 1, wherein said pressure maintaining valve is a duty controlled two-way valve changeable between a flow-through position and a cut-off position.

12. A brake apparatus for a vehicle comprising:
- a brake fluid pressure producing device for producing brake fluid pressure at a depressing stroke of a brake pedal in response to braking operation of an operator;
- a wheel braking force generating device for generating wheel braking force using said brake fluid pressure;
- a first conduit connecting said wheel braking force generating device to said brake fluid pressure producing device;
- a pressure control device dispose in said first conduit for alternately increasing, holding, and reducing said brake fluid pressure applied to said wheel braking force generating device;
- a reservoir for accumulating brake fluid by communicating with said wheel braking force generating device through said pressure control device when said brake fluid pressure applied to said wheel braking force generating device is reduced to eliminate a tendency for a wheel to be locked;
- a second conduit connecting said reservoir to said first conduit on a side of said brake fluid pressure producing device rather than said pressure control device;
- a rotary type pump disposed in said second conduit for taking in said brake fluid accumulated in said reservoir and discharging into said first conduit, the rotary type pump producing a wheel cylinder pressure higher than a master cylinder pressure at the depressing stroke of the brake pedal;
- a differential pressure maintaining device provided in said first conduit between said brake fluid pressure producing device and a connection point of said second conduit to said first conduit, for maintaining differential pressure between a pressure produced by said brake fluid pressure producing device and a pressure applied to said wheel braking force generating device which is generated by said rotary type pump;
- a third conduit connecting said reservoir to said first conduit between said brake fluid pressure producing device and said differential pressure maintaining device; and
- a control valve disposed in said third conduit and switched between a flow-through position and a cut-off position,
- wherein said reservoir has a first reservoir port which is connected to said third conduit and through which brake fluid is interrupted to flow from said third conduit when a predetermined amount of brake fluid is accumulated in said reservoir, and a second reservoir port connected to said second conduit.

13. A brake apparatus according to claim 12, further comprising:
- anti-skid control means for detecting slip state of said wheel and carrying out anti-skid control based on said slip state; and
- low $\mu$ road detecting means for detecting that a vehicle traveling road is a low $\mu$ road,
- wherein said control valve is switched to said cut-off position when anti-skid control is carried out for the vehicle traveling on said low $\mu$ road.

14. A brake apparatus according to claim 12, further comprising:
- deceleration detecting means for detecting deceleration of a vehicle,
- wherein said control valve is switched to said flow-through position and said rotary type pump is driven when said deceleration of said vehicle exceeds a predetermined value.

15. A brake apparatus according to claim 12, wherein said control valve is switched to said flow-through position and said rotary type pump is driven after a predetermined time has elapsed since said braking operation of said operator.

16. A brake apparatus for a vehicle comprising:
- a master cylinder for producing master cylinder pressure at a depressing stroke of a brake pedal in response to a braking operation of an operator;
- a wheel cylinder for receiving said master cylinder pressure and generating wheel braking force in accordance with wheel cylinder pressure applied thereto;
- a first conduit connecting said wheel cylinder to said master cylinder;
- an anti-skid control device comprising a pressure-increasing control valve and a pressure-reducing control valve for controlling slip state of a wheel;
- a linear differential pressure valve provided in said first conduit, for maintaining differential pressure between said master cylinder pressure and a pressure applied to said wheel cylinder;
- a reservoir for accumulating brake fluid which is expelled from said wheel cylinder through said pressure-reducing control valve when said brake fluid pressure applied to said wheel cylinder is reduced to eliminate a tendency for a wheel to be locked and for temporarily accumulating brake fluid which flows directly from said master cylinder;
- a rotary type pump for taking in said brake fluid accumulated in said reservoir and discharging into said first conduit, the rotary type pump producing a wheel cylinder pressure higher than a master cylinder pressure at the depressing stroke of the brake pedal;
- a control valve provided between said master cylinder and aid reservoir and switched between a flow-through position and a cut-off position; and
- prohibiting means for prohibiting brake fluid flowing into aid reservoir from said master cylinder when a predetermined amount of brake fluid is accumulated in said reservoir.

17. A brake apparatus according to claim 16, wherein said prohibiting means is a valve which mechanically closes a path connecting said master cylinder and said reservoir in accordance with an amount of brake fluid accumulated in said reservoir.

18. A brake apparatus according to claim 16, wherein said control valve is electrically controlled to one of the flow-through position and the cut-off position on the basis of a road surface condition, braking operation state made by said operator, and braking state of said vehicle.

19. A brake apparatus for a vehicle, comprising:
- a master cylinder for producing master cylinder pressure at a depressing stroke of a brake pedal in response to braking operation of an operator;
- a wheel cylinder for receiving said master cylinder pressure and generating wheel braking force in accordance with wheel cylinder pressure applied thereto;
- a first conduit connecting said wheel cylinder to said master cylinder; an anti-skid control device having a pressure-reducing control valve disposed at said first conduit for controlling slip state of a wheel;
- a differential pressure valve provided in said first conduit between said master cylinder and said anti-skid control device and switched between a flow-through position and a differential pressure producing position at which differential pressure between said master cylinder pressure and a pressure applied to said wheel cylinder is maintained;

a reservoir connected in fluid circuit with said anti-skid control device and said master cylinder for accumulating brake fluid which is expelled from said wheel cylinder through said pressure-reducing control valve when said brake fluid pressure applied to said wheel cylinder is reduced and for temporarily accumulating brake fluid which flows directly from said master cylinder even at the depressing stroke of brake pedal; and a rotary type pump for taking in said brake fluid accumulated in said reservoir and discharging into said first conduit between said differential pressure valve and said anti-skid control device, the rotary type pump producing a wheel cylinder pressure higher than a master cylinder pressure at the depressing stroke of the brake pedal.

20. A brake apparatus according to claim 19, wherein said rotary type pump is driven when said antiskid control device controls slip state of said wheel, and said rotary type pump is drive and said differential pressure valve is switched to said differential pressure producing position when brake assist control in which said wheel cylinder pressure is heightened more than said master cylinder pressure is carried out.

21. A brake apparatus according to claim 19, wherein said differential pressure valve is a linear differential pressure valve which linearly changes a differential pressure between the master cylinder pressure and the wheel cylinder pressure.

22. A brake apparatus according to claim 19, wherein said reservoir has a pressure-regulating valve which regulates pressure of brake fluid flowing from said master cylinder so that said pressure of brake fluid is maintained at a predetermined pressure or less.

23. A brake apparatus according to claim 19, wherein said reservoir prohibits flow of brake fluid from said master cylinder into said reservoir and allows only flow of brake fluid from said wheel cylinder thereinto to reduce said wheel cylinder pressure, when a predetermined amount of brake fluid is accumulated in said reservoir.

24. A brake apparatus according to claim 19, further comprising:

a control valve disposed in a hydraulic path between said master cylinder and said reservoir and switched between a flow-through position and a cut-off position.

25. A brake apparatus according to claim 24, wherein said control valve is normally in said flow-through position and switched to said cut-off position when a predetermined condition is fulfilled during anti-skid control.

* * * * *